(12) United States Patent
Narioka et al.

(10) Patent No.: US 8,812,955 B2
(45) Date of Patent: *Aug. 19, 2014

(54) INFORMATION PROCESSING METHOD AND APPARATUS AND INFORMATION PROCESSING PROGRAM

(75) Inventors: Hiroto Narioka, Kanagawa (JP); Takashi Kuwayama, Tokyo (JP); Takeo Inagaki, Tokyo (JP)

(73) Assignee: Sony Corporation, Tokyo (JP)

( * ) Notice: Subject to any disclaimer, the term of this patent is extended or adjusted under 35 U.S.C. 154(b) by 694 days.

This patent is subject to a terminal disclaimer.

(21) Appl. No.: 11/899,315

(22) Filed: Sep. 5, 2007

(65) Prior Publication Data

US 2008/0010613 A1  Jan. 10, 2008

Related U.S. Application Data

(63) Continuation of application No. 10/169,428, filed as application No. PCT/JP01/09300 on Oct. 23, 2001, now abandoned.

(30) Foreign Application Priority Data

Oct. 31, 2000 (JP) ................ P2000-333572

(51) Int. Cl.
*G06F 3/048* (2013.01)

(52) U.S. Cl.
USPC ........... 715/712; 715/764; 715/853; 715/854; 715/855

(58) Field of Classification Search
CPC .. G06F 3/0482; G01C 21/36; G01C 21/3611; G01C 21/3667
USPC .................. 715/712, 764, 853–855
See application file for complete search history.

(56) References Cited

U.S. PATENT DOCUMENTS

| 4,734,689 A | 3/1988 | Kurakake |
| 5,485,175 A | 1/1996 | Suzuki |

(Continued)

FOREIGN PATENT DOCUMENTS

| JP | 61-250681 | 11/1986 |
| JP | 3-182922 | 8/1991 |

(Continued)

OTHER PUBLICATIONS

Bott, Ed; Person, Ron. Special Edition Using Windows 98, Second Edition. Pub Date: Dec. 21, 1999. ISBN: 0-7897-2203-8, Chapter 6. pp. 1-2.

(Continued)

*Primary Examiner* — Amy Ng
*Assistant Examiner* — Sajeda Muhebbullah
(74) *Attorney, Agent, or Firm* — Frommer Lawrence & Haug LLP; William S. Frommer; Ellen Marcie Emas

(57) ABSTRACT

A hierarchical hysteresis menu area is such an area in which the hysteresis information from the hysteresis of past operations up to the current hierarchical layer is displayed responsive to an operation on an operating unit and in which selection by a user is made using the operating unit. As the hierarchy progresses, new rows such as "Top Menu", " . . . Menu A", " . . . Menu A-1" are created progressively, until the current layer [ . . . menu A-1 " . . . menu A-1"] is demonstrated as the lowermost layer. Indents and marks are used to denote a hierarchical structure. If a cursor is moved by an operating unit to decide on a certain selected layer, reversion may be made directly to the layer. The current menu area indicates the item of the current layer. A folder mark is displayed for a menu having a further lower item. The current hierarchical layer is indicated in this manner in the operating menu system of a hierarchical structure employing a user interface device.

8 Claims, 48 Drawing Sheets

(56) References Cited

U.S. PATENT DOCUMENTS

| | | | |
|---|---|---|---|
| 5,623,613 A | 4/1997 | Rowe et al. | |
| 5,635,953 A * | 6/1997 | Hayami et al. | 715/855 |
| 5,787,383 A * | 7/1998 | Moroto et al. | 701/210 |
| 5,802,492 A * | 9/1998 | DeLorme et al. | 455/456.5 |
| 5,828,374 A | 10/1998 | Coleman et al. | |
| 5,856,827 A | 1/1999 | Sudo | |
| 5,929,848 A * | 7/1999 | Albukerk et al. | 715/700 |
| 6,112,153 A * | 8/2000 | Schaaf et al. | 701/532 |
| 6,240,410 B1 | 5/2001 | Wical | |
| 6,262,722 B1 | 7/2001 | Allison et al. | |
| 6,292,188 B1 | 9/2001 | Carlson et al. | |
| 6,307,573 B1 * | 10/2001 | Barros | 715/764 |
| 6,366,923 B1 * | 4/2002 | Lenk et al. | 707/706 |
| 6,691,282 B1 * | 2/2004 | Rochford et al. | 715/234 |
| 6,983,203 B1 * | 1/2006 | Wako | 701/533 |

FOREIGN PATENT DOCUMENTS

| | | |
|---|---|---|
| JP | 4-328672 | 11/1992 |
| JP | 4-330558 | 11/1992 |
| JP | 5-265681 | 10/1993 |
| JP | 0 773 495 | 5/1997 |
| JP | 9-167075 | 6/1997 |
| JP | A 1997-233161 | 9/1997 |
| JP | A 11-271084 | 10/1999 |
| JP | A 11-339003 | 12/1999 |
| JP | 2000 3247 | 1/2000 |
| JP | A 2000-011000 | 1/2000 |
| JP | A 2000-112346 | 4/2000 |
| JP | 2000-155638 | 6/2000 |
| JP | 2000-230833 | 8/2000 |
| JP | A 2001-041762 | 2/2001 |

OTHER PUBLICATIONS

Japanese Office Action 2007-22529 dated Nov. 9, 2010.

JP 2007-225529; Japanese Office Action issued Jul. 26, 2011.

* cited by examiner

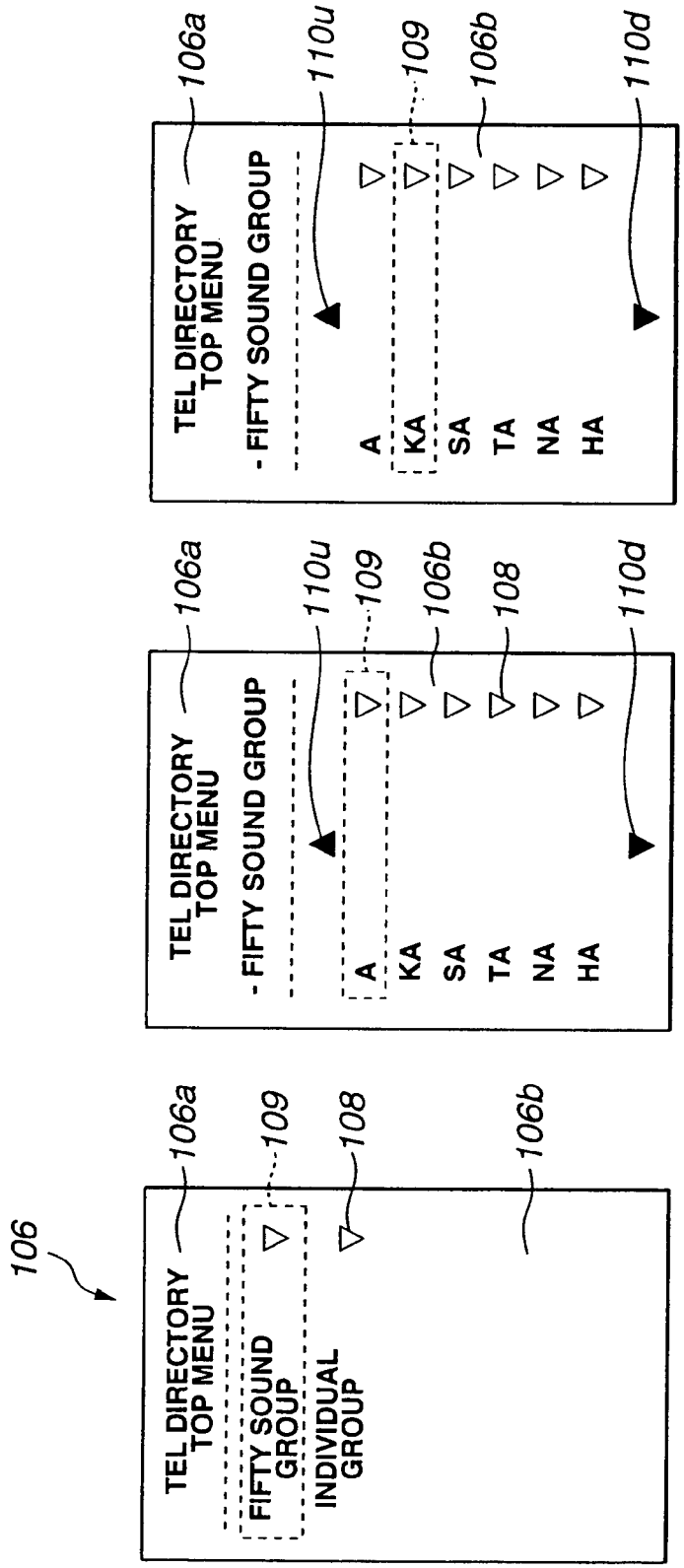

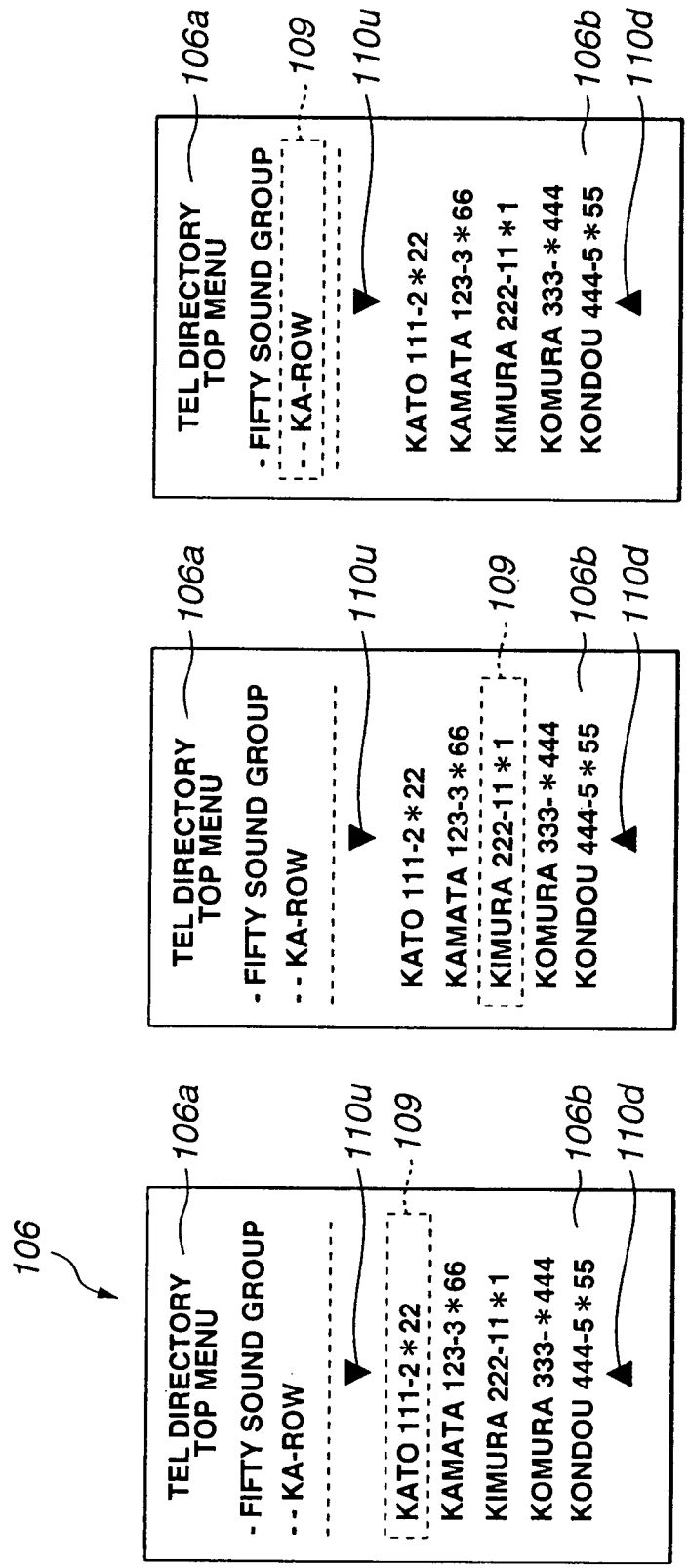

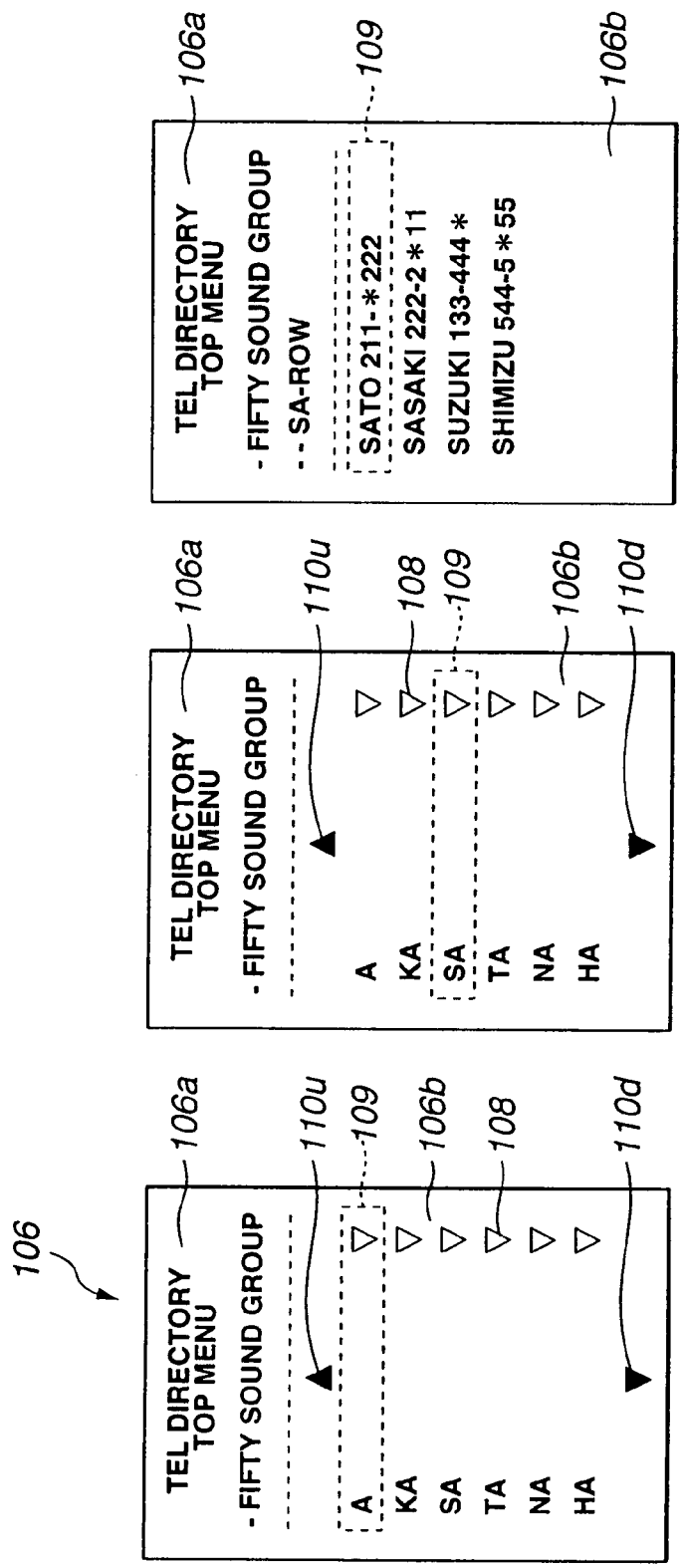

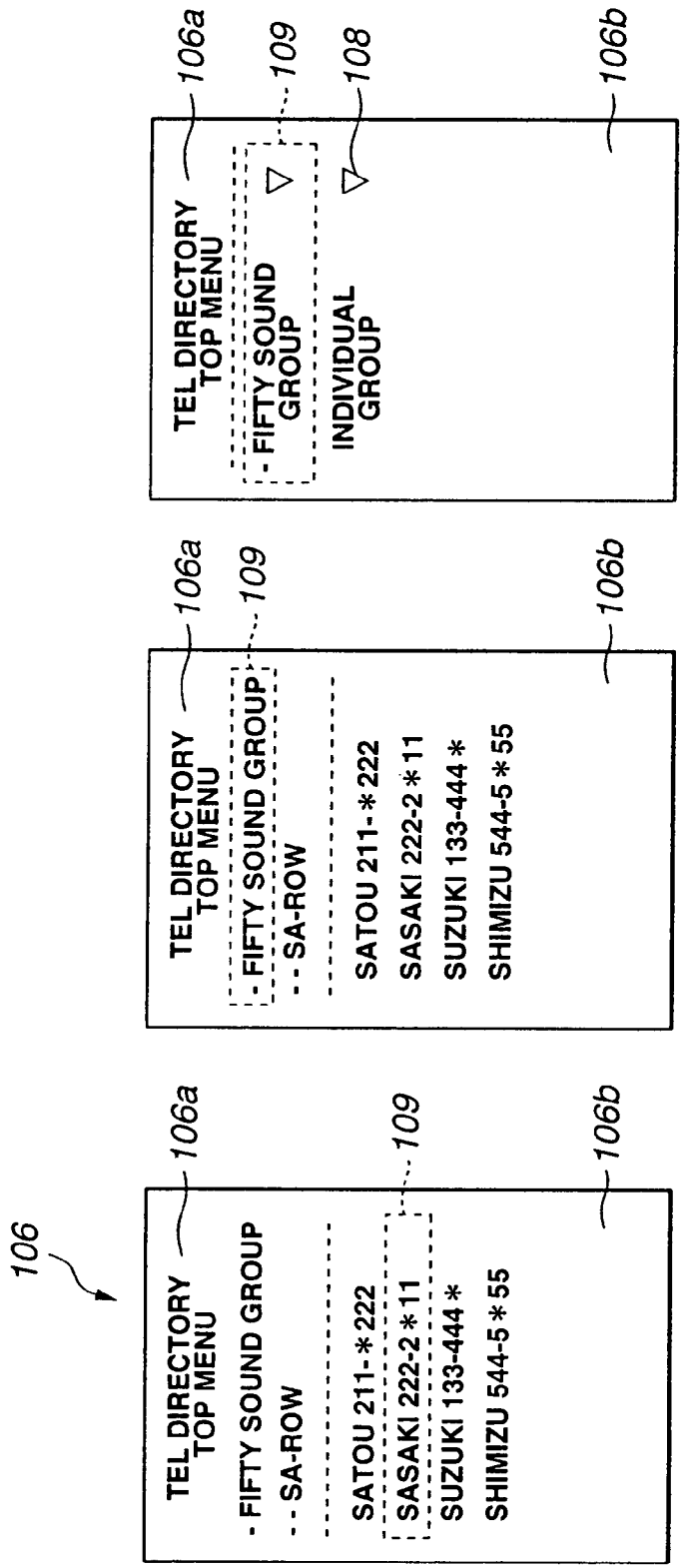

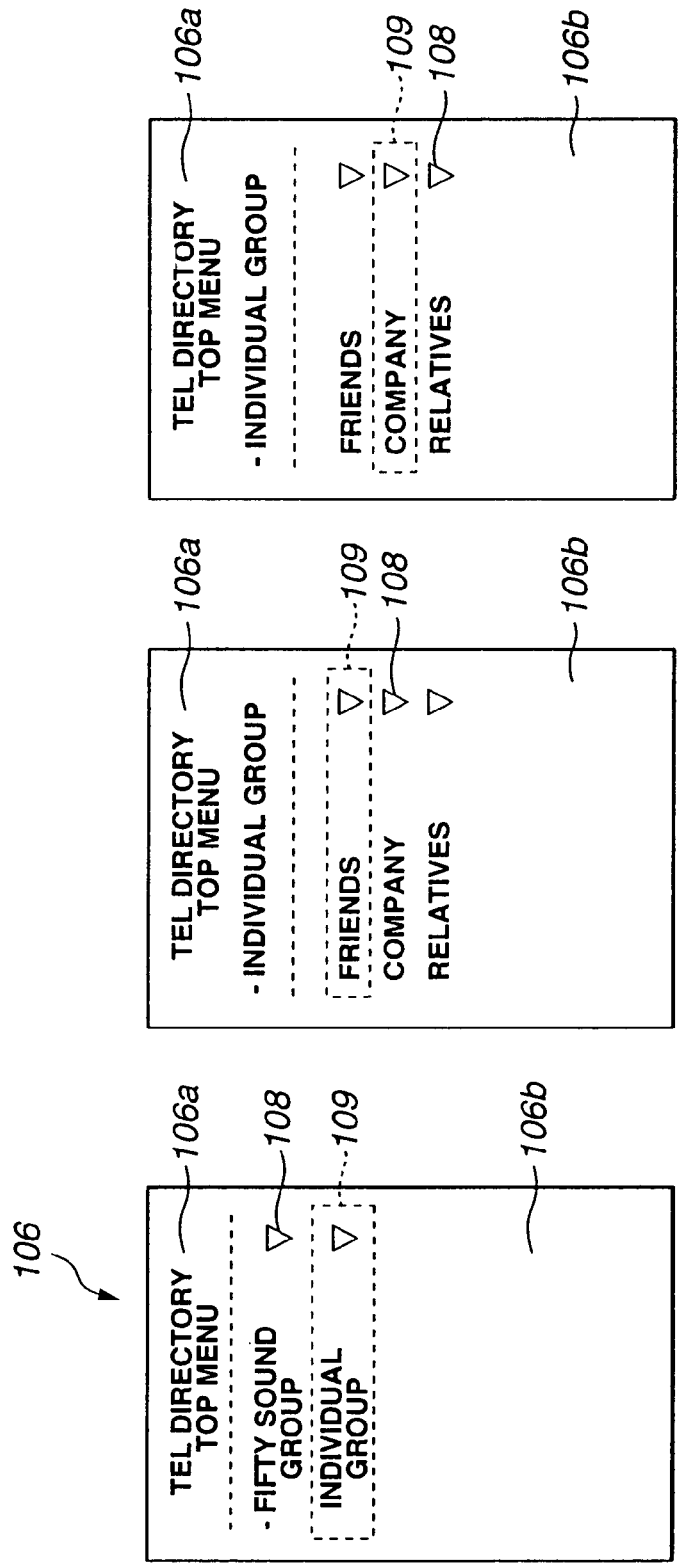

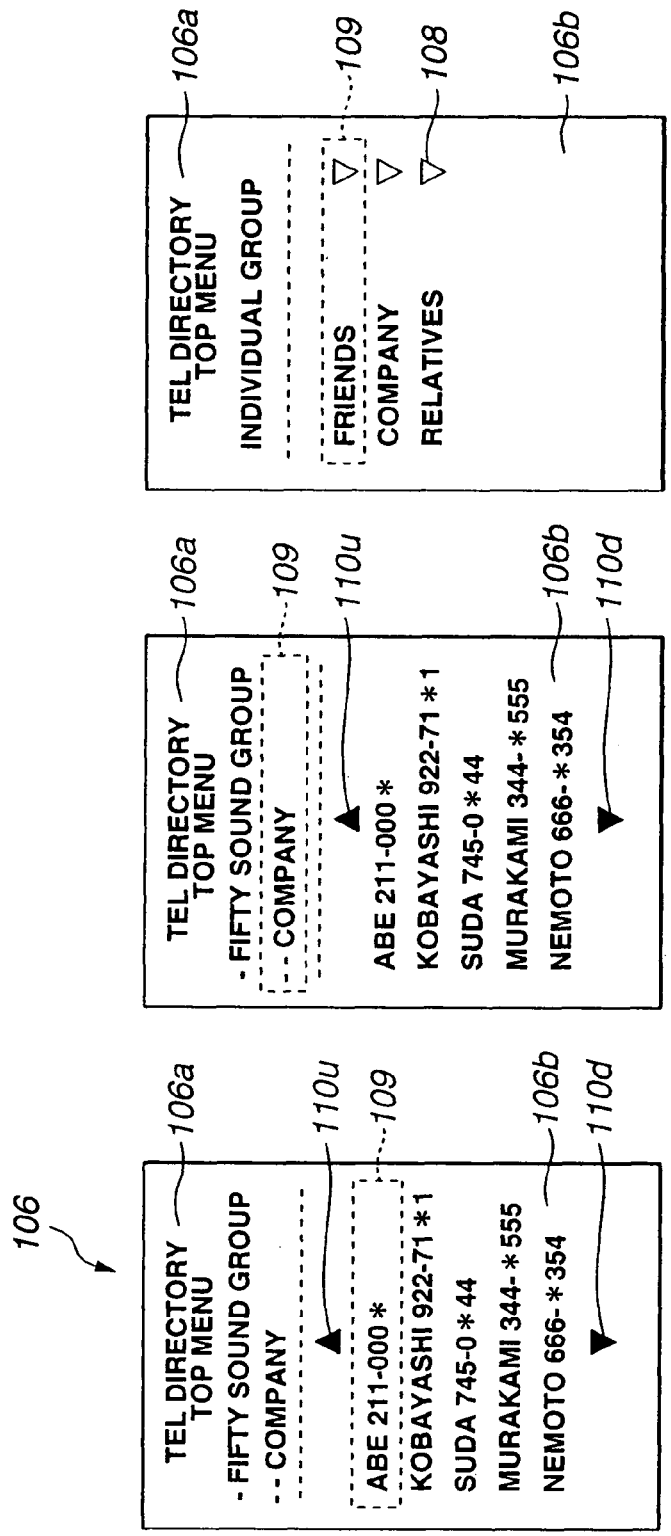

INFORMATION PROCESSING METHOD AND APPARATUS AND INFORMATION PROCESSING PROGRAM

This is a continuation of application Ser. No. 10/169,428, filed Nov. 29, 2002, now abandoned which is based on International Application PCT/JP01/09300 filed Oct. 23, 2001, pursuant to 35 USC 371, and is entitled to the priority filing date of Japanese application 2000-333572 filed in Japan on Oct. 31, 2000, the entirety of which is incorporated herein by reference.

TECHNICAL FIELD

This invention relates to an information processing method and apparatus for carrying out preset processing, based on an information processing program, and to the information processing program.

BACKGROUND ART

Among small-sized portable information processing apparatuses, such as a portable telephone set or a personal digital assistant, there are those provided with jog dials, as uniaxially controlled user interface devices, for improving one-hand tractability or simplifying the operating sequence.

For example, an operating menu for an equipment employing the jog dial, such as a portable telephone set, enables extremely simple menu operations, such as decision making operation, brought about by rotation and thrusting of the jog dial.

On the other hand, in an operating system (OS) for a personal computer (PC) or a personal digital assistant (PDA), typified by Windows95 (registered trademark) or Window98 (registered trademark) manufactured by Microsoft Company, USA, there is a menu interface traced by a random hierarchical structure termed 'menu'. There is also an interface which is not the menu and which is comprised of tree and list views, in a transverse layout, as a basic interface of a file system. The 'Explorer Window' of the Windows manufactured by Microsoft Inc., USA, is of this type of the interface. By these means, it is possible to specify the current position in a tree structure or to directly revert to an optional hierarchical layer.

Meanwhile, if, in the above-mentioned operating menu, provided with the jog dial, the menu itself has a hierarchical structure, it is not possible to represent a particular position of the tree structure, such that a user finds it difficult to locate the position in the menu in the course of control. Additionally, when tracing back through hierarchical layers, it is only possible to return to the top menu or to the directly previous hierarchical layer, meaning only insufficient operating flexibility that can be offered to the user.

Moreover, in the above-mentioned operating system (OS), there are a menu interface traced by a random hierarchical structure termed 'menu' and an interface comprised of a horizontal array of tree or list view. These interfaces, however, may not be said to be optimum as an interface for a vertically elongated casing for a hand-held portable telephone set, or as an interface for a portable equipment that is in need of a vertically elongated display panel, since these interfaces necessarily use a display of a certain transverse width due to their structural constraints.

DISCLOSURE OF THE INVENTION

It is therefore an object of the present invention to provide an information processing method and apparatus and an information processing program, having an operating menu system of a hierarchical structure employing a user interface device, in which it is possible to represent the current hysteresis layer.

It is another object of the present invention to provide an information processing method and apparatus and information processing program, in which the hysteresis hierarch itself becomes a part of a menu and focus may be shifted to revert to a particular past hierarchical layer.

It is yet another object of the present invention to provide a an information processing method and apparatus and information processing program, in which plural menu items may be cyclically shown in the current menu or the letter string of the focused menu may be scrolled on the display unit to enable suppression of the transverse width of the menu itself.

For accomplishing these objects, the present invention provides an information processing apparatus including operating means, display means for displaying an item as an object of selection which employs the operating means, and for hierarchically displaying the hysteresis information relevant to display of the item and control means for controlling the display and selection of the item in the display means and hierarchical display and selection of the hysteresis information.

This information processing apparatus operates responsive to selection employing the operating means to display the hysteresis information, in distinction from the item, by tracing from the past until the present, on the display means, under control by the control means.

This enables the current hierarchical layer to be represented in an operating menu system of a hierarchical structure for a user interface device which is uni-axially controlled using e.g., a jog dial.

Moreover, the hierarchical layer itself becomes a part of the menu in the meaning that reversion to a specified past layer becomes possible by moving the focus to and deciding on the layer.

Moreover, the transverse width of the menu itself may be prevented from increasing by e.g., the scrolling of the letter string of the focused menu. Consequently, the present invention may be applied with advantage not only to PC application software but to a product that is in need of a vertically elongated casing or display panel, such as a portable telephone device.

The present invention also provides an information processing method including an item and hysteresis displaying step of displaying an item as an object of selection employing an operating unit in a display unit and of hierarchically displaying the hysteresis information relevant to the display of the item in the display unit, and a control step of controlling the display and selection of the item and the hierarchical display and selection of the hysteresis information by the item and hysteresis displaying step.

The present invention also provides an information processing program executed by an information processing apparatus and which includes an item and hysteresis displaying step of displaying an item as an object of selection employing an operating unit in a display unit and of hierarchically displaying the hysteresis information relevant to the display of the item in the display unit, and a control step of controlling the display and selection of the item and the hierarchical display and selection of the hysteresis information by the item and hysteresis displaying step.

BRIEF DESCRIPTION OF THE DRAWINGS

FIGS. 43A to 43C show a first display instance in the display unit of the portable telephone set.

FIGS. 44A to 44C show a second display instance in the display unit of the portable telephone set.

FIGS. 45A to 45C show a third display instance in the display unit of the portable telephone set.

FIGS. 46A to 46C show a fourth display instance in the display unit of the portable telephone set.

FIGS. 47A to 47C show a fifth display instance in the display unit of the portable telephone set.

FIGS. 48A to 48C show a sixth display instance in the display unit of the portable telephone set.

BEST MODE FOR CARRYING OUT THE INVENTION

Figure 1:
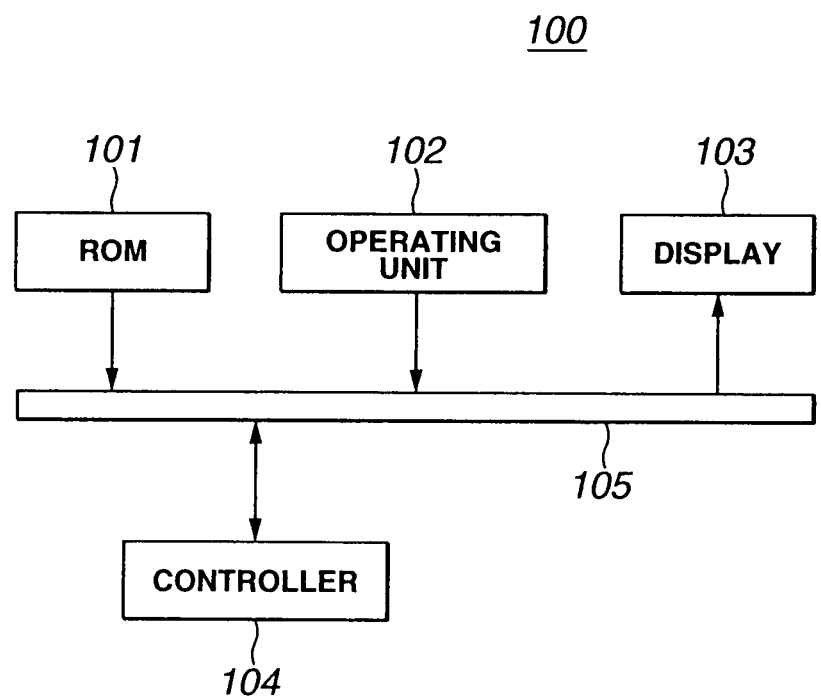
FIG. 1 is a block diagram showing an information processing apparatus of a first embodiment of the present invention.

Referring to the drawings, certain preferred embodiments of the present invention will be explained in detail.

A first embodiment is now explained by referring to FIGS. 1 to 8. The first embodiment, shown in FIG. 1, is directed to an information processing device 100, which is adapted for executing a menu display program stored in a ROM 101, and which operates as a menu system. The information processing device 100 includes an operating unit 102, accepting the user's operation, a display unit 103 for demonstrating the image information in a preset display area, and a controller 104 for demonstrating the hysteresis information and the items of the current menu hierarchy in separation from each other in a display area on the display unit 103. The controller 104 is connected to a ROM 101, operating unit 102 and to the display unit 103 over a bus 105.

The menu display program represents a specified example of the information processing method of the present invention. The information processing method of the present invention demonstrates items of selection using the operating unit 102 in the display unit 103, while hierarchically demonstrating the hysteresis information pertinent to the display of the above items in the display unit 103 and controlling the hierarchical display and selection of the hysteresis information.

Figure 2:
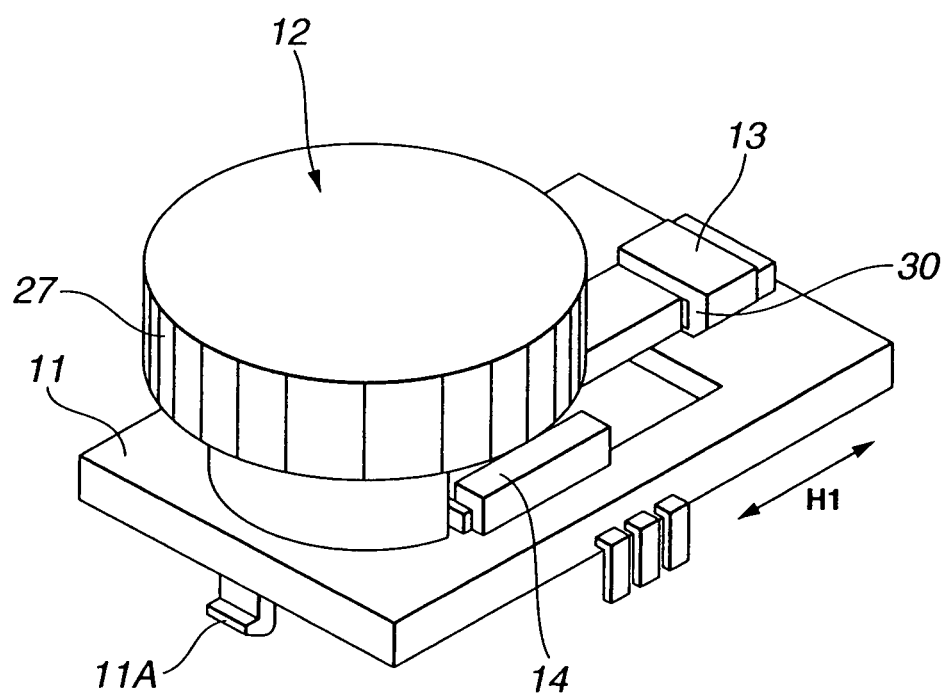
FIG. 2 illustrates a jog dial.

For the operating unit 102, a jog dial, operating as a uniaxial control user interface device, is used. When rotated or thrust, the jog dial shifts a cursor on the display unit 103 and decides on items through which the cursor is moved. Referring to FIG. 2, the jog dial includes a rotary encoder 12 and a push switch 13, mounted on a contact mounting substrate 11. When rotated, the rotary encoder 12 shifts the cursor to selectively highlight the menu items. The rotary encoder 12 is adapted for being slid within a preset range in the horizontal direction along a movement guide rail 14. The push switch 13 is fixed and detects the thrusting of the rotary encoder 12 in a direction indicated by arrow H1 to issue a 'decision' command. The push switch 13 has an actuating button 30 facing the rotary encoder 12, which is a peripherally actuated type disc-shaped operating knob 27.

The display unit 103 is a liquid crystal device (LCD) and is used as an area for demonstrating the entire menu. However, due to size reduction of the overall device, limitations are imposed on the size of the display unit 103, as indicated in FIG. 4ff.

The controller 104 causes the hysteresis information of the operating menu from the past to the present, as later explained, to be displayed vertically in a display area on the display 103 in separation from the items of the current menu hierarchy, responsive to the actuation on the operating unit 102.

Figure 3:
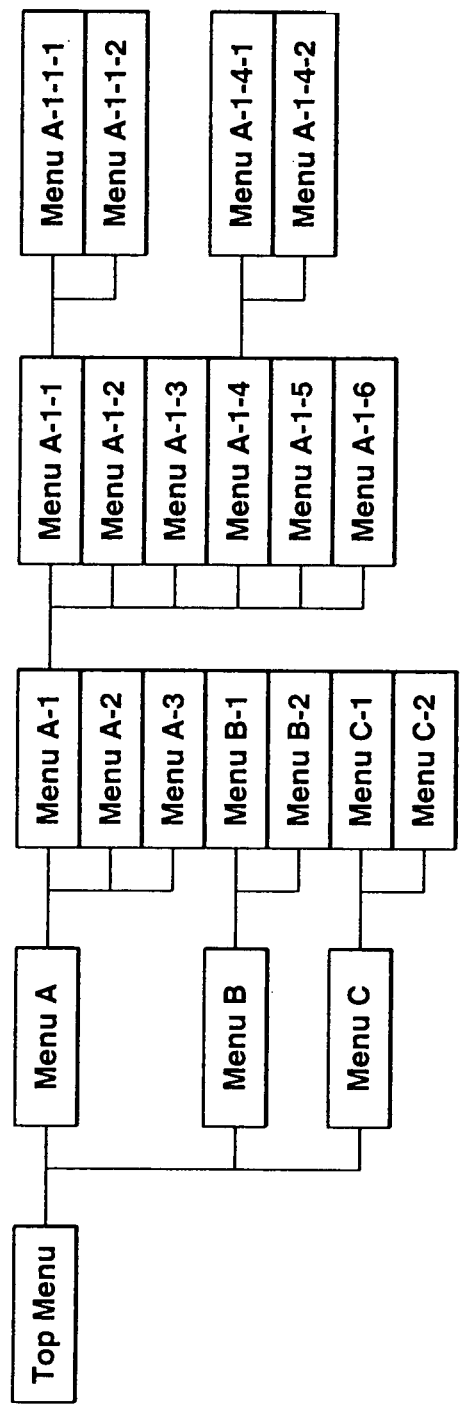
FIG. 3 is a transition diagram of a menu system under which the information processing apparatus operates.

FIG. 3 shows the structure of a menu system when the information processing device 100 operates as it executes the above-mentioned menu display program. The top menu 'Top Menu' transfers to, for example, three menus, that is a [menu A 'Menu A'], a [menu B "Menu B"] and a [menu C "Menu C"]. The [menu A "menu A"] transfers to a [menu A-1 "Menu A-1"], a [menu A-2 "Menu A-2"] and to a [menu A-3 "Menu A-3"]. The [menu A-1 "Menu A-1"] transfers to a [menu A-1-1 "Menu A-1 -1"], a [menu A-1-2 "Menu A-1-2"], a [menu A-1-3 "Menu A-1-3"], a [menu A-1-4 "Menu A-1-4"], a [menu A-1-5 "Menu A-1-5"], and to a [menu A-1-6 "Menu A- 1-1-6"]. Of these, the [menu A-1-1 "Menu A-1-1"] further transfers to a a [menu A-1-1-1 "Menu A-1-1-1"] and to a [menu A-1-1-2 "Menu A-1-1-2"], while the [menu A-1-4 "Menu A-1-4"] further transfers to a [menu A-1-4-1 "Menu A-1-4-1"] and to a [menu A-1-4-2 "Menu A-1-4-2"].

The [menu B "menu B"] transfers to a [menu B-1 "Menu B-1"] and to a [menu B-2 "Menu B-2"], whilst the [menu C "menu C"] transfers to a [menu C-1 "Menu C-1"] and to a [*menu* C-2 "M*enu* C-2"].

Figure 4:
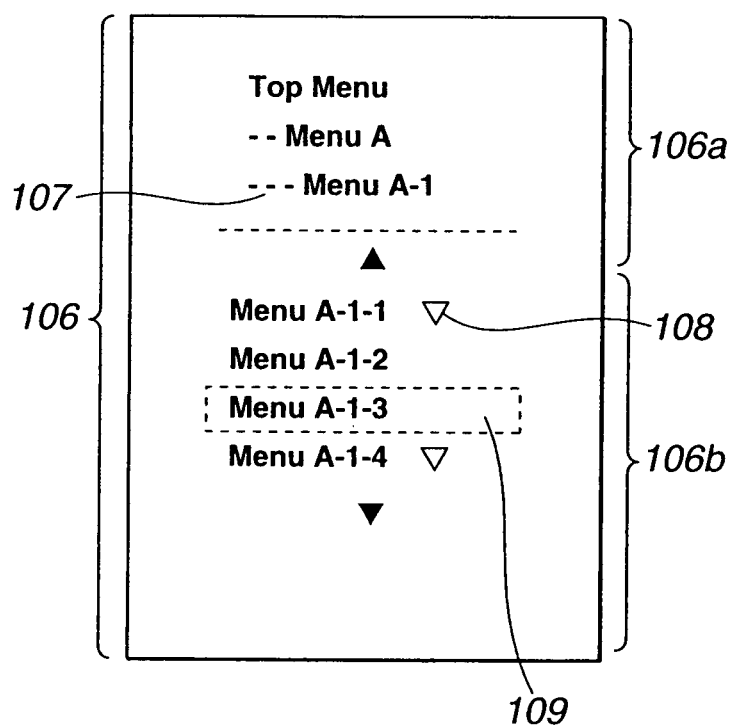
FIG. 4 is a first view for illustrating menu display on a display unit of the information processing apparatus.

FIG. 4 shows a display instance in an entire menu display area 106 on the display unit 103 of the information processing device 100 operating as the menu system shown in FIG. 3.

This entire menu display area 106 is divided into a hysteresis hierarchical menu area 106a and a current menu area 106b.

The hysteresis hierarchical menu area 106a is such an area in which the hysteresis information from the hysteresis from the past operations up to the current hierarchy is displayed, responsive to the actuation on the operating unit 102, and in which the user's selective operation is carried out with the use of the operating unit 102. As the hierarchy increases, the row is enhanced, from e.g., the [top menu "Top Menu"], [ . . . menu A-1 " . . . Menu A-1"], with the current layer [menu A-1 "Menu A-1"] being demonstrated in the lowermost layer. It is noted that indents or marks 107 denote that the structure specified is a hierarchical structure. On movement and selection by the operating unit 102, reversion may be made directly to the hierarchy, as will be explained subsequently.

A current menu area 106b denotes an item of the current menu hierarchy. If a menu has a lower order item or items, the menu has a folder mark 108.

Responsive to actuation on the operating unit 102, a cursor 109 demonstrated in the entire menu display area 106 is seamlessly moved through the hysteresis hierarchical menu area 106a and the current menu area 106b, as will be explained subsequently. The cursor is also moved continuously across the uppermost menu in the hysteresis hierarchical menu area 106a and the lowermost menu in the current menu area 106b.

The cursor 109 is moved responsive to rotational operation of the jog dial, which is the operating unit 102 (input device). As the cursor 109 is moved, the menu selected by the 'decision' command associated with the thrusting of the jog dial is executed by the controller 104. The menu item, focused on movement of the cursor 109, enlarges the letter font. If the appellation of the menu item is long, it is demonstrated as it is scrolled on selection.

Figure 5:
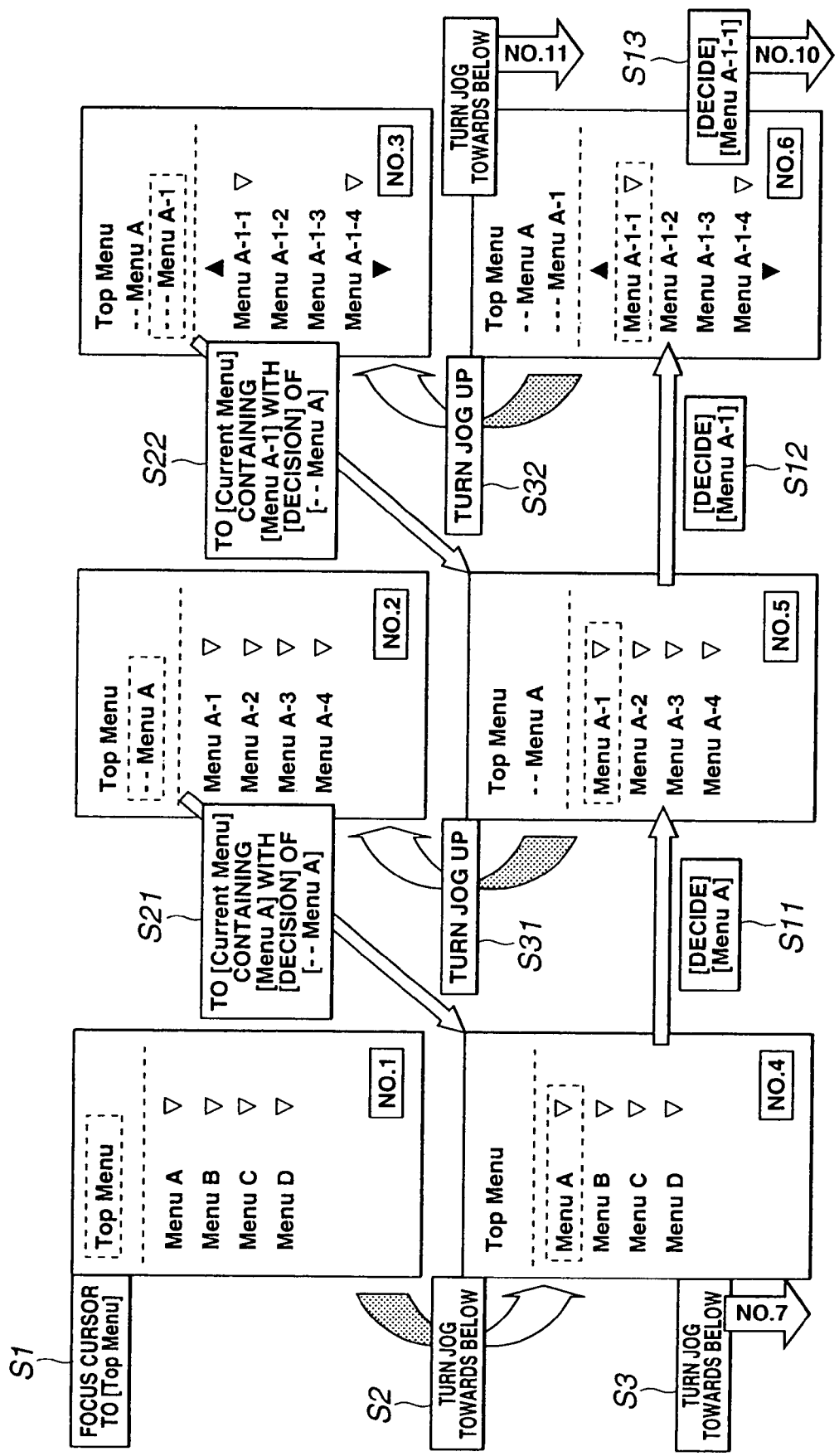
FIG. 5 is a first transition diagram in a specified instance of the menu display.
Figure 6:
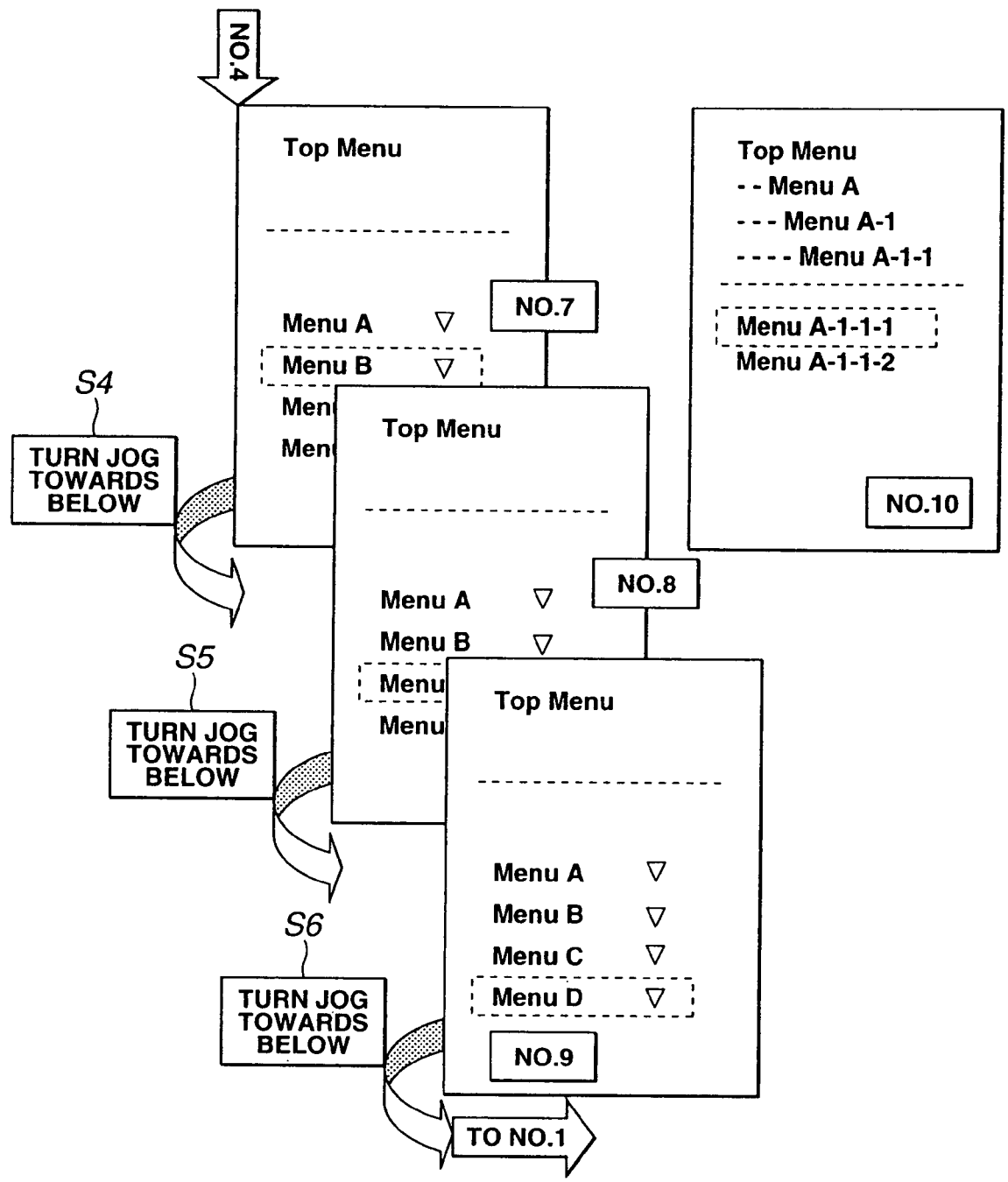
FIG. 6 is a second transition diagram in a specified instance of the menu display.

Referring to FIGS. 5 and 6, specified instances of the aforementioned seamless cursor movement, selection and display of the menu of the lower hierarchy and direct reversion up to the selected hierarchy, in case of employing a jog dial, indicated here as the jog dial 102, are hereinafter explained.

First, a specified instance of the seamless cursor movement is explained. The cursor 109 is initially focused in the [top menu 'Top Menu"] demonstrated in the hysteresis hierarchical menu area 106a of the entire menu display area, indicated No.1 (step 1) in FIG. 5. It is noted that the entire menu display area is hereinafter referred to as No.# depending on the changing states. If, as the cursor 109 is focused in this manner on the [top menu 'Top Menu"], the jog dial is thrust to make 'decision', this menu display is in the non-displaying state.

In the No.1 current menu area 106b, four menus, namely [menu A "Menu A"], [menu B "Menu B"], [menu C "Menu C"], [menu D "Menu D"] are demonstrated with respective folder marks 108. If the jog dial 102 is turned downwards (step 2), the cursor 109 is moved to the [menu A "Menu A"] of the No. 4 current menu area 106b. If, at step S3, the jog dial 102 is turned downwards, the cursor 109 is moved to the [menu B "Menu B"] of the No. 7 current menu area 106b shown in FIG. 6. If the jog dial 102 is turned downwards at steps S4 and S5, the cursor 109 is moved to the [menu C "Menu C"] and to the [menu D "Menu D"] of the No. 8 and No. 9 current menu areas 106b, respectively. If the jog dial 106 is further turned downwards at step S6, the cursor 109 is moved to the [top menu "Top Menu"] in the No. 1 hysteresis hierarchical menu area 106a shown in FIG. 5. The cursor 109 lying on the [menu A-1 "Menu A-1"] of the four menus, namely the [menu A-1 "Menu A-1"], [menu A-2 "Menu A-2"], [menu A-3 "Menu A-3"] and [menu A-4 "Menu A-4"], displayed in the current menu area 106b as shown at No.5, is moved to the [ . . . menu A " . . . Menu A"] in the No.2 hysteresis hierarchical menu area 106a, by turning the jog dial 102 upwards (step S31). On the other hand, the cursor 109 lying on the [menu A-1-1 "Menu A-1-1"] of the four menus, namely the [menu A-1-1 "Menu A-1-1"], [menu A-1-2 "Menu A-1-2 "], [menu A-1-3 "Menu A-1-3 "] and [menu A-1-4 "Menu A-1-4"], displayed in the menu area 106b as shown at No.6, is moved to the [ . . . menu A-1 " . . . Menu A-1"] in the No.3 hysteresis hierarchical menu area 106a by turning the jog dial 102 upwards (step S32).

A specified instance of selection and display of the menu of the lower hierarchy responsive to the actuation of the jog dial 102 is now explained. If, with the entire menu display area in the No. 4 state, the [menu A "Menu A"] of the current menu area 106b is decided on responsive to rotation and thrusting of the jog dial 102 (step S11), the hysteresis information [ . . . menu A " . . . Menu A"] testifying to the selection of the [menu A "Menu A"] is displayed in the hysteresis hierarchical menu area 106a, as shown at No. 5. In the current menu area 106b, the four menus, namely the [menu A-1 "Menu A-1"], [menu A-2 "Menu A-2"], [menu A-3 "Menu A-3"] and the [menu A-4 "Menu A-4"] of the lower hierarchical layers are displayed with respective folder marks 108. If, in this state of No. 5, the [menu A-1 "Menu A-1"] of the current menu area 106b is decided on responsive to rotation and thrusting of the jog dial 102 (step S12), the hysteresis information testifying to selection of the [menu A-1 "Menu A-1"] is demonstrated, as shown at No. 6, in the hysteresis hierarchical menu area 106a as [ . . . menu A-1 " . . . Menu A-1"] newly entered below

[menu A-1 "Menu A-1"]. In the current menu area 106b, the [menu A-1-1 "Menu A-1-1"], [menu A-1-2 "Menu A-1-2"], [menu A-1-3 "Menu A-1-3"] and [menu A-1-4 "Menu A-1-4"], as lower hierarchical layers of the [menu A-1 "Menu A-1"], are displayed. For the [menu A-1-1 "Menu A-1-1"] and the [menu A-1-4 "Menu A-1-4"], there are attached folder marks 108 indicating that there are further lower hierarchical layers. If, in this state of No. 6, the [menu A-1-1 "Menu A-1-1"] of the current menu area 106b is decided on responsive to rotation and thrusting of the jog dial 102 (step S13), the hysteresis information testifying to selection of the [menu A-1-1 "Menu A-1-1"] is demonstrated, in the hysteresis hierarchical menu area 106a, as [ . . . [menu A-1-1 " . . . Menu A-1-1"] newly entered below [ . . . menu A-1 " . . . Menu A-1"], as shown at No. 10 of FIG. 6. In the current menu area 106b, the [menu A-1-1-1 "Menu A-1-1-1"] and [menu A-1-1-2 "Menu A-1-1-2 "], as lower hierarchical layers of the [menu A-1-1 "Menu A-1-1 "], are displayed.

A specified instance of direct reversion to the selected hierarchical layer is now explained. In No. 2, the [ . . . menu A-1 " . . . Menu A-1"] is displayed below [top menu "Top Menu"] of the hysteresis hierarchical menu area 106a, as the hysteresis information testifying to the selection of the [menu A "Menu A"]. In the current menu area 106b, the [menu A-1 "Menu A-1"], [menu A-2 "Menu A-2"], [menu A-3 "Menu A-3"] and the [menu A-4 "Menu A-4"] as lower hierarchical layers are displayed with folder marks 108. If, from this state (No. 2), the [ . . . menu A " . . . Menu A"] displayed in the hysteresis hierarchical menu area 106a is decided on by the rotation and thrusting of the jog dial 102 (step S21), the entire menu display area displays the current menu area 106b including [menu A "Menu A"], as at No. 4. In No. 3, [ . . . menu A-1 " . . . Menu A-1"], is displayed below [ . . . menu A "Menu A"] of the hysteresis hierarchical menu area 106a, as the hysteresis information testifying to the selection of the [menu A-1 "Menu A-1"]. In the current menu area 106b, the [menu A-1-1 "Menu A-1-1"], [menu A-1-2 "Menu A-1-2"], [menu A-1-3 "Menu A-1-3"] and [menu A-14 "Menu A-1-4"], as lower hierarchical layers, are displayed. If, from this state (No. 3), the [ . . . menu A-1 " . . . Menu A-1"] displayed in the hysteresis hierarchical menu area 106a is decided on by the rotation and thrusting of the jog dial 102 (step S22), the entire menu display area displays the current menu area 106b including [menu A-1 "Menu A-1"], as at No. 5.

Figure 7:
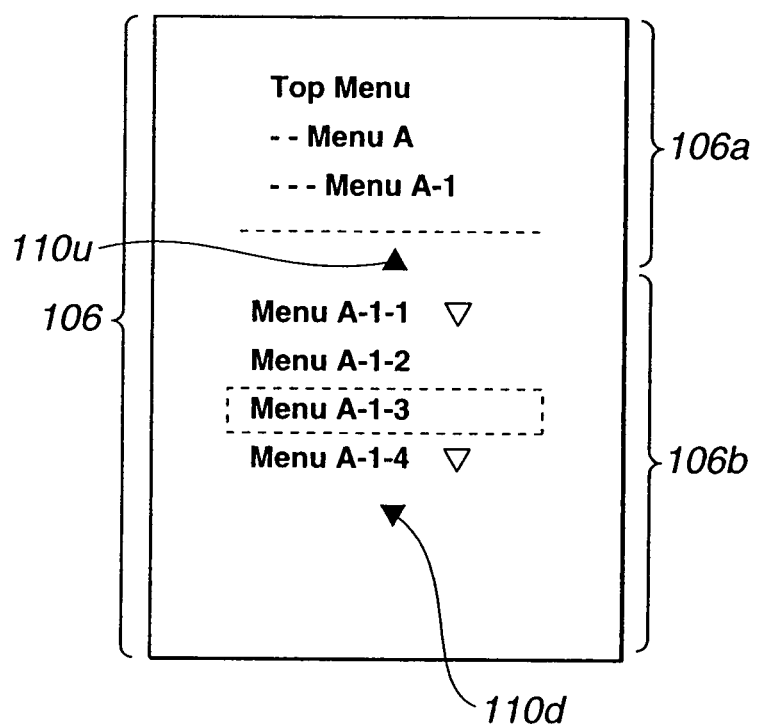
FIG. 7 is a second view for illustrating menu display on a display unit of the information processing apparatus.

FIG. 7 shows another display instance in the entire menu display area 106 on the display unit 103 of the information processing device 100. In this other display instance, a list up button 110u and a list down button 110d are indicated in the current menu area 106b. The list up button 110u and the list down button 110d are displayed for indicating the presence of hidden menu items only when the menu has a fixed vertical width and the menu items are not accommodated in the display simultaneously. In the case of FIG. 7, it is indicated that there exist other menus than the [menu A-1-1 "Menu A-1-1"], [menu A-1-2 "Menu A-1-2 "], [menu A-1-3 "Menu A-1-3"] and the [menu A-1-4 "Menu A-1-4"], for example, [menu A-1-5 "Menu A-1-5"] and the [menu A-1-6 "Menu A-1-6"].

If commands for uninterrupted vertical movement are issued from the jog dial 102 in the current menu area 106b where there are displayed the list up button 110u/list down button 110d, a focus 10d by scroll 109 is moved up to a mid point of the current menu area 106b and, if the mid point is surpassed, the list begins and continues to scroll, as later explained.

Also, the list up button 110u/list down button 110d is emphatically displayed if a command is issued for vertical movement with the jog dial 102, by way of feedback to the user's actuation. This emphatic representation is particularly effective when the list itself is scrolled.

Figure 8:
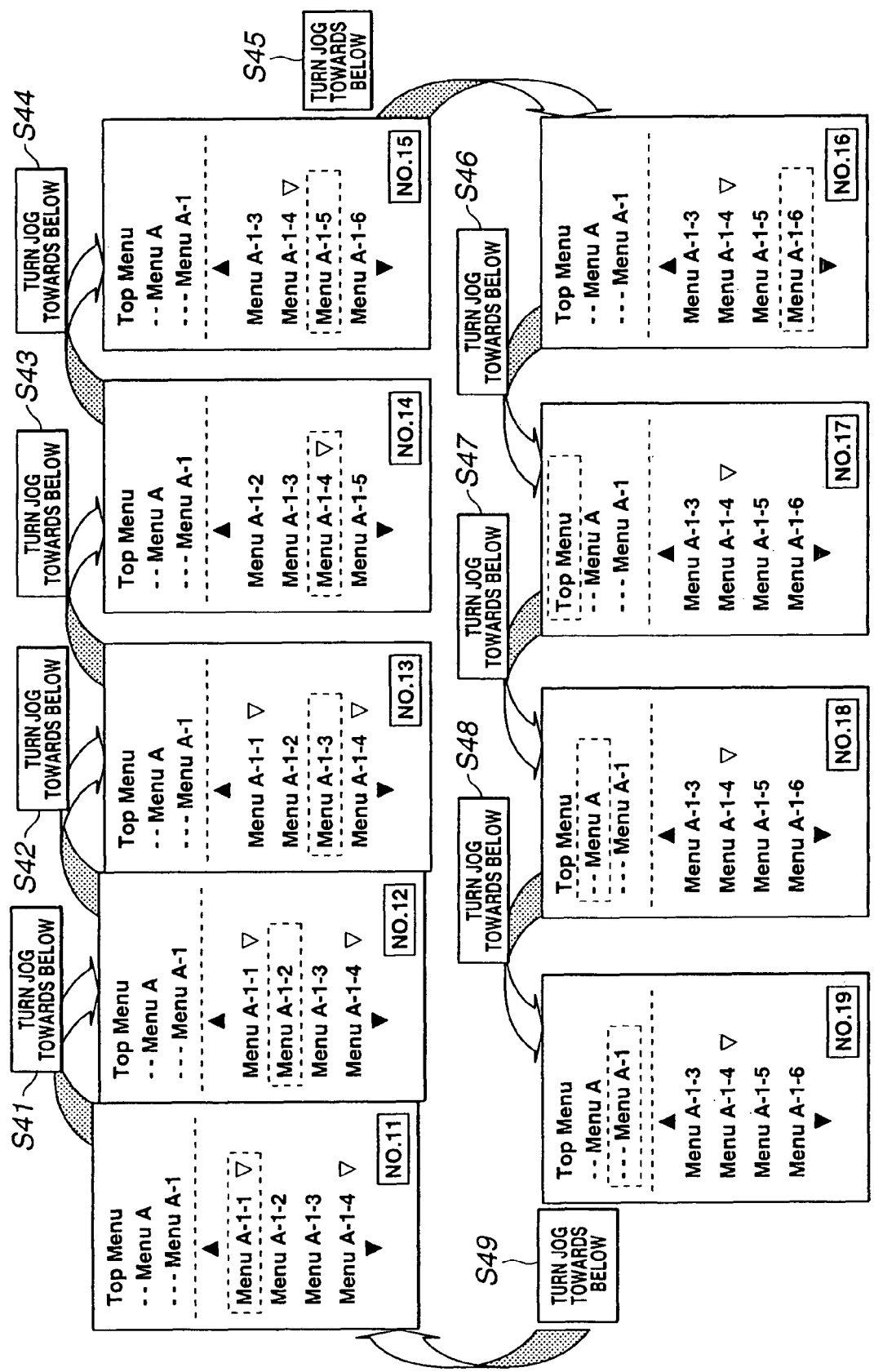
FIG. 8 is a third transition diagram in a specified instance of the menu display.

Referring to FIG. 8, a specified instance for menu display responsive to the command from the jog dial 102 in an area defined by the list up button 110u and the list down button 110d is explained.

First, in the current menu area 106b of No. 11, the [menu A-1-1 "Menu A-1-1"], [menu A-1-2 "Menu A-1-2"], [menu A-1-3 "Menu A-1-3 "] and the [menu A-1-4 "Menu A-1-4 "] are displayed between the list up button 110u and the list down button 110d. These are lower hierarchical layer menus with respect to the [menu A-1 "Menu A-1"] lying in the hysteresis hierarchical menu area 106a. There are also other lower hierarchical layer menus of the [menu A-1 "Menu A-1"], such as [menu A-1-5 "Menu A-1-5"] or the [menu A-1-6 "Menu A-1-6"]. In No. 11, the cursor 109 is focused to the [menu A-1-1 "Menu A-1-1"]. If the jog dial 102 is turned downwards (step S41), the cursor 109 is moved to the [menu A-1-2 "Menu A-1-2 "] lying below the [menu A-1-1 "Menu A-1-1"], as indicated in the current menu area 106b of No. 12. If the jog dial 102 is further turned downwards (step S42), the cursor 109 is moved to the [menu A-1-3 "Menu A-1-3 "] lying below the [menu A-1-2 "Menu A-1-2"], as indicated at No. 13.

If the jog dial 102 is further turned downwards (step S43), the cursor 109 is not moved and the [menu A-1-4 "Menu A-1-4"] lying below the [menu A-1-3 "Menu A-1-3"] is moved to the position of the cursor 109, as indicated at No. 14. At this time, the [menu A-1-1 "Menu A-1-1"] between the list up button 110u and the list down button 110d vanishes and the [menu A-1-5 "Menu A-1-5"] is displayed anew. If the jog dial 102 is further turned downwards (step S44), the [menu A-1-5 "Menu A-1-5"] lying below the [menu A-1-4 "Menu A-1-4"] is moved to a position of the cursor 109, as indicated at No. 15. At this time, the [menu A-1-3 "Menu A-1-3"] to the [menu A-1-6 "Menu A-1-6"] are displayed between the list up button 110u and the list down button 110d. If the jog dial 102 is further turned downwards (step S45), the cursor 109 is moved to the [menu A-1-6 "Menu A-1-6"] lying below the [menu A-1-5 "Menu A-1-5"], as indicated at No. 16. The [menu A-1-6 "Menu A-1-6"] lies at the trailing end of the lower hierarchical layer menu of the [menu A-1 "Menu A-1"] lying in turn between the list up button 110u and the list down button 110d. If the jog dial 102 is further turned downwards (step S46), the cursor 109 exits the current menu area 106b to shift to the [top menu "Top Menu"] displayed in the hysteresis hierarchical menu area 106a, as indicated at No.17. If the jog dial 102 is further turned downwards at steps S47 and S48, the cursor 109 is moved to the [ . . . menu A "Menu A"], [ . . . menu A-1"Menu A-1"] displayed in the hysteresis hierarchical menu area 106a, as indicated at No.18 and No.19, respectively. If the jog dial 102 is turned downwards at step S49, the cursor 109 is shifted to the [menu A-1-1 "Menu A-1-1"] of the current menu area 106b, as indicated at No.11.

Thus, in the information processing device 100 shown in FIG. 1, in which the current hysteresis hierarchical layer in the menu is represented by hierarchically representing the menus selected responsive to the rotating and thrusting movements of the jog dial 102, it becomes possible to assist the user in comprehending the menu structure and to promote ease in learning the operating sequence. Additionally, such a function may be provided which allows to return to a specified past layer, thus enhancing the operating flexibility that can be offered to the user.

Figure 9:
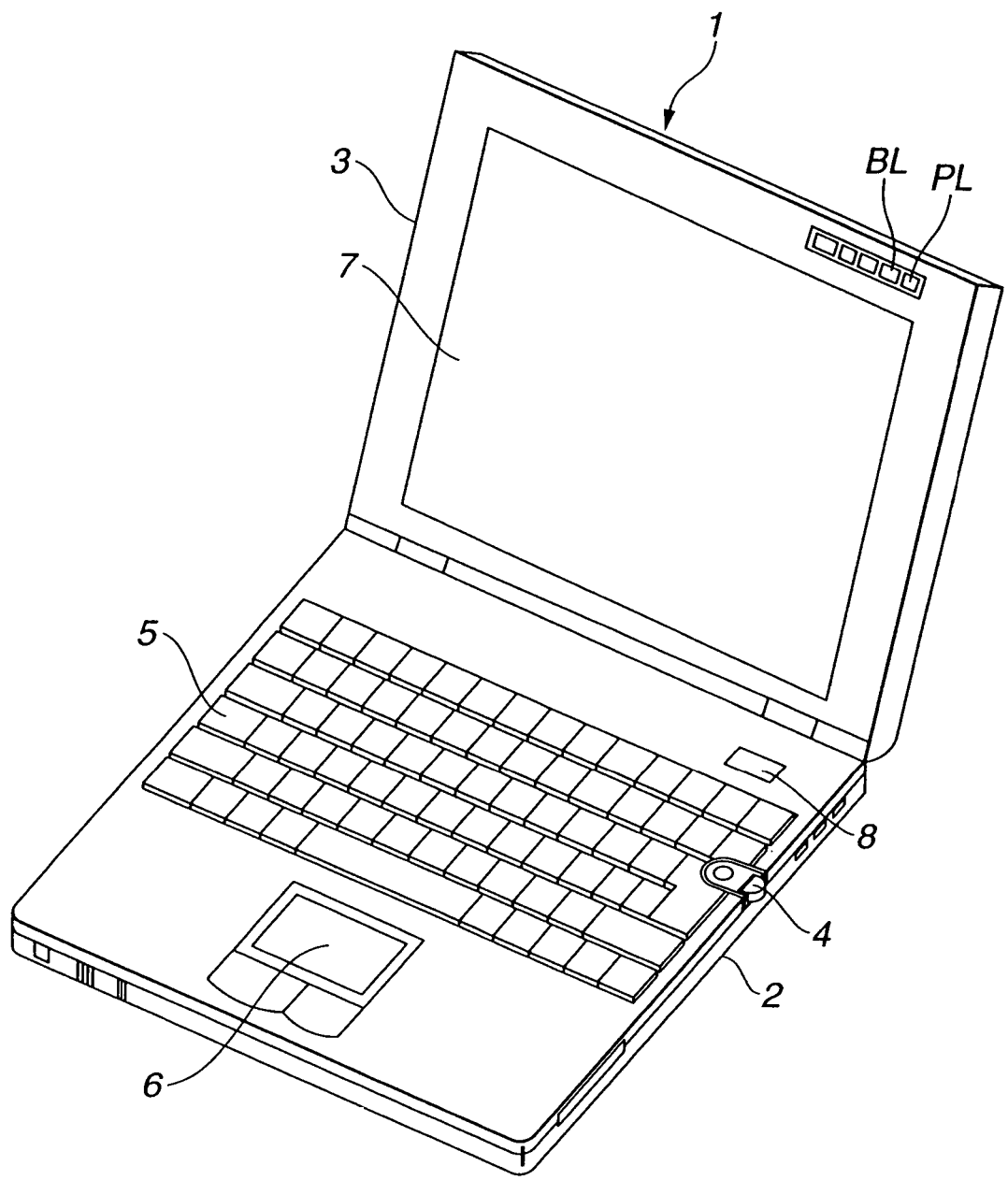
FIG. 9 is a perspective view showing a notebook computer of a second embodiment of the present invention.

A second embodiment, directed to a notebook personal computer, the appearance of which is shown in FIG. 9, is now explained. This notebook personal computer 1 is basically made up by a main body unit 2 and a display unit 3 that may be opened or closed with respect to the main body unit 2. The main body unit 2 of the notebook personal computer has, on its upper surface, a keyboard 5, acted on when inputting various letters or symbols, a touch pad 6, as a pointing device, acted on in shifting the mouse cursor, and a power supply switch 8.

On the front surface of the display unit 3, there is provided an LCD (Liquid Crystal Display) 7 for displaying an image. On a right upper side of the display unit 3, there are provided a power supply lamp PL, a battery lamp BL, a message lamp ML and other lamps, such as LEDs, as necessary.

Figure 10:
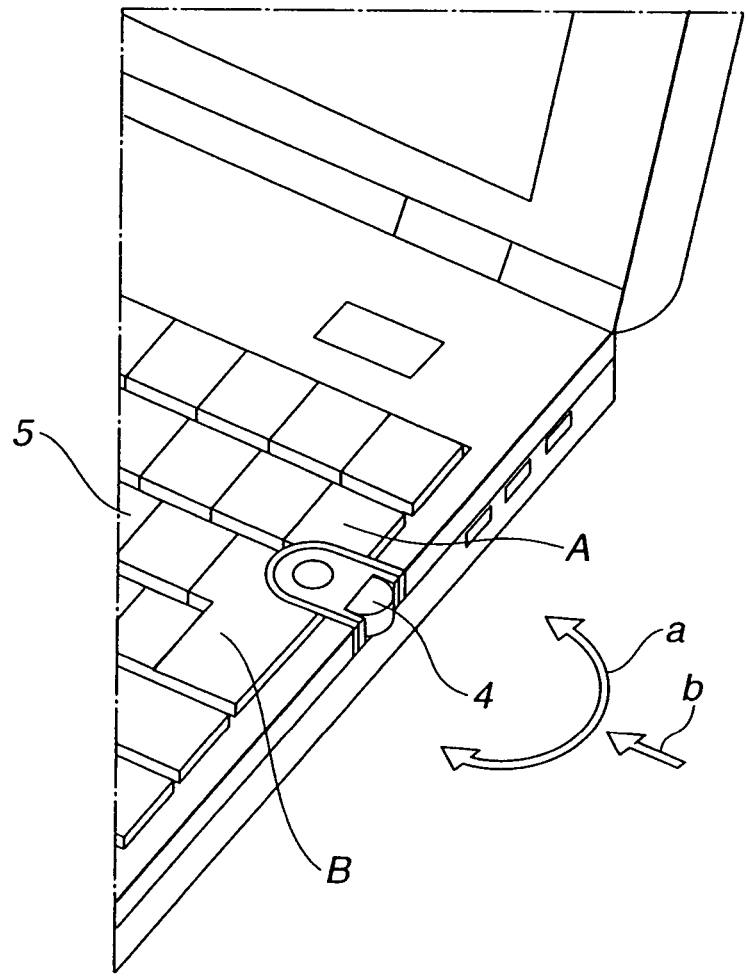
FIG. 10 is an enlarged view showing the jog dial mounted on the notebook computer of FIG. 9 and its vicinity.

Between keys A and B (right hand side keys) on the main body unit 2, there is mounted a jog dial 4. This jog dial 4 is mounted on the same level as that of the keys A and B, as shown in FIG. 10. The jog dial 4 executes preset processing operations, in association with the rotational and translational movements indicated by arrows a and b, respectively as shown in FIG. 10, This jog dial 4 may, of course, be mounted on the left hand side of the main body unit 2. The jog dial may also be arranged at a mid portion on the front surface of the main body unit to permit manipulation of the jog dial with the thumb finger as the touch pad 6 is manipulated with the index finger. The jog dial may also be provided on the left or right side edge of the touch pad 6 carrying the LCD 7. The jog dial may also be arranged longitudinally along the left or right sides of the touch pad 6. The jog dial may also be arranged transversely along the upper or lower edge of the touch pad 6, or longitudinally between the right and left buttons of the touch pad 6. The jog dial may also be arranged longitudinally between G and H keys of the keyboard 5. The jog dial may also be arranged at an optional angle in such a direction as to permit facilitated manipulation with representing fingers without limitations to the longitudinal or transverse mounting direction. The jog dial may also be arranged at such a position as to permit manipulation with a thumb finger on the lateral side of the mouse as a pointing device.

Figure 11:
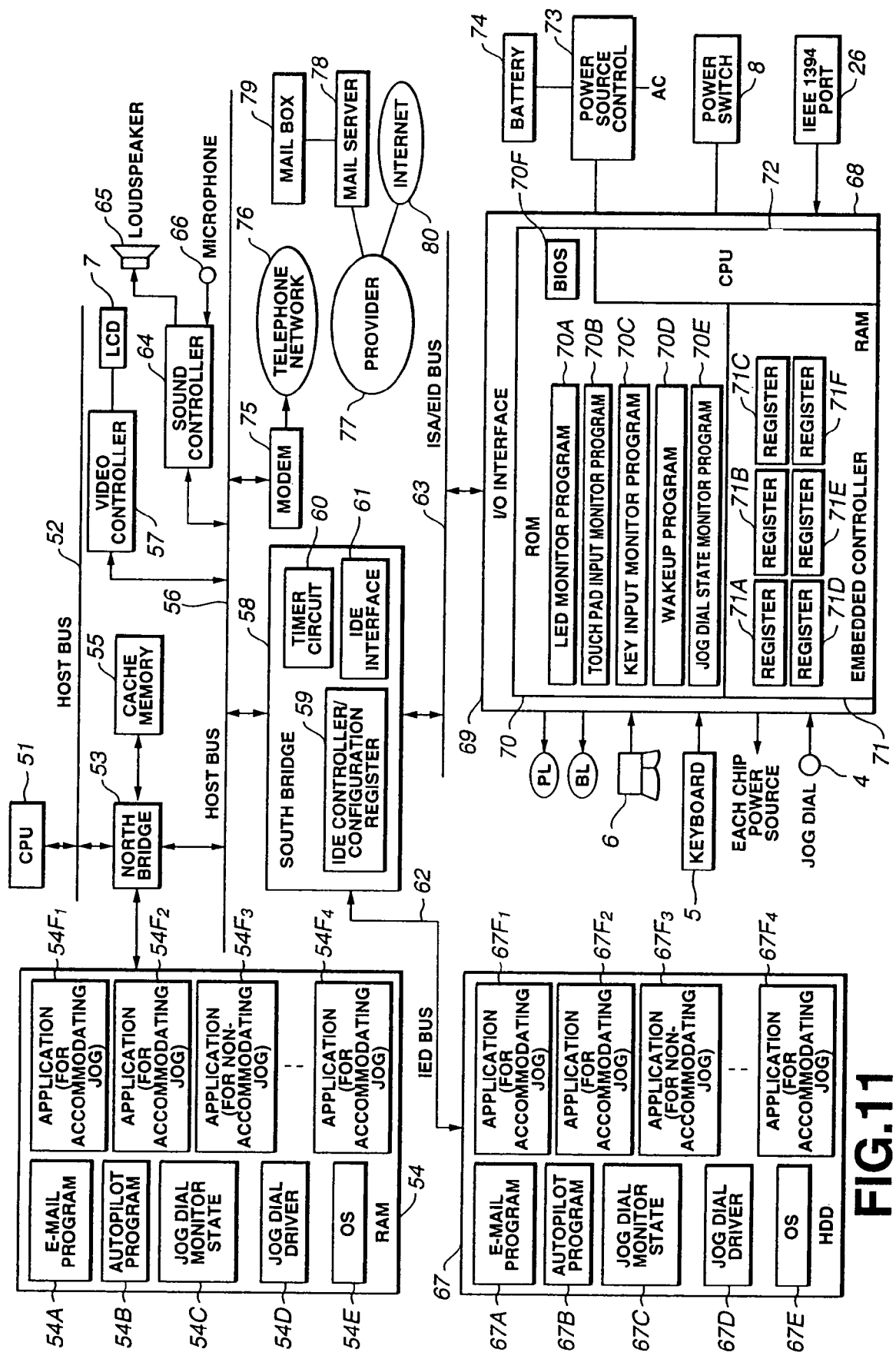
FIG. 11 shows an electrical structure of the notebook computer of FIG. 9.

An illustrative electrical structure of the notebook personal computer 1 is explained with reference to FIG. 11. The CPU (Central Processing Unit) 51 is formed by e.g., a Pentium (trademark) processor manufactured by Intel Company and is connected to a host bus 52. To the host bus 52 is also connected a Northbridge 53 which also is connected to a PCI bus 56. The Northbridge 53 is formed by e.g., 400BX manufactured by Intel Company and is configured for controlling the CPU 51 or a main memory 54. Meanwhile, the Northbridge 53 and a Southbridge 58, as later explained, constitute a so-called chip set.

The Northbridge 53 is also connected to a main memory 54 and a cache memory 55. The cache memory 55 is adapted for caching data used by the CPU 51. The CPU 51 also has a primary cache memory enclosed therein, although such cache memory is not shown.

The main memory 54 is made up by, for example, a DRAM (dynamic Read Only memory), and is adapted for storing a program executed by the CPU 51 or data required for operation of the CPU 51. Specifically, at a time point of end of booting, an E-mail program 54A, an autopilot program 54B, a jog dial status monitoring program 54C, a jog dial driver 54D, an operating program (OS) 54E and other application programs 54F1 to 54Fn are transferred to and stored in the main memory 54.

It should be noted that this notebook personal computer 1 fetches a map viewer software program 54F1 from the HDD 67 for execution. The information processing method of the present invention is applied in particular to this program as an application program 54F1 adapted for coping with the jog dial. Among specified examples of the map viewer software program, there is the Navin' You (trademark) as a map displaying tool for demonstrating the current position based on GPS. As for details of this Naving' You, reference is had to an Internet home page with the URL of http://vaio.sony.co.jp/software/NavinYou/top.html. In sum, this Navin' You is such a software which allows to manipulate a map with a realistic visual sense and a perspective feeling, by representing the intersections or indications approaching towards the user in keeping with car movement, as if the user is looking from above, to add to the conventional planar map display. The height of flight can be adjusted freely by a preset operation, and high speed scrolling is possible by simply advancing the pointer in a desired bearing. So, the user's operation in car driving may be likened to manipulation of an aircraft.

Figure 12:
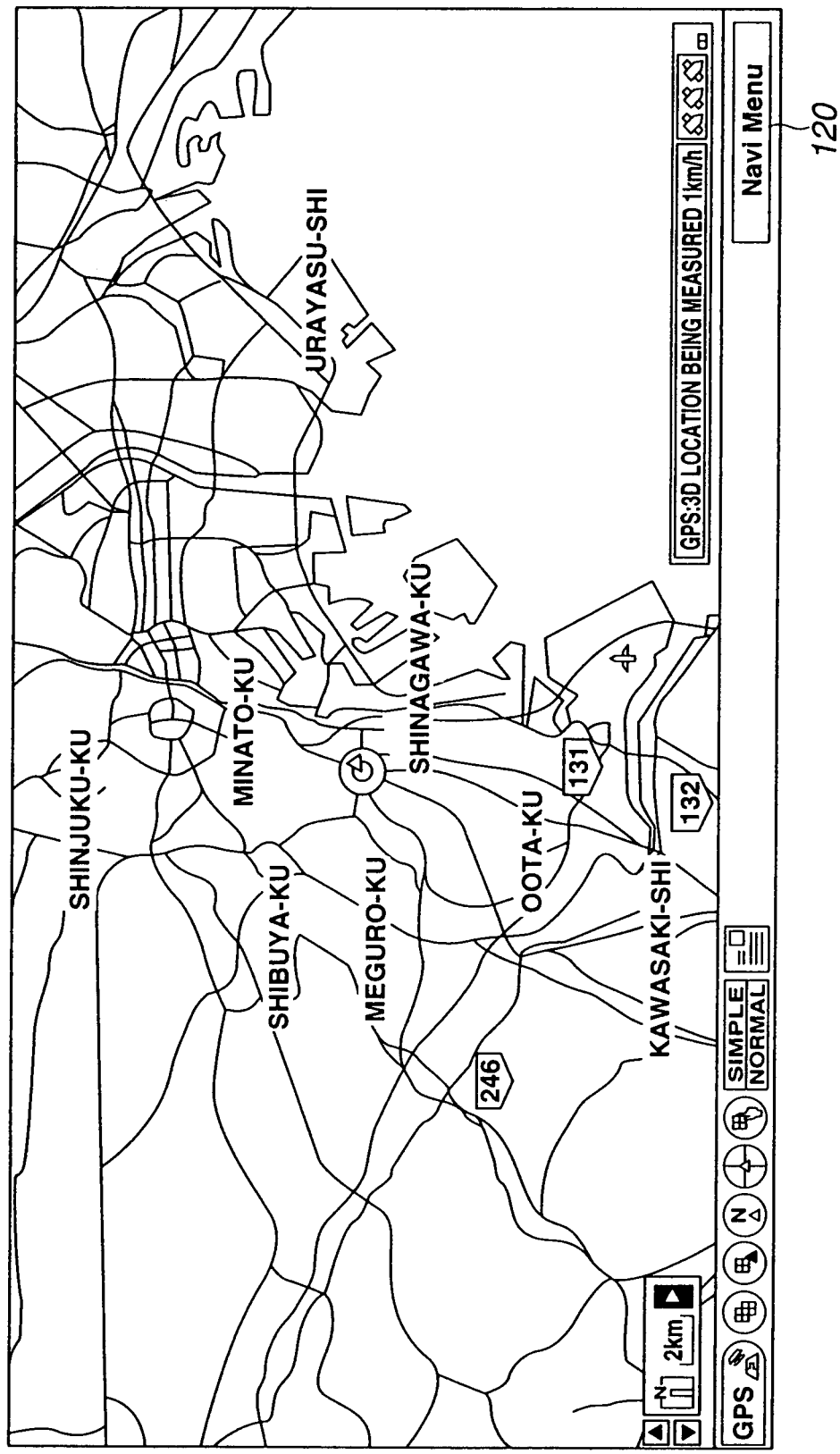
FIG. 12 shows a first exemplary display on an LCD in the notebook computer of FIG. 9.
Figure 13:
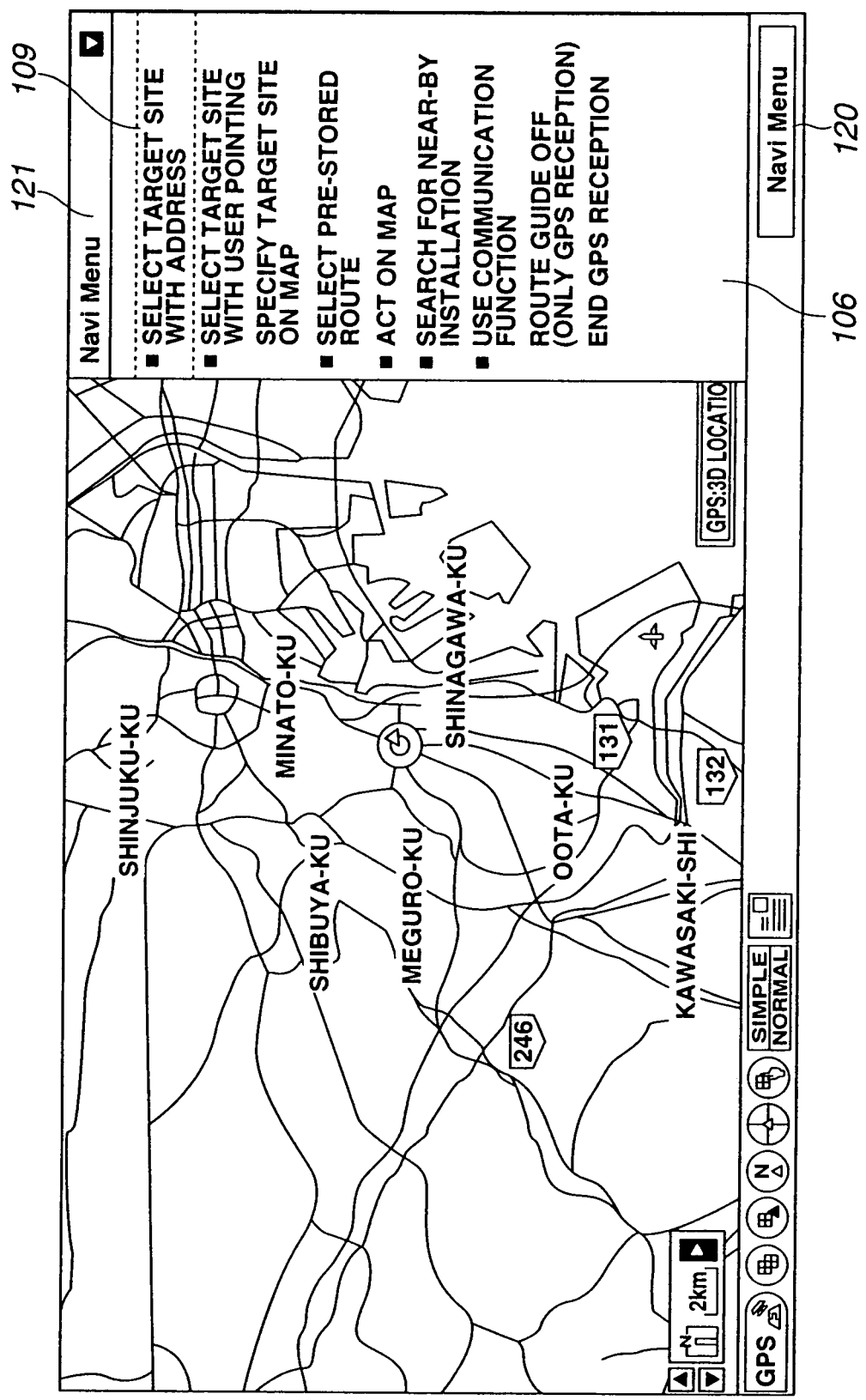
FIG. 13 shows a second exemplary display on an LCD in the notebook computer.

In this map view program, the map is displayed on the LCD 7 as shown in FIG. 12ff. It is necessary to prevent the map displaying area from being hidden to more than a necessary extent, without enlarging the display area, despite the fact that a menu display area is demonstrated in hierarchical layers. An operational instance for this case will be explained subsequently in detail.

The E-mail program 54A is a program for receiving/sending a communication message over a communication network, such as telephone network 76, through a modem 75, as later explained. The E-mail program 54A has an oncoming mail acquisition function, as a specified function. This oncoming mail acquisition function checks to see whether or not a mail addressed to the user, if any, is left in a mail box 79 of a mail server 78 formed in the provider 77, and acquires such mail.

The autopilot program 54B sequentially boots a plural number of preset processing operations or programs in a preset order for executing the processing operations.

The OS (basic program software) 54E, typified by Windows 95 (trademark), Window 98 (trademark) of Microsoft Company or MAC OS of Apple Computer Company (trademark), controls the rudimentary operations of a computer.

The jog dial status monitoring program 54C receives a notice from the above respective applications as to whether or not the jog dial can be accommodated while operating for indicating what can be done on actuating the jog dial 4 if the jog dial can be accommodated. Usually, the jog dial status monitoring program 54C is awaiting an event of the jog dial 4, and has a list for receiving the notice from an application. The jog dial driver 54D executes various functions responsive to actuation of the jog dial 4.

A video controller 57 is also connected to the PCI bus 56 and is adapted for controlling the display of the LCD 7 on the display unit 3 based on the data supplied over the PCI bus 56.

A sound controller 64, connected to the PCI bus 56, captures an input from the microphone 66, or sends speech signals to the loudspeaker 65. The modem 75 is also connected to the PCI bus 56. The modem 75 may be connected to a communication network 80, such as Internet, or to a mail server 78, over a public telephone network 76 of an Internet service provider 77.

The Southbridge 58, also connected to the PCI bus 56, is formed by, for example, P11X4E of Intel Company to control variegated I/O (input/output) devices. That is, the Southbridge 58 is constituted by an IDE (Integrated Drive Electronics) controller/configuration register 59, a timer circuit 60 and by an IDE interface 61, to control the devices connected to the IDE bus 62 or those connected over e.g., an ISA/EIO (Industry Standard Architecture/Extended Input Output) bus 63 and an embedded controller 68.

The IDE controller/configuration register 59 is made up by two IDE controllers, that is by a so-called primary IDE controller and a secondary IDE controller, not shown, and by a configuration register, also not shown.

The primary IDE controller is connected over IDE bus 62 to a connector, not shown, and an HDD 67 is connected to the connector. To the secondary IDE controller, a connector of a bay device, which is a so-called IDE device, exemplified by a CD-ROM drive, not shown, a second HDD or FDD, also not shown, is adapted for being connected electrically when such pay device is mounted in position.

In the HDD 67, there are stored, in addition to an E-mail program 67A, an autopilot program 67B, a jog dial state monitor program 67C, a jog dial driver 67D and an OS (basic program software) 67E, an application program 67F1, which is the aforementioned map viewer software program, and a plural number of application softwares 67Fn. These programs 67A to 67E and 67F1 to 67Fn in the HDD 67 are sequentially transmitted to and stored in the RAM 54 during the boot-up process.

To the ISA/EIO bus 63, there is additionally connected an embedded controller 68, comprised of a micro-computer and which is used as an I/O controller. That is, the embedded controller 68 is comprised of an interconnection of an I/O interface 69, a ROM 70, a RAM 71 and CPU 72.

In the ROM 70, an LED control program 70A, a touchpad input monitor program 70B, a key input monitor program 70C, a wake-up program 70D and a jog dial state monitor program 70E are pre-stored.

The LED control program 70A is a program for controlling the on/off of a power supply battery lamp PL, a battery lamp BL, a message lamp ML, as necessary, and other LED lamps. The touchpad input monitor program 70B is a program for monitoring the inputting from the touch pad 6 by the user. The key input monitor program 70C is a program for monitoring the inputting from the keyboard 5 or from other key switches. The wake-up program 70D is a program for checking whether or not the time is the preset time, based on the current time data supplied from a timer circuit 60 in the Southbridge 58, and for booting up the preset processing or program at the pre-set time by way of supervising respective chip power supply units.

The jog dial state monitor program 70E is a program for perpetually monitoring whether or not the rotary encoder 12 of the jog dial 4 has been rotated or pressed.

The ROM 70 also has recorded therein BIOS70F. The BIOS (Basic Input/Output System) is a software program controlling the data exchange (inputting/outputting) between the OS or the application software and peripheral equipment, such as display, keyboard or HDD.

The RAM 71 includes respective registers, such as LED control, touchpad input status, key input status and time setting registers, and I/O registers for monitoring the jog dial state, as registers 71A to 71F. For example, the register 71A, that is an LED control register 71A, controls the turning on of the message lamp ML, indicating the instantaneous boot-up state of the E-mail, as later explained, when the jog dial 4 is pressed. In the key input status register 71C, an operating key flag is stored when the jog dial 4 is thrust by way of performing a one-touch operation. The setting time register 71D is able to set an optional time point.

To the embedded controller 68, the jog dial 4, touchpad 6 and the keyboard 5 are connected via a connector, not shown, such that signals associated with respective operations on the jog dial 4, touchpad 6 and the keyboard 5 may be output over an ISA/EIO bus 63. To the embedded controller 68, there are connected the power supply battery lamp PL, battery lamp BL, message lamp ML and other LED lamps.

To the embedded controller 68, there is further connected a power supply control circuit 73. The power supply control circuit 73 is connected to an enclosed battery 74 or to an AC power supply to supply the power as necessary to the respective blocks, while performing control for charging the enclosed battery 74 or to secondary batteries of the peripheral devices. The embedded controller 68 also monitors the power supply switch 8 actuated when turning the power supply on or off.

The embedded controller 68 is able at all times to run the programs 70A to 70E, by an internal power supply even when the power supply 8 is off. That is, these programs are running at all times even if no windows are opened on the LCD 7 of the display unit 3. That is, even when the power supply 8 is off and the OS 54E is not booted in the CPU 51, the embedded controller 68 runs the jog dial state monitor program 70E at all times. In particular, if the notebook personal computer 1 is not provided with a dedicated key, the notebook personal computer 1 may be endowed with a programmable power key (PPK) function, although details are not shown, such that, even in the power saving state, or in power supply down state, the user's favorite software or script file may be booted on the user simply pressing the jog dial 4.

A few operating instances are hereinafter explained for the case of reading out the map view software program stored in the HDD 67 into the RAM 54 by the notebook personal computer 1 for execution on the map viewer software program 54F1. As these operating instances, display of a navigation menu (Navi menu [Navi Menu]), erasure of the navigation menu, destination setting by the navigation menu, change in the destination setting by the navigation menu and the scrolling processing by the navigation menu, are hereinafter explained with reference to FIGS. 12 and 13, FIGS. 14 and 15, FIGS. 16 to 24, FIGS. 25 to 31 and to FIGS. 32 to 40, respectively. The area which demonstrates the navigation menu, or the navigation menu display area 106, is equivalent to the aforementioned entire menu display area 106. This navigation menu display area 106 is classified into the hysteresis hierarchical menu area 106a and the current menu area 106b.

First, the display and erasure of the navigation menu are explained. If, from the map displaying state shown in FIG. 12, the cursor is moved with the touch pad 6 onto the [navi menu "Navi Menu"] represented on the right lower end, the click button is pressed. Alternatively, after the cursor is moved with a mouse, the right button is clicked. This demonstrates a navigation menu shown in FIG. 13. The navigation menu may also be adapted to be displayed in association with the rotation in the upward or downward rotation, the operation of pressing the jog dial 4 or with the operation of pressing the [upward arrow button] on the keyboard. The display of the navigation menu, that is the [navi menu "Navi Menu"] 121, is displayed in the hysteresis hierarchical menu area 106a.

Figure 14:
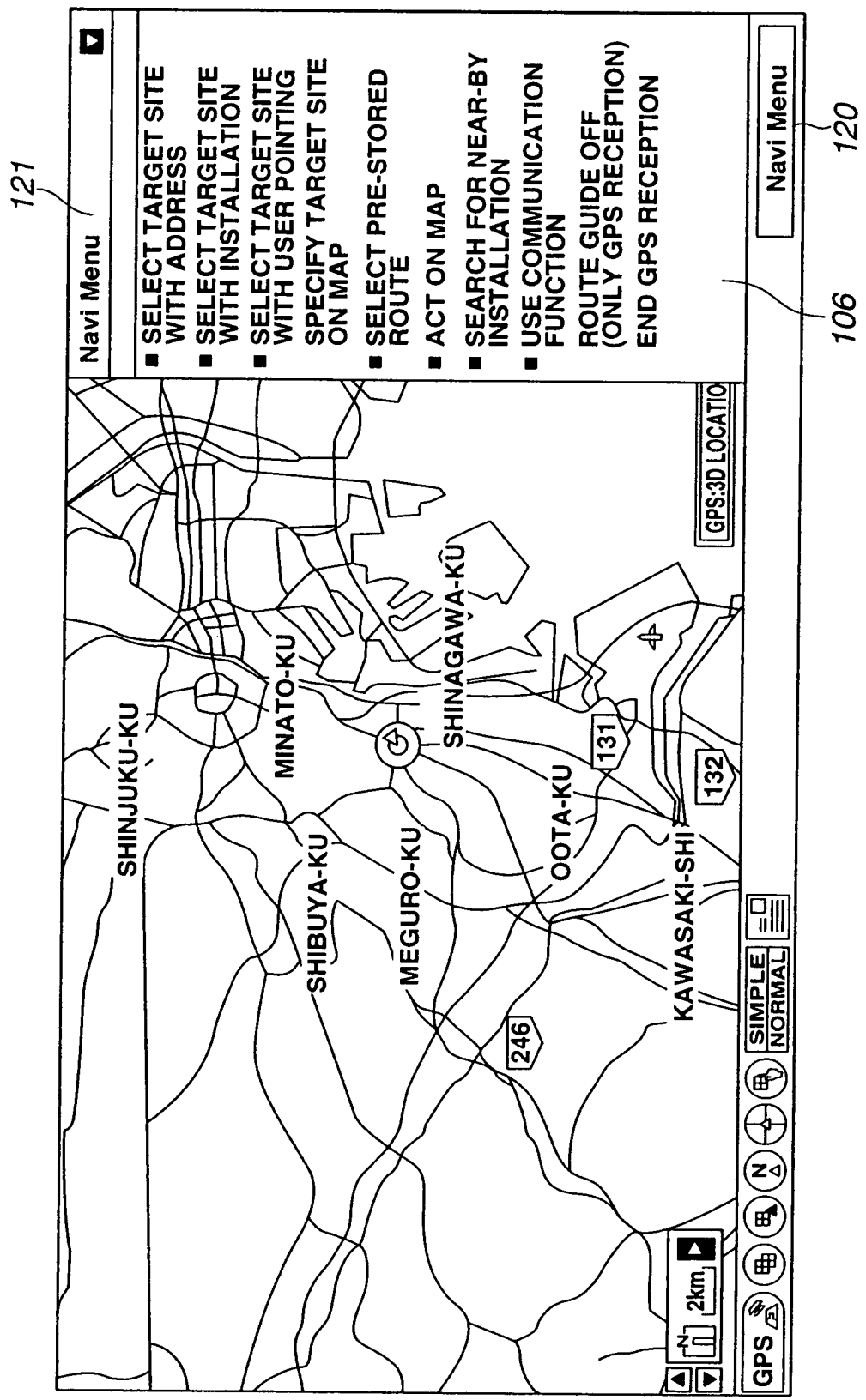
FIG. 14 shows a third exemplary display on an LCD in the notebook compute.
Figure 15:
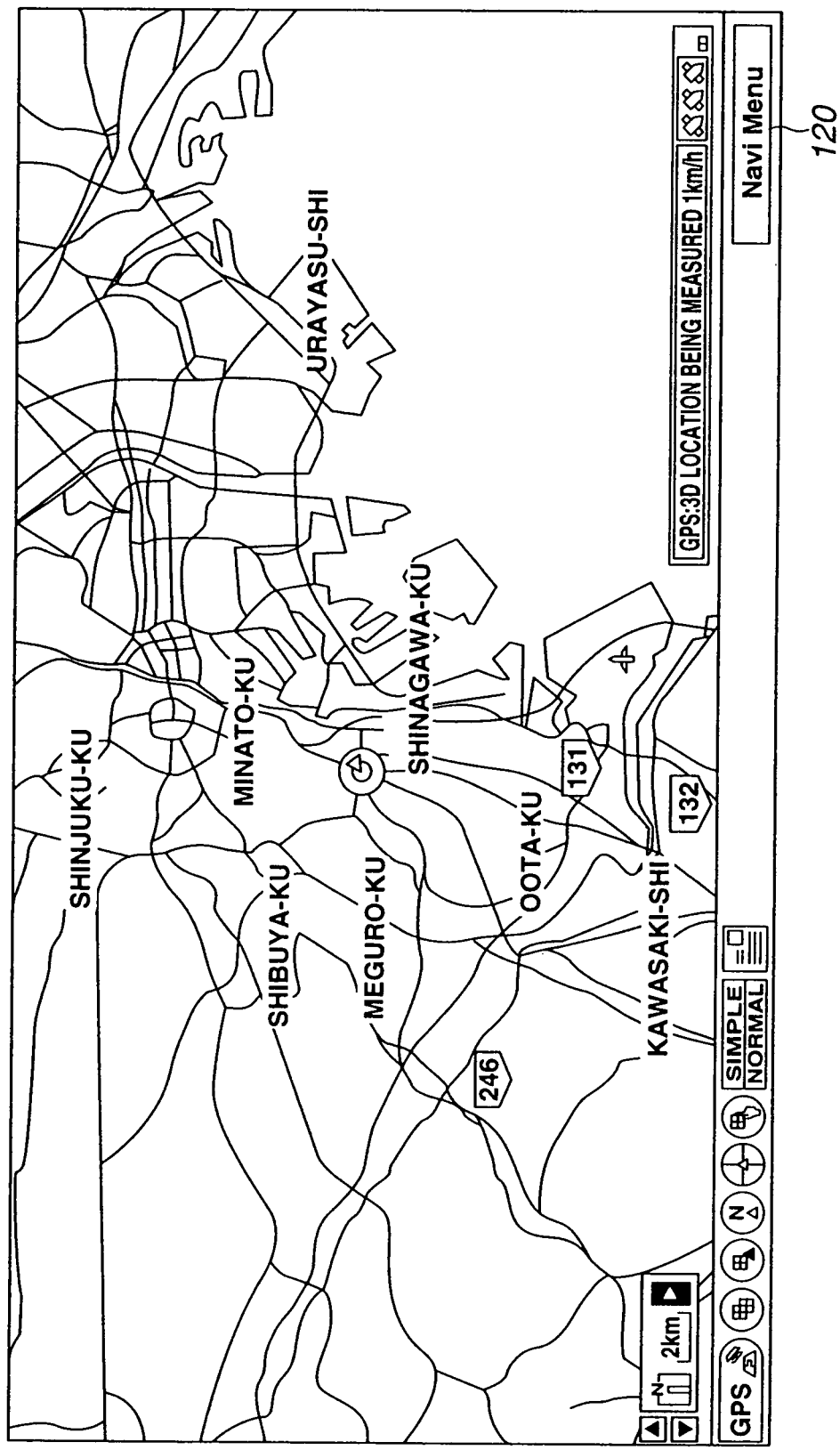
FIG. 15 shows a fourth exemplary display on an LCD in the notebook computer.

If the navigation menu is not to be displayed, the cursor is moved with the touch pad 6 onto the [navi menu "Navi Menu"] 121 displayed in the hysteresis hierarchical menu area 106a, beginning from the map displaying state shown in FIG. 14, after which the click button is pressed. Alternatively, the right button is clicked after cursor movement with the touch pad 6. This erases the navigation menu as shown in FIG. 15. The [ENTER] key and the [SPACE] key on the keyboard may also be pressed after setting the cursor on [navi menu "Navi Menu"] on the [navi menu "Navi Menu"] 121 to erase the navigation menu.

Figure 16:
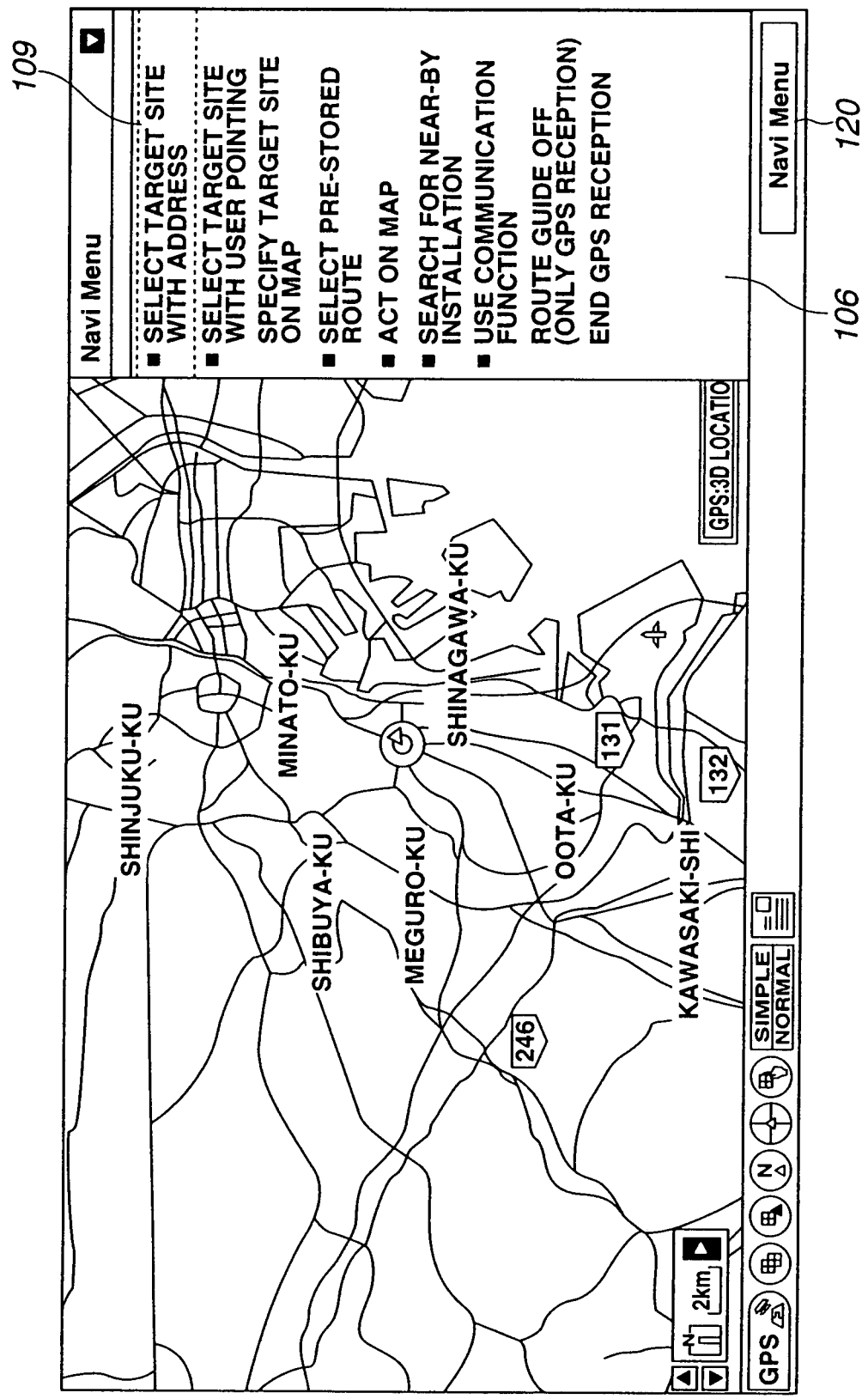
FIG. 16 shows a fifth exemplary display on an LCD in the notebook computer.
Figure 17:
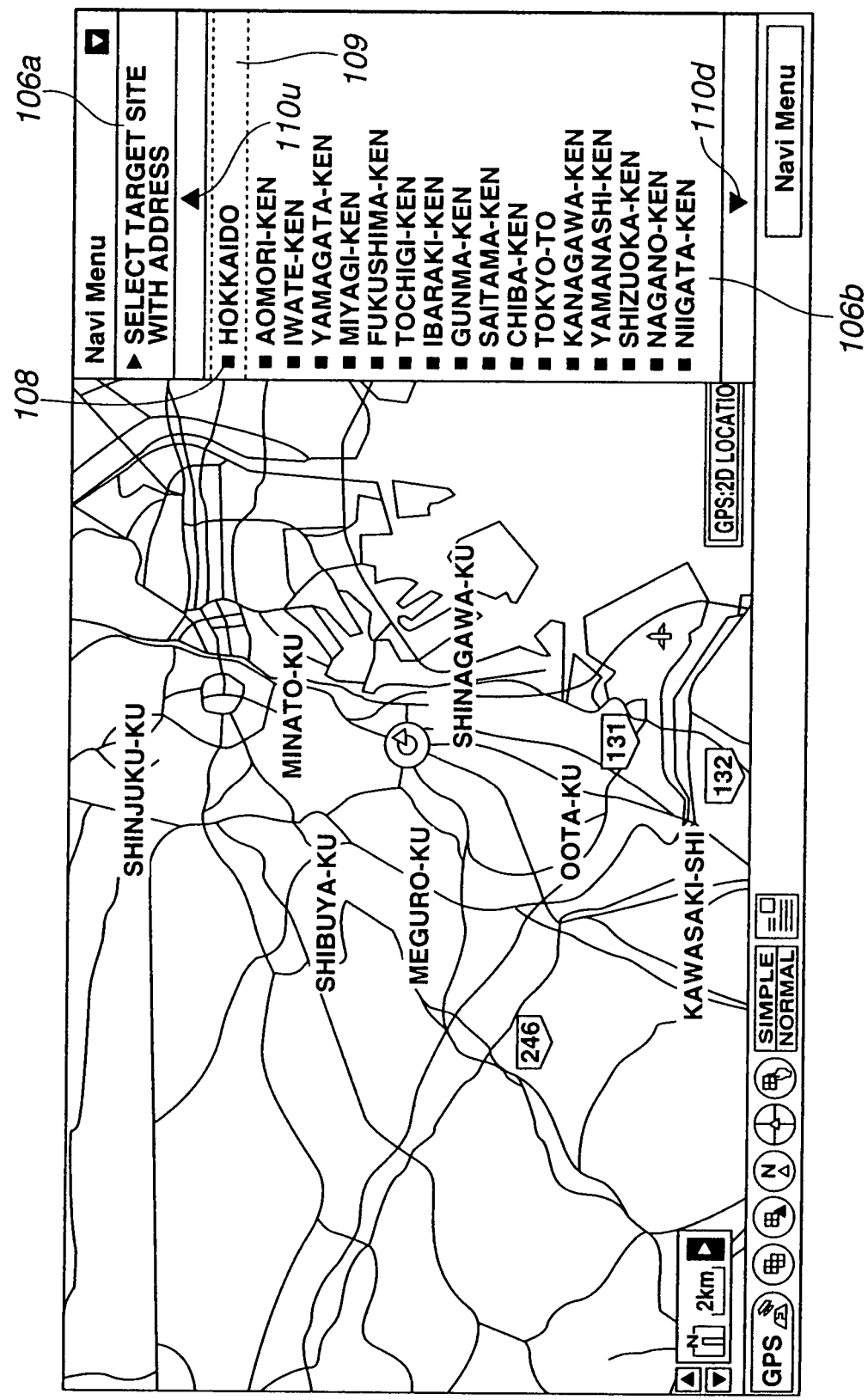
FIG. 17 shows a sixth exemplary display on an LCD in the notebook computer.

The destination setting by the navigation menu is now explained. From the state in which the [navi menu "Navi Menu"] 121 (navigation menu) is demonstrated in the hysteresis hierarchical menu area 106a, as shown in FIG. 16, the jog dial 4 is rotated to shift the cursor to [address selection by an address] in the current menu area 106b. The jog dial 4 is then pushed in for decision. Then, [select the destination with address] is displayed in the hysteresis hierarchical menu area 106a of the entire menu display area 106 as the hysteresis information, as shown in FIG. 17. Then, in an area in the current menu area 106b, sandwiched between the list up button 110u and the list down button 110b, [Hokkaido] up to [Niigata-ken] is displayed. Ahead of the names of the to-do-fu-ken (administrative partition of Japan) are entered folder marks 108 for indicating that these names are provided with lower hierarchical layers. In the initial state, the cursor 109 is focused on [Hokkaido].

Figure 18:
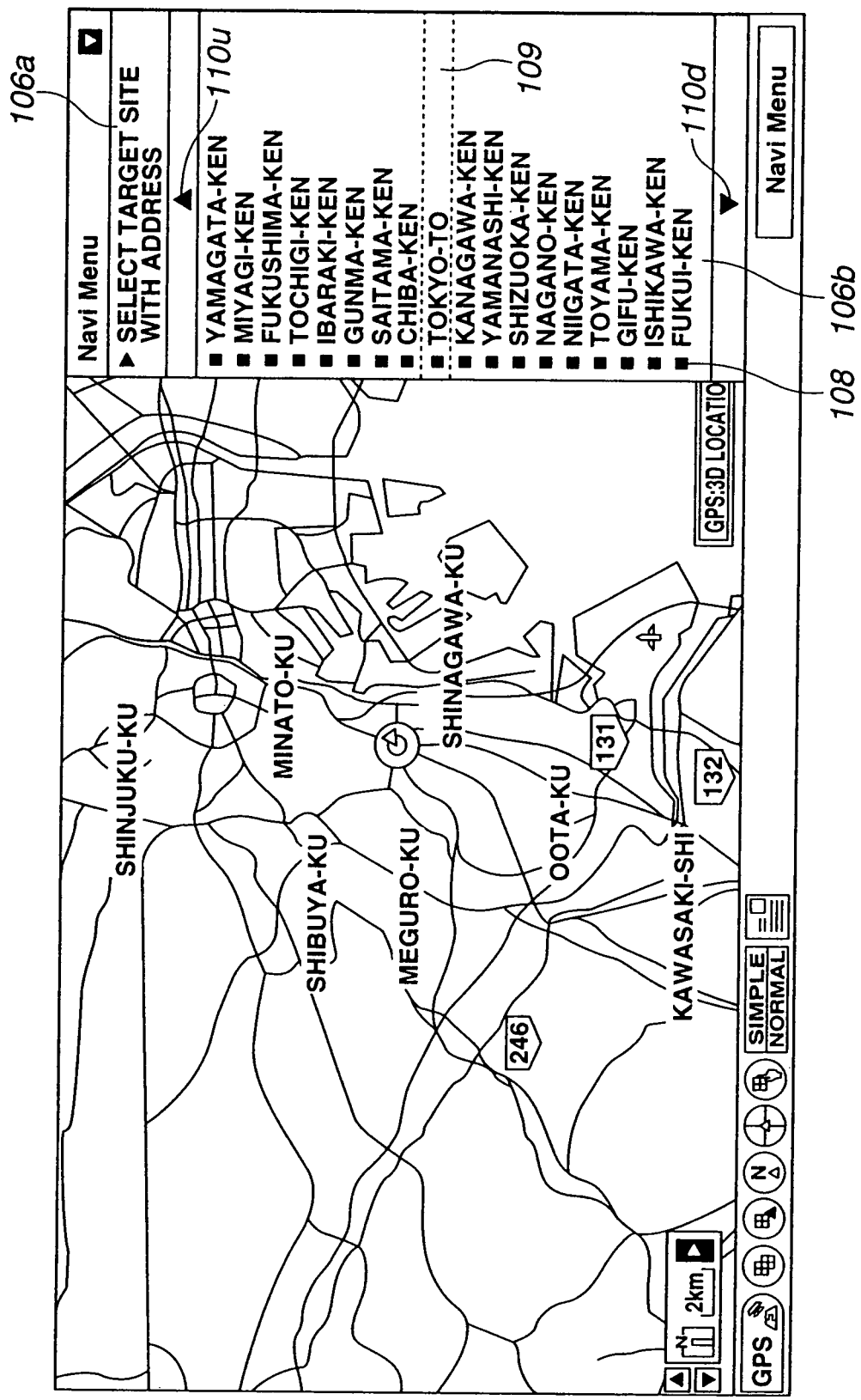
FIG. 18 shows a seventh exemplary display on an LCD in the notebook computer.

If, responsive to actuation of the jog dial 4, the cursor 109 is to be moved to [Tokyo-to] displayed in the current menu area 106b, as shown in FIG. 18, the cursor 109 is moved to a mid portion in the current menu area 106b. On surpassing this mid portion, the list begins and continues to scroll until [Tokyo-to] is positioned at the mid portion. At this time, [Tokyo-to] is scrolled by four rows towards above in the area between the list up button 110u and the list down button 110d such that [Hokkaido]. [Aomori-ken], [Akita-ken] and [Iwate-ken] disappear from the list up side button 110u, while [Toyama-ken], [Gifu-ken], [Ishikawa-ken] and [Fukui-ken] are presented on the list button 110d.

Figure 19:
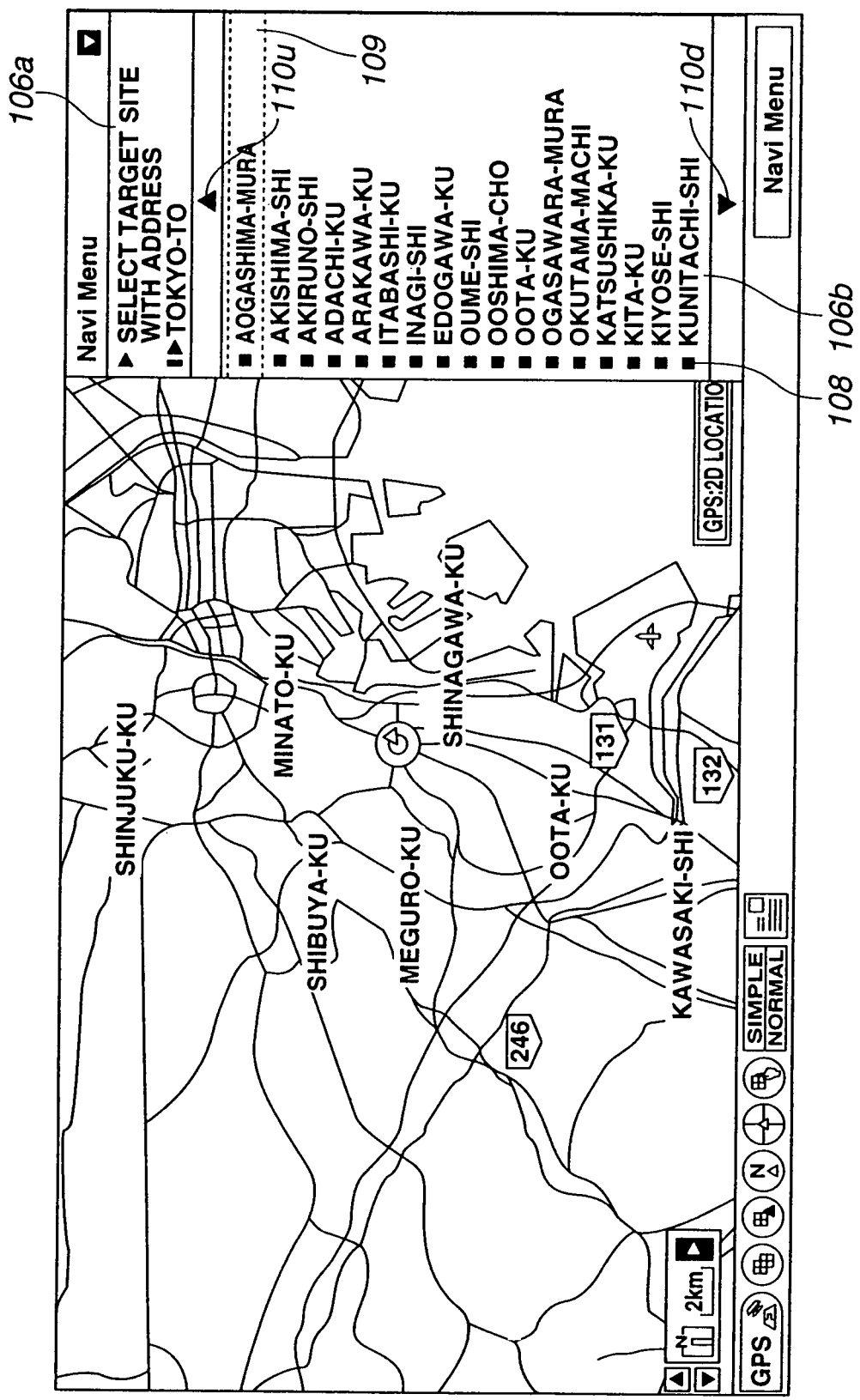
FIG. 19 shows an eighth exemplary display on an LCD in the notebook computer.

If the cursor 109 is focused on [Tokyo-to] and the jog dial 4 is thrust to decide on the selection, [Tokyo-to] is demonstrated as the hysteresis information below [select destination based on address] in the hysteresis hierarchical menu area 106a, as shown in FIG. 19. At this time, [Aogashima-mura] to [Kunitachi-shi] are displayed as lower hierarchical layer information for [Tokyo-to] in the current menu area 106b. In the initial state, the cursor 109 is focused on [Aogashima-mura].

Figure 20:
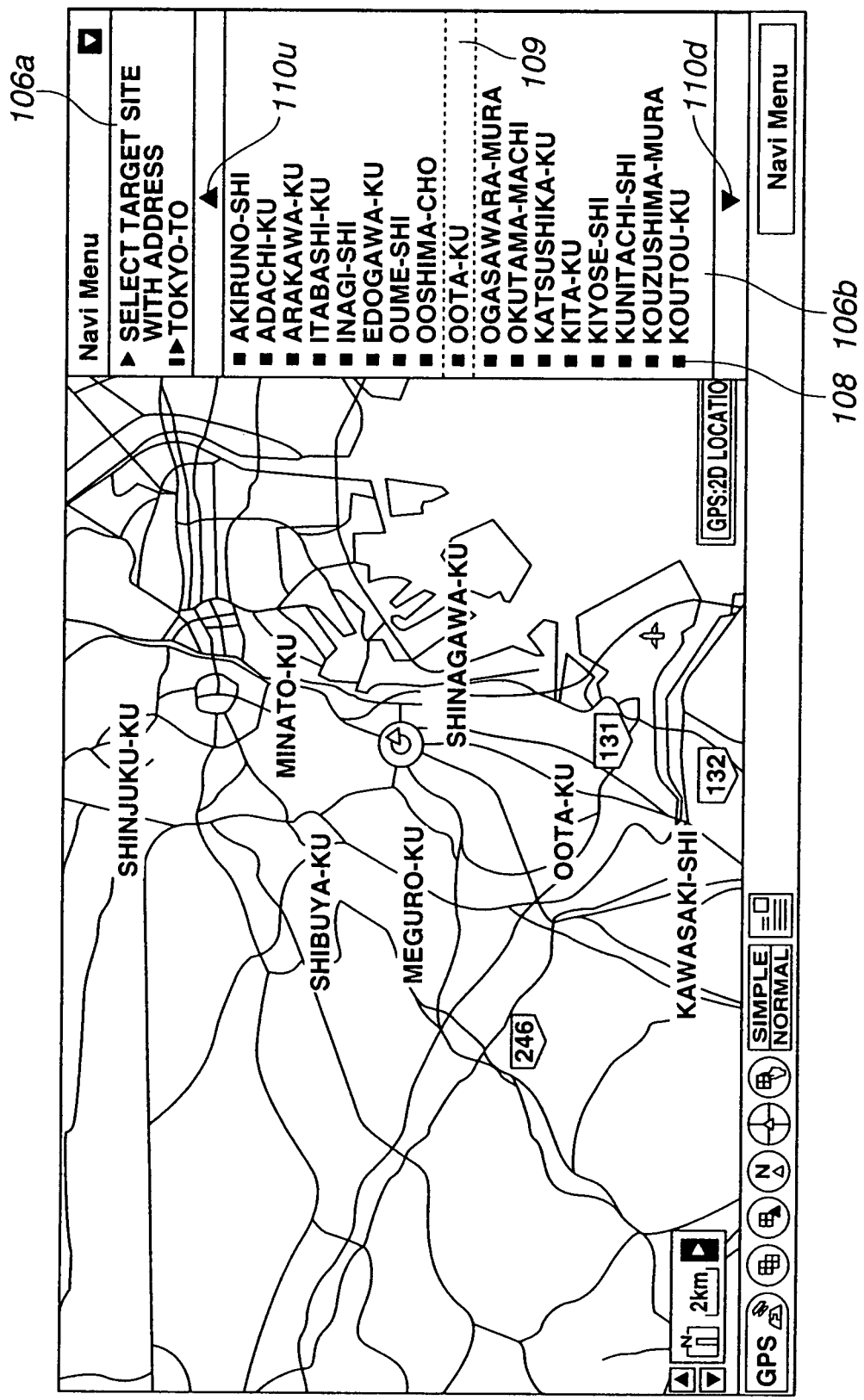
FIG. 20 shows a ninth exemplary display on an LCD in the notebook computer.

If it is attempted to move the cursor 109 to [Ohta-ku], as shown in FIG. 20, the cursor 109 is shifted to a mid portion of the current menu area 106b. If this is surpassed, the list begins and continues to scroll, such that [Ohta-ku] is positioned at the mid portion. Since the [Ohta-ku] is scrolled two rows towards the upper side, between the list up button 110u and the list down button 110d, [Aogashima-mura] and [Shoujima-shi] disappear on the side of the list up button 110u, while [Kozushima-mura] and [Koto-ku] appear on the side of the list down button 110d.

Figure 21:
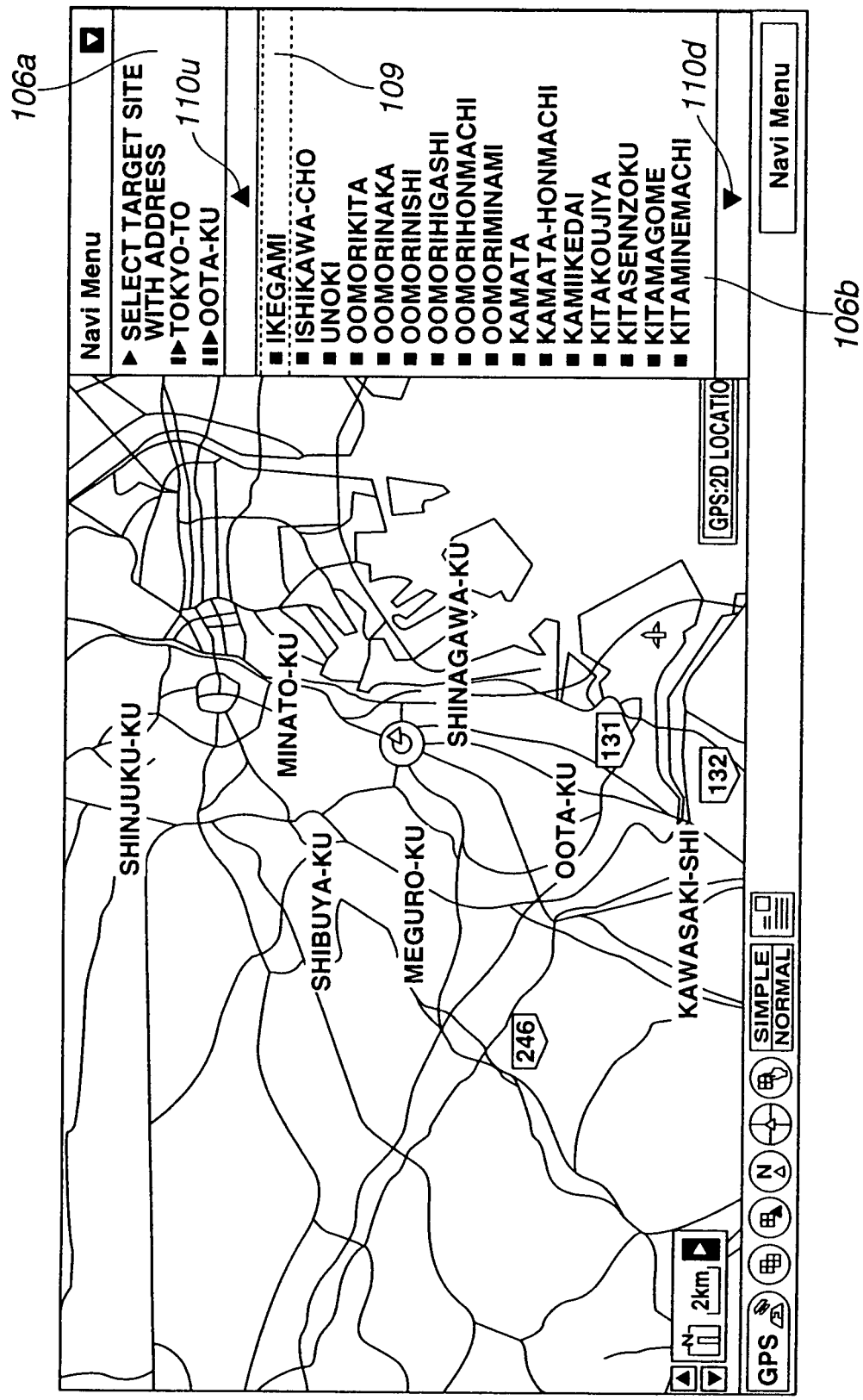
FIG. 21 shows a tenth exemplary display on an LCD in the notebook computer.

If the cursor 109 is focused on [Ohta-ku] and the jog dial 4 is thrust to decide on the selection, [Tokyo-to] is demonstrated as the hysteresis information below [Tokyo-to] in the hysteresis hierarchical menu area 106a, as shown in FIG. 21. At this time, [Ikegami] to [Kitamine-cho] are displayed as lower hierarchical layer information for [Ohta-ku] in the current menu area 106b. In the initial state, the cursor 109 is focused on [Ikegami].

Figure 22:
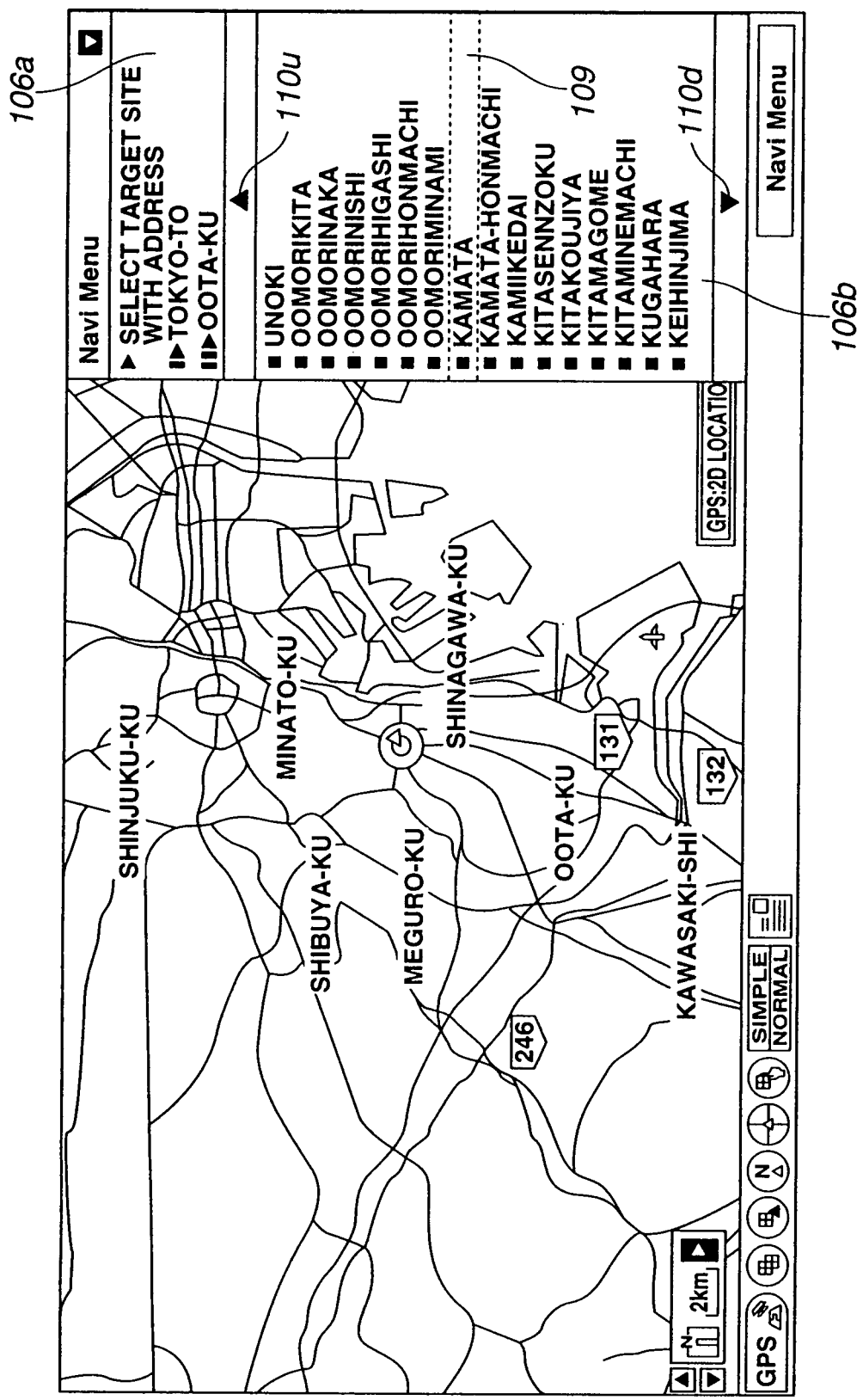
FIG. 22 shows an eleventh exemplary display on an LCD in the notebook computer.

If it is attempted to move the cursor 109 to [Kamata], as shown in FIG. 22, the cursor 109 is shifted to a mid portion of the current menu area 106b. If this is surpassed, the list begins and continues to scroll, such that [Kamata] is positioned at the mid portion. Since [Kamata] is scrolled two rows towards the upper side, between the list up button 110u and the list down button 110d, [Ikegami] and [Ishikawa-cho] disappear on the side of the list up button 110u, while [Kugahara] and [Keihin-jima] appear on the side of the list down button 110d.

Figure 23:
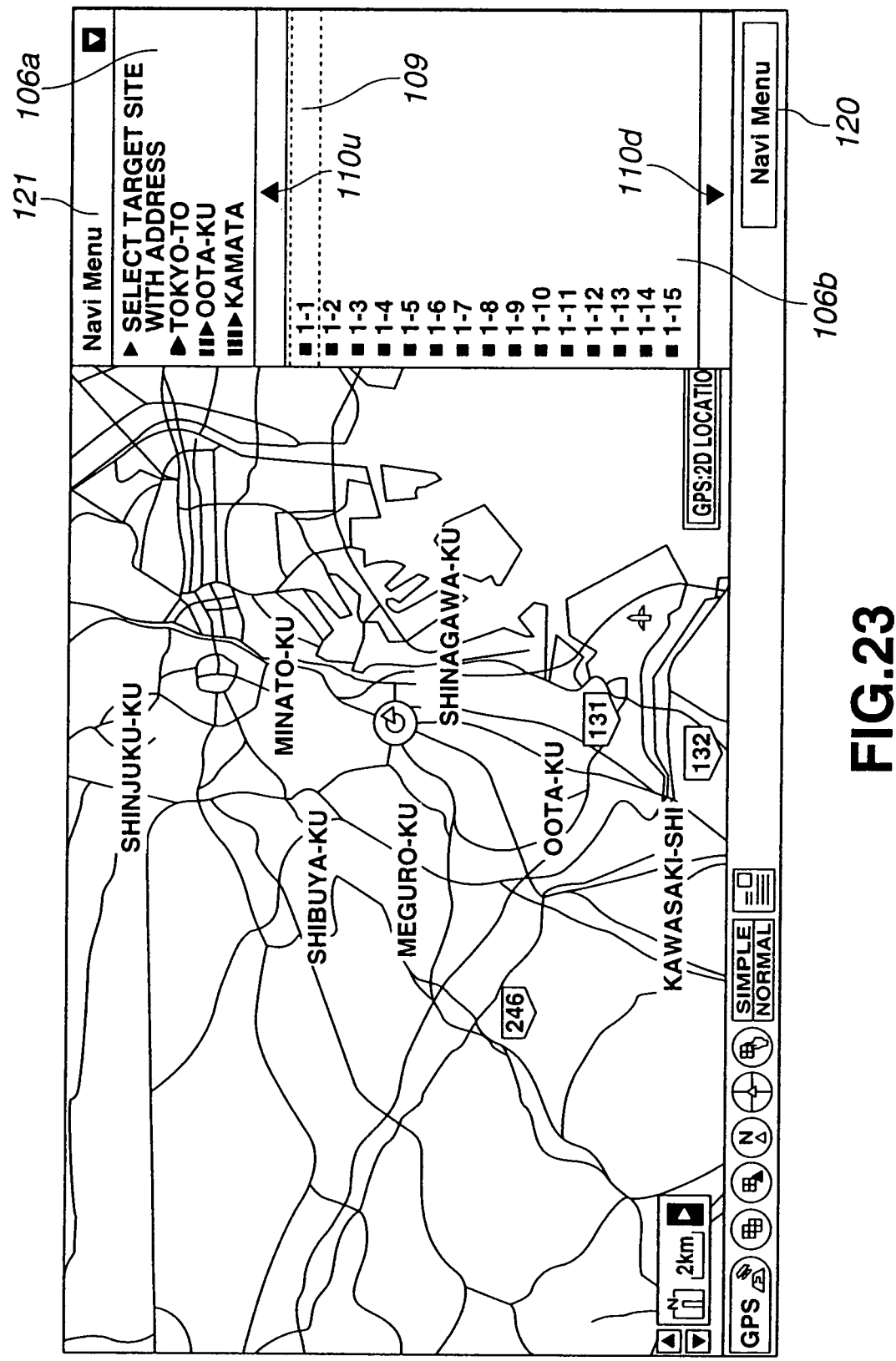
FIG. 23 shows a twelfth exemplary display on an LCD in the notebook computer.

If the cursor 109 is focused on [Kamata] and the jog dial 4 is thrust to decide on the selection, [Kamata] is demonstrated as the hysteresis information below [Ohta-ku] in the hysteresis hierarchical menu area 106a, as shown in FIG. 23. At this time, the address information [1-1] to [1-15] are displayed as lower hierarchical layer information for [Kamata] in the current menu area 106b. In the initial state, the cursor 109 is focused on [1-1].

Figure 24:
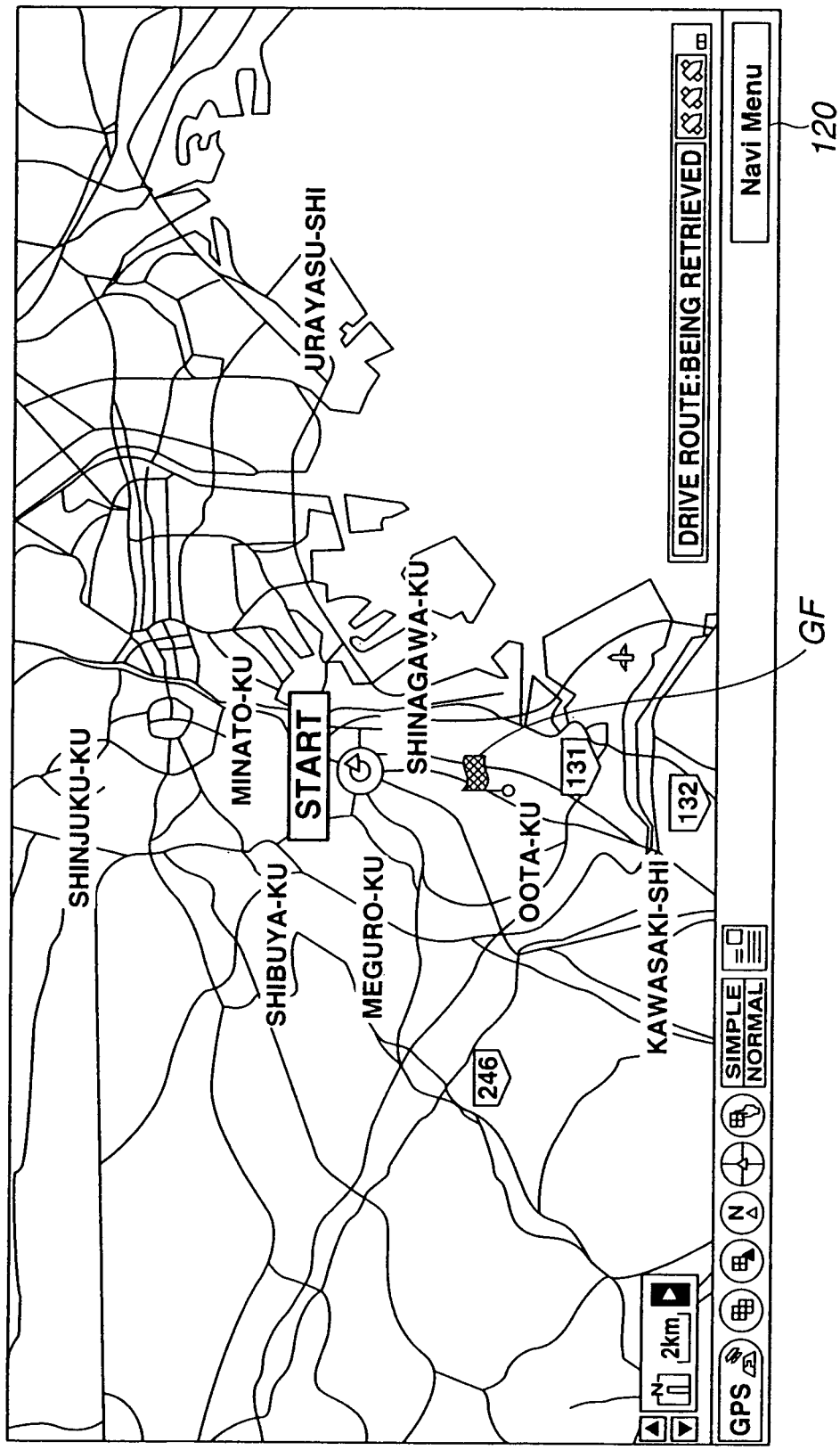
FIG. 24 shows a thirteenth exemplary display on an LCD in the notebook computer.

If the address selection is decided on in FIG. 23 by the operation of the jog dial 4, the current position is displayed on the map with start (START) and the destination [Tokyo-to Ohta-ku Kamata #-#] is displayed with a goal flash mark GF, as shown in FIG. 24. It is noted that one of the address information [1-1] to [1-15] is inserted for the address information #-#.

Figure 25:
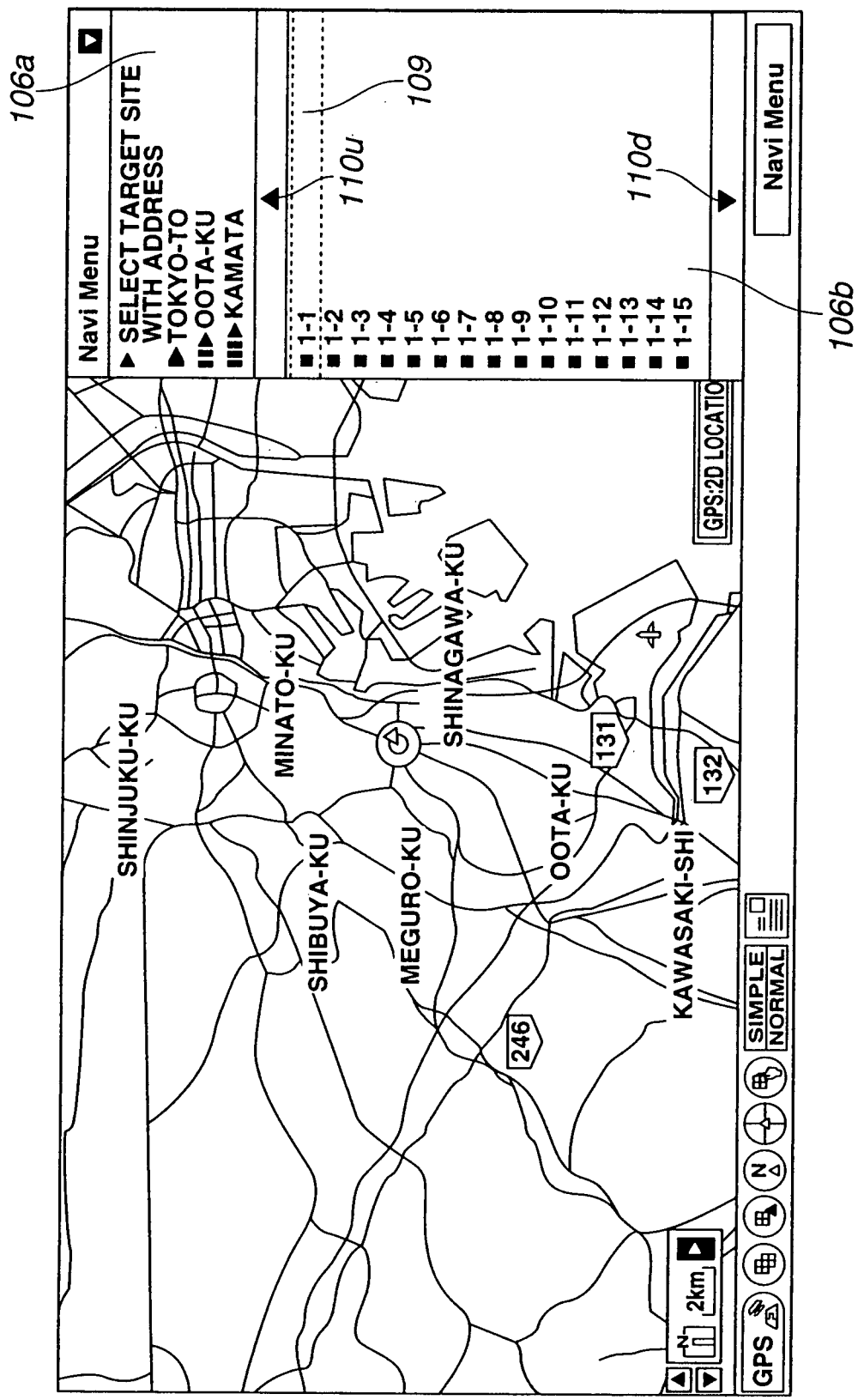
FIG. 25 shows a fourteenth exemplary display on an LCD in the notebook computer.
Figure 26:
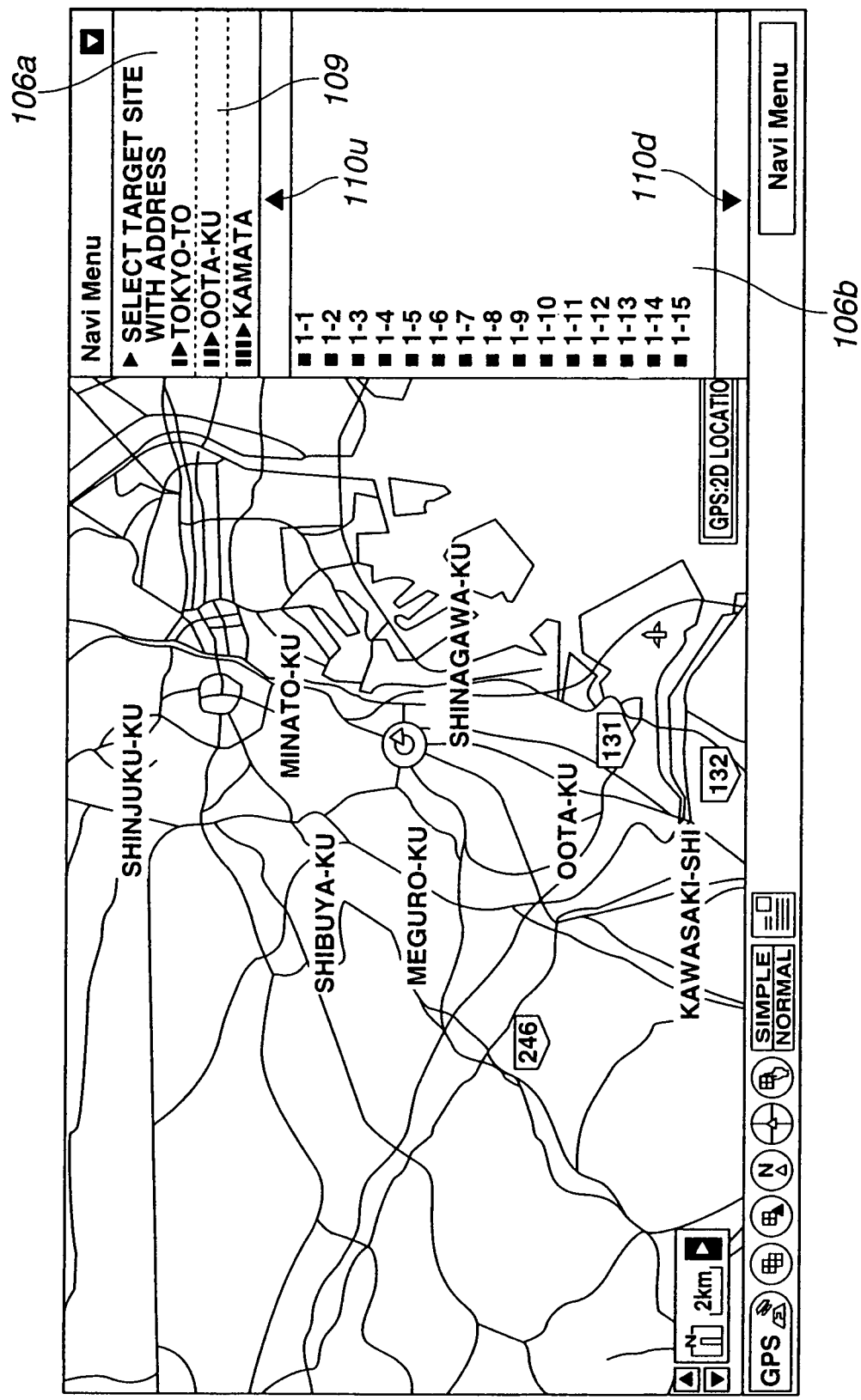
FIG. 26 shows a fifteenth exemplary display on an LCD in the notebook computer.
Figure 27:
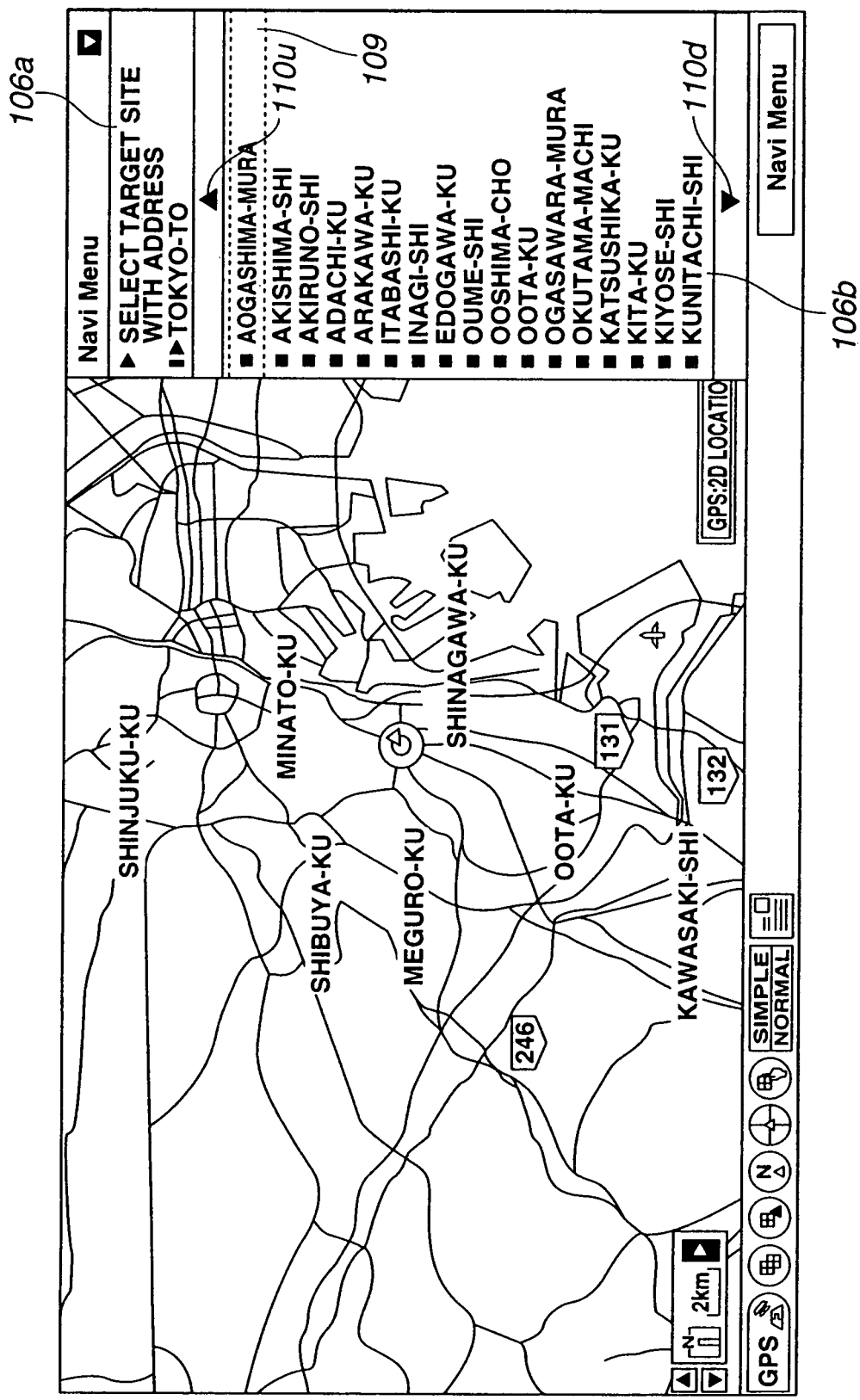
FIG. 27 shows a sixteenth exemplary display on an LCD in the notebook computer.

The change of the destination setting by the navigation menu is hereinafter explained. It should be noted that the destination setting is to be changed from the state shown in FIG. 25. In FIG. 25, the hysteresis information having the hierarchy of [select destination based on address], [Tokyo-to], [Ohta-ku] and [Kamata] is displayed in the hysteresis hierarchical menu area 106a, while the address information [1-1] to [1-15] for [Kamata] is displayed in the current menu area 106b. For changing the setting of [ku] of the destination, [Ohta-ku] displayed in the hysteresis hierarchical menu area 106a is selected responsive to actuation of the jog dial 4, as shown in FIG. 26. In the current menu area 106b, [ku] including [Ohta-ku], and also including mura (village) and shi (city) in this case, are displayed from [Aogashima-mura] to [Kunitachi-shi] in the current menu area 106b, as shown in FIG. 27.

Figure 28:
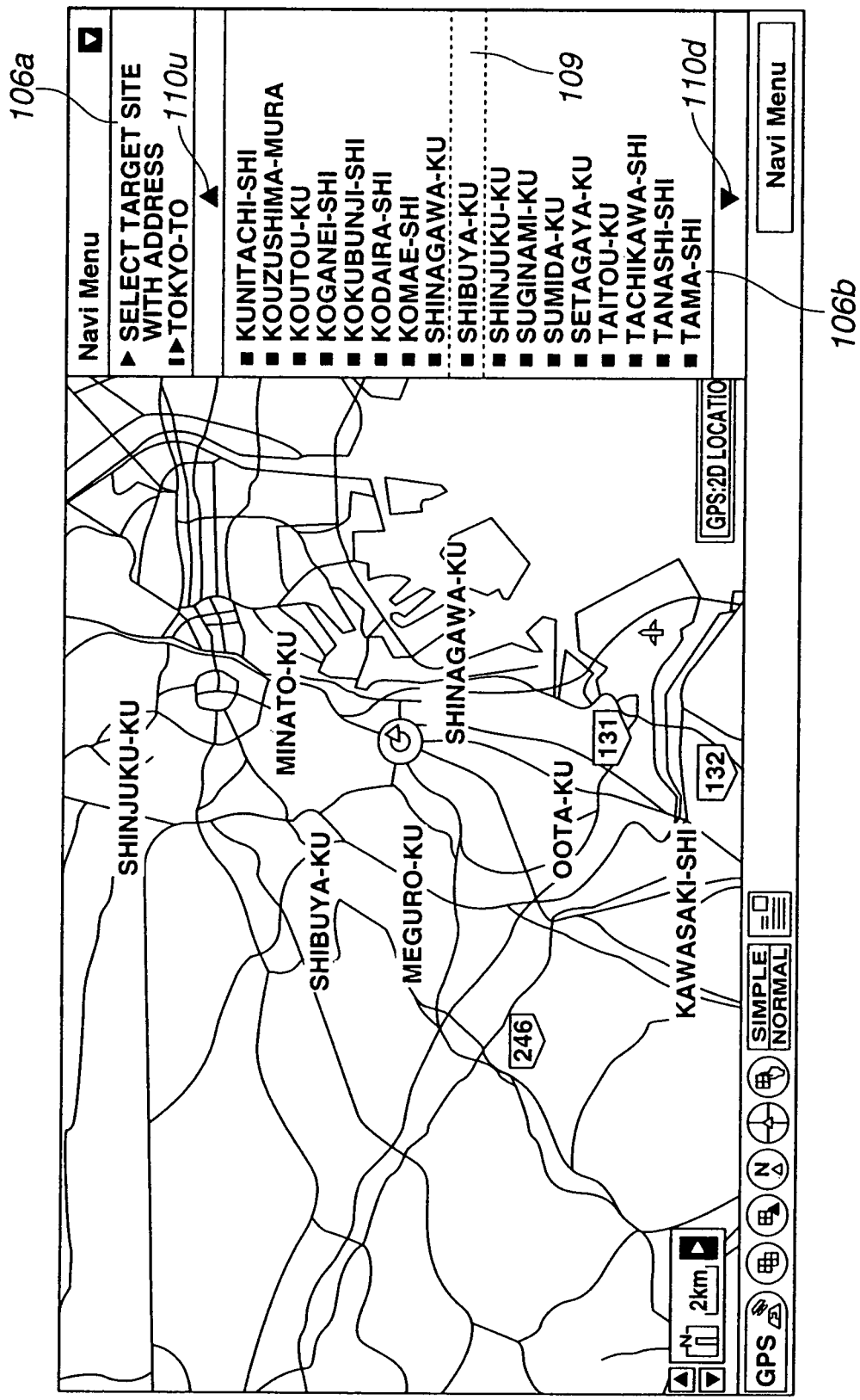
FIG. 28 shows a seventeenth exemplary display on an LCD in the notebook computer.

If it is attempted to move the cursor 109 to [Shibuya-ku], as shown in FIG. 28, the cursor 109 is shifted to a mid portion of the current menu area 106b. If this is surpassed, the list begins and continues to scroll, such that [Shibuya-ku] is positioned at the mid portion. Since [Shibuya-ku], not displayed in the state of FIG. 27, is scrolled 16 rows towards the upper side, between the list up button 110u and the list down button 110d, [Aogashima-mura] to [Kiyose-shi] disappear on the side of the list up button 110u, while [Kozushima-mura] to [Tama-shi] appear on the side of the list down button 110d.

Figure 29:
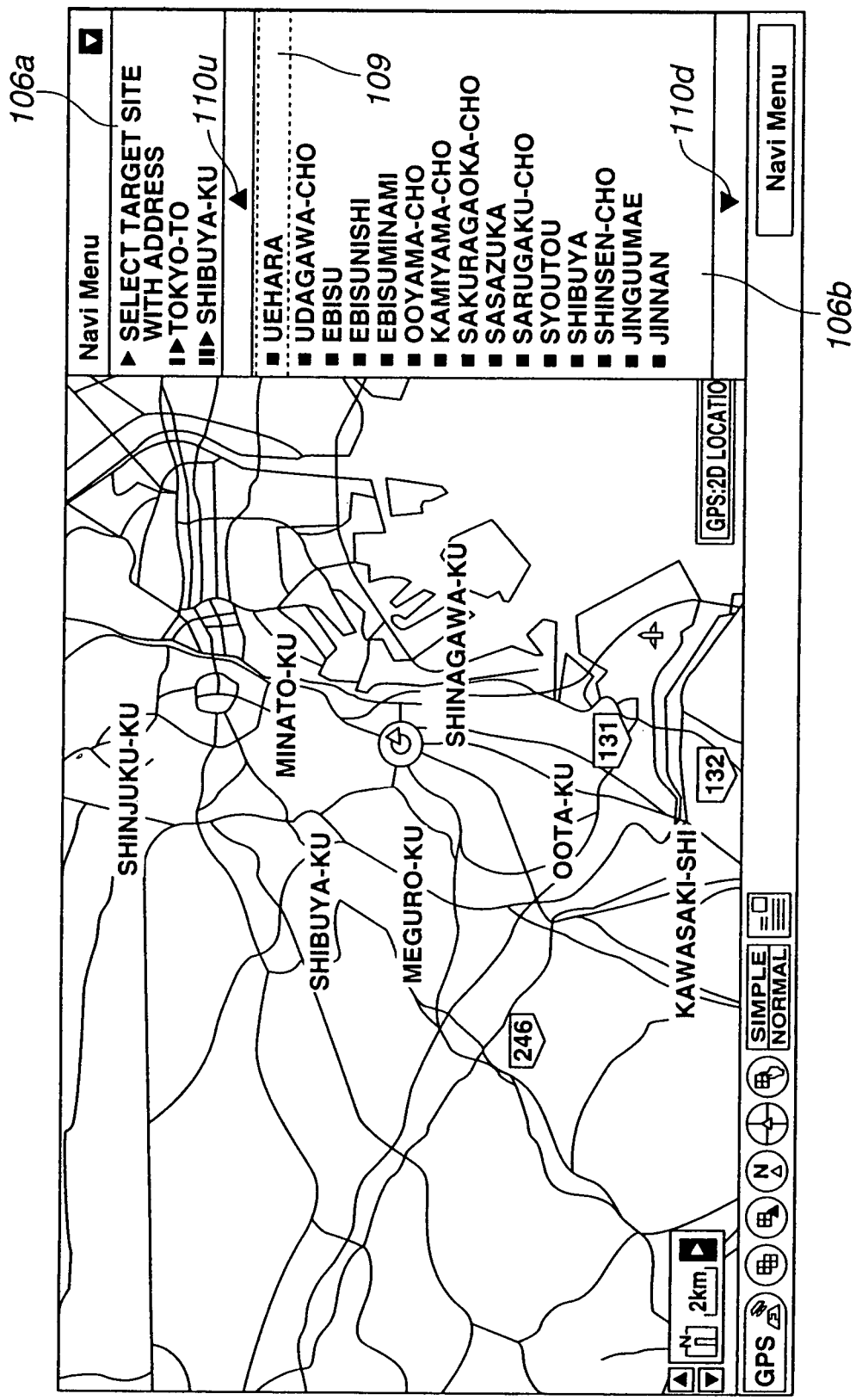
FIG. 29 shows a nineteenth exemplary display on an LCD in the notebook computer.

If the cursor 109 is focused on [Shibuya-ku] and the jog dial 4 is thrust to decide on the selection, [Shibuya-ku] is demonstrated as the hysteresis information below [Tokyo-to] in the hysteresis hierarchical menu area 106a, as shown in FIG. 29. At this time, [Uehara] to [Zin-nan] are displayed as lower hierarchical layer information for [Shibuya-ku] in the current menu area 106b. In the initial state, the cursor 109 is focused on [Uehara].

Figure 30:
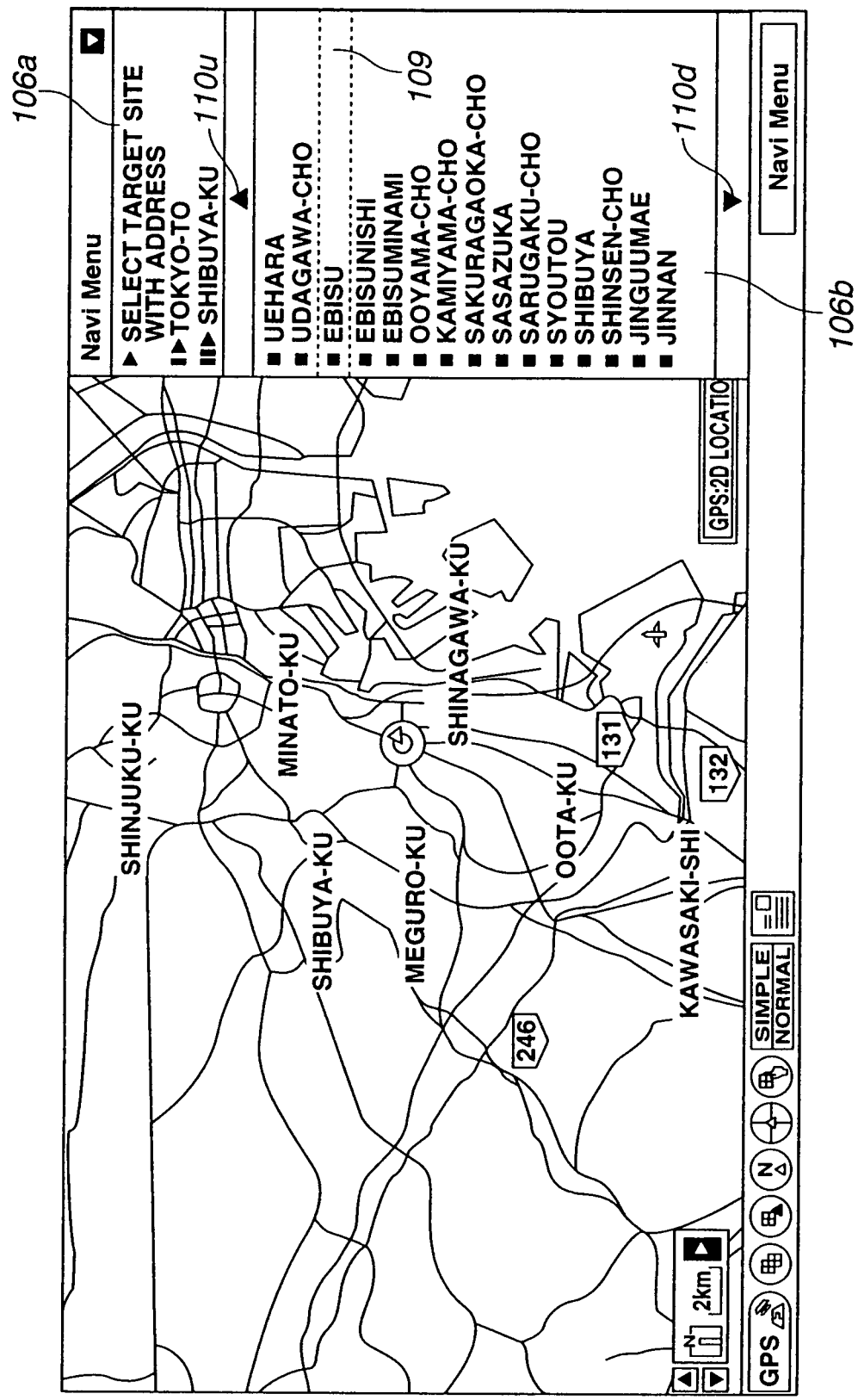
FIG. 30 shows a twentieth exemplary display on an LCD in the notebook computer.
Figure 31:
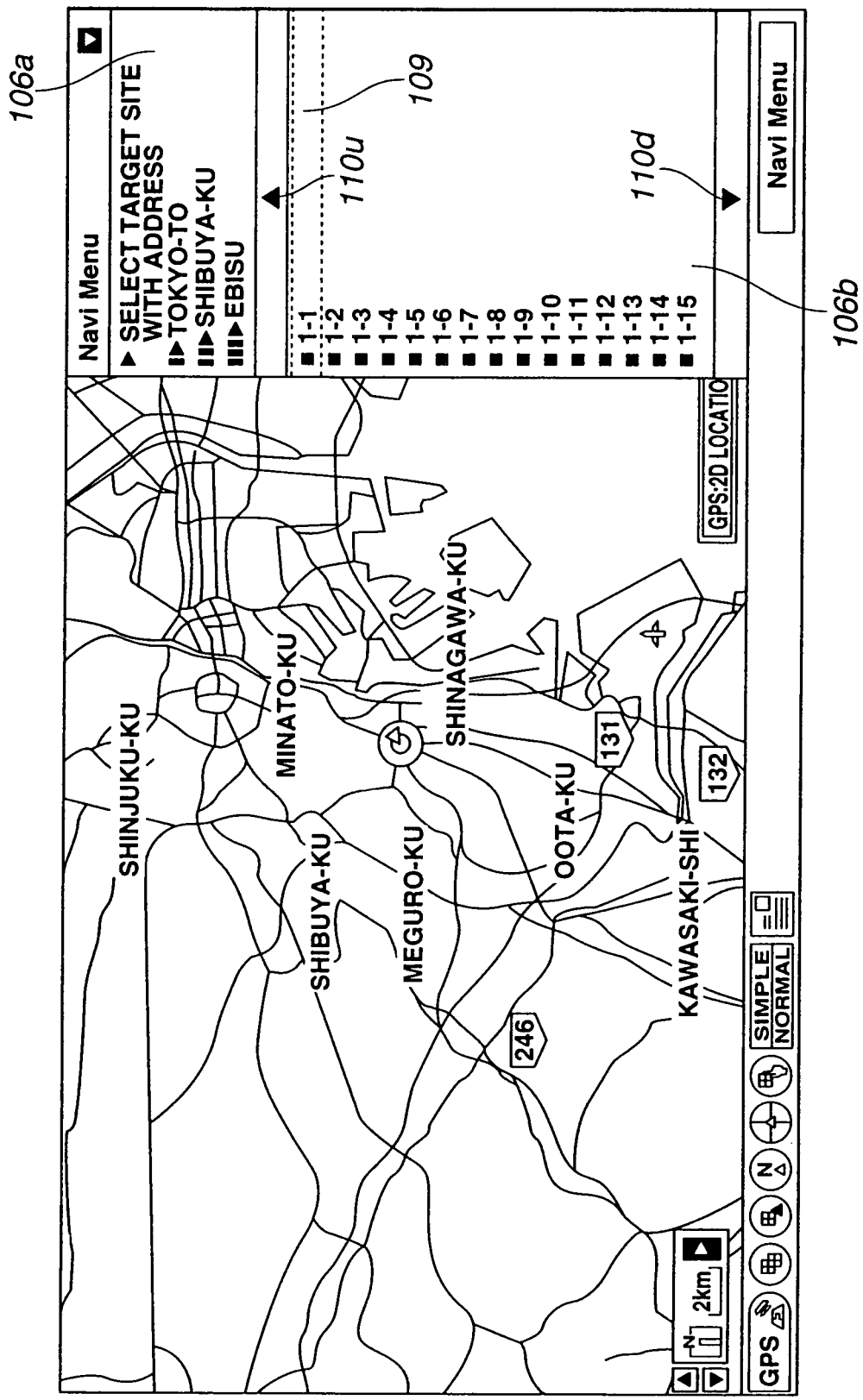
FIG. 31 shows a twenty-first exemplary display on an LCD in the notebook computer.

If the cursor 109 is moved to [Ebisu], using the jog dial 4, as shown in FIG. 30, to decide on the selection, as shown in FIG. 30, the hierarchical hysteresis information [Ebisu] is demonstrated below [Shibuya-ku] in the hysteresis hierarchical menu area 106a, while the address information [1-1] to [1-15] is displayed in the current menu area 106b, as shown in FIG. 31. If the address selection is decided on by the operation on the jog dial 4, the current position on the map is displayed with start (START) and the destination [Tokyo-to Shibuya-ku Ebisu #-#] is displayed with a goal flash mark.

Figure 32:
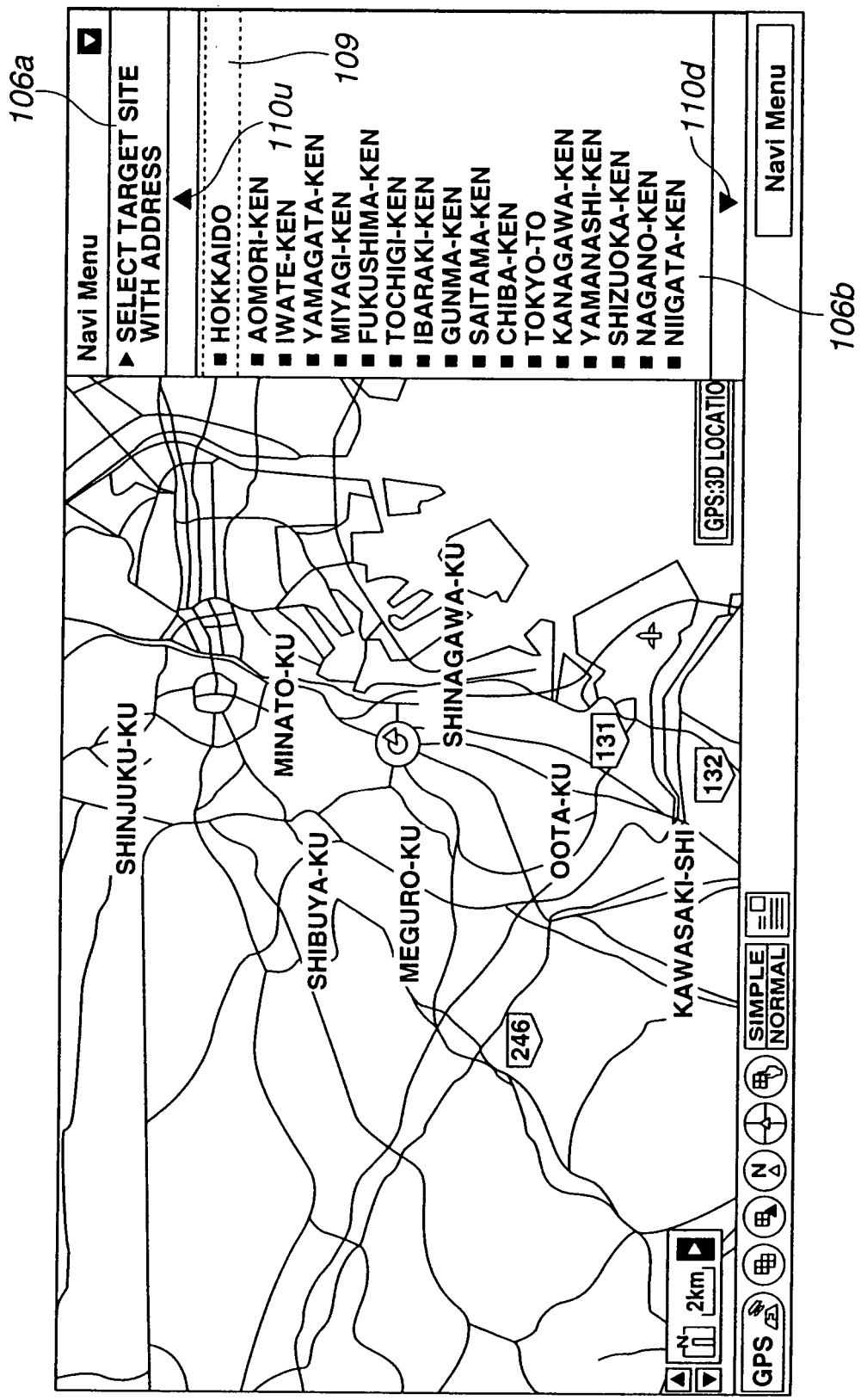
FIG. 32 shows a twenty-second exemplary display on an LCD in the notebook computer.
Figure 33:
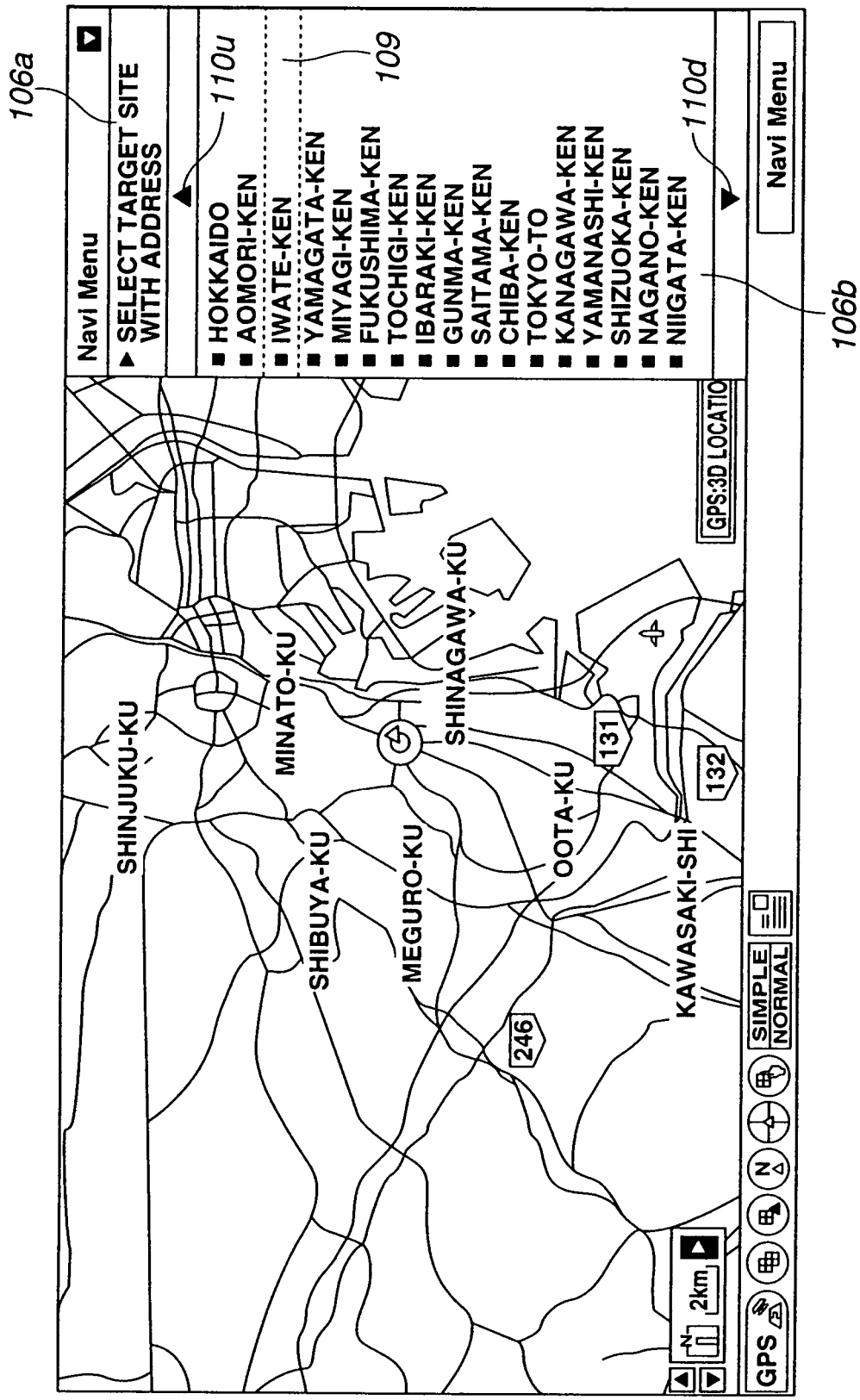
FIG. 33 shows a twenty-third exemplary display on an LCD in the notebook computer.
Figure 34:
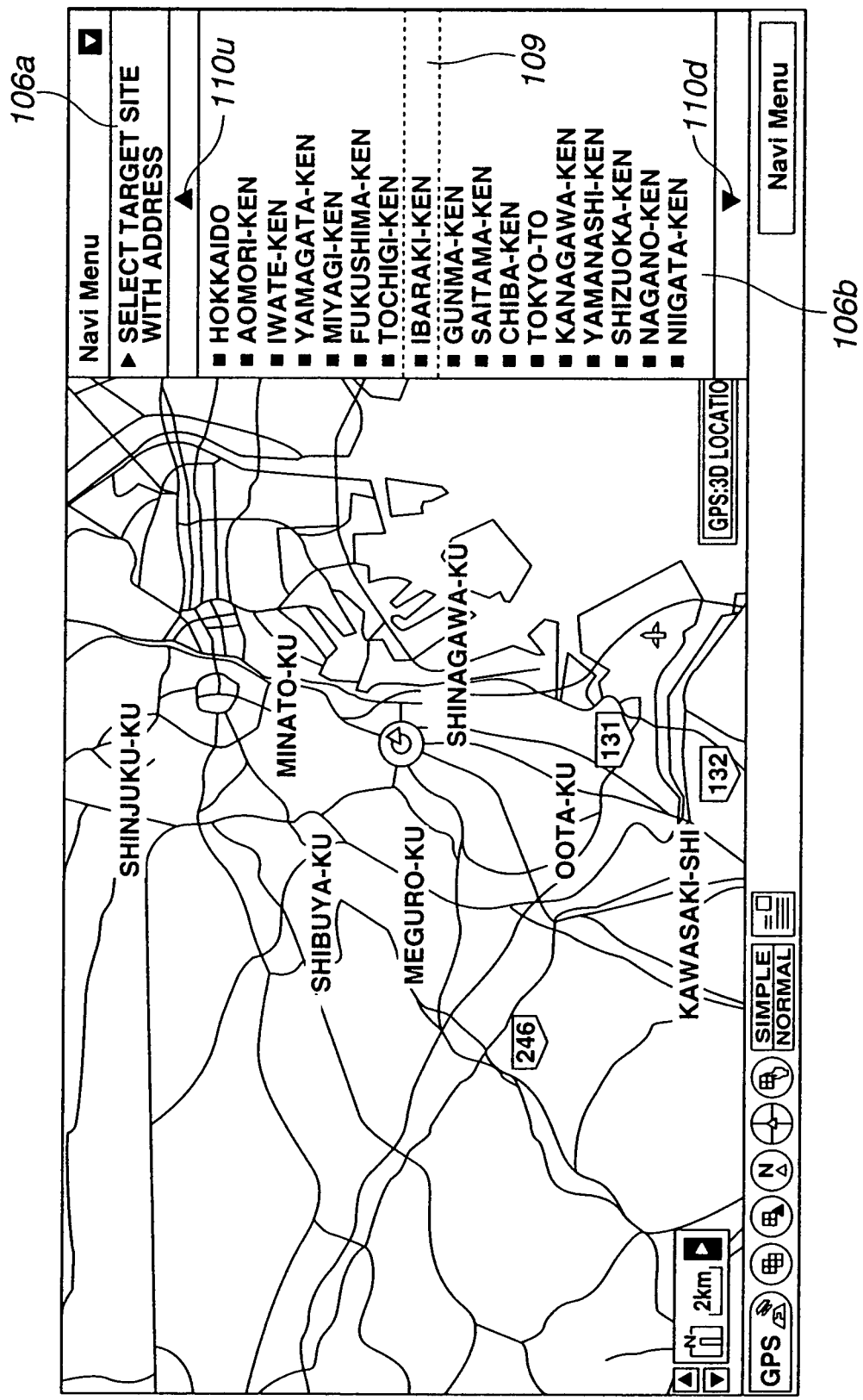
FIG. 34 shows a twenty-fourth exemplary display on an LCD in the notebook computer.
Figure 35:
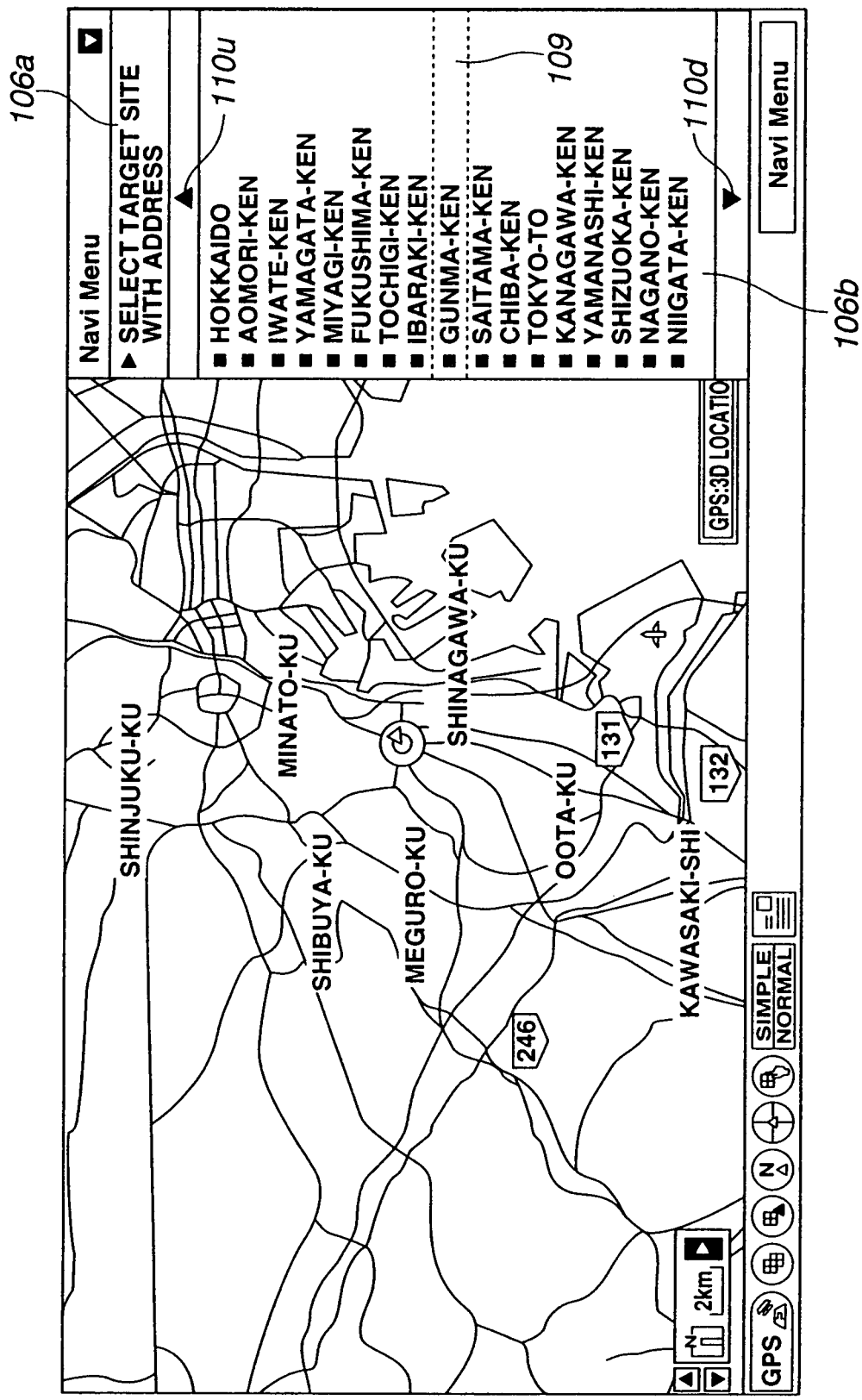
FIG. 35 shows a twenty-fifth exemplary display on an LCD in the notebook computer.
Figure 36:
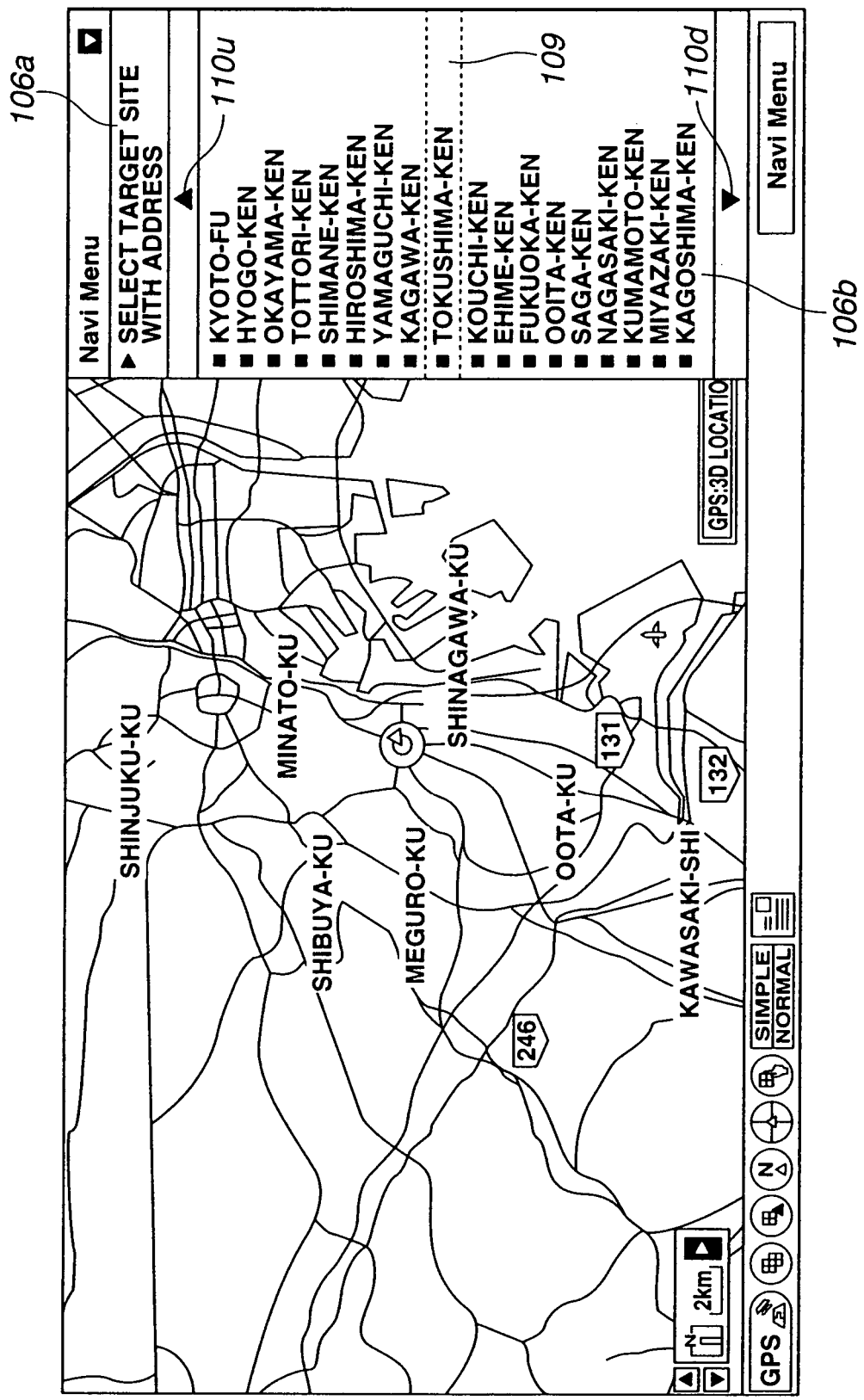
FIG. 36 shows a twenty-sixth exemplary display on an LCD in the notebook computer.
Figure 37:
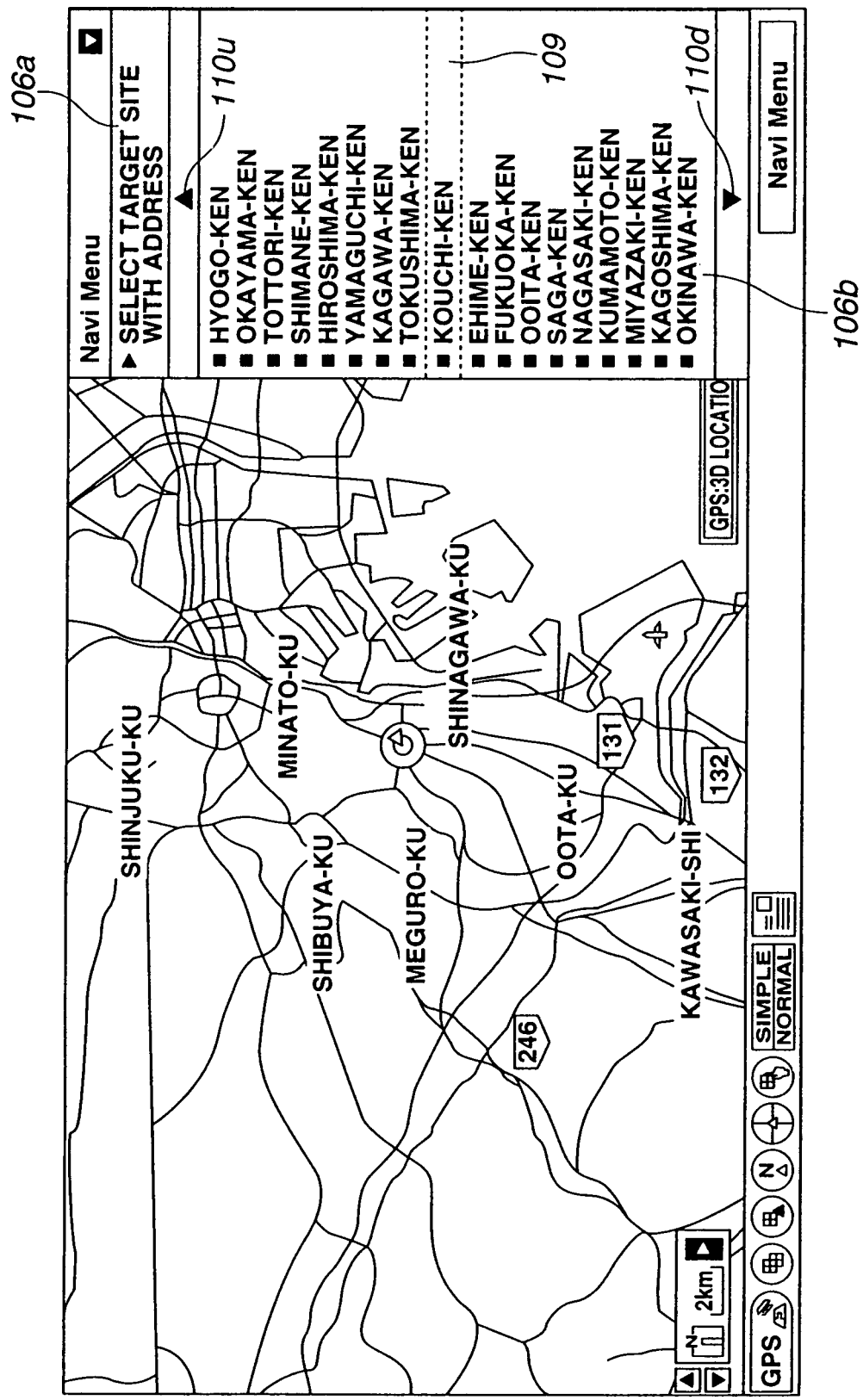
FIG. 37 shows a twenty-seventh exemplary display on an LCD in the notebook computer.
Figure 38:
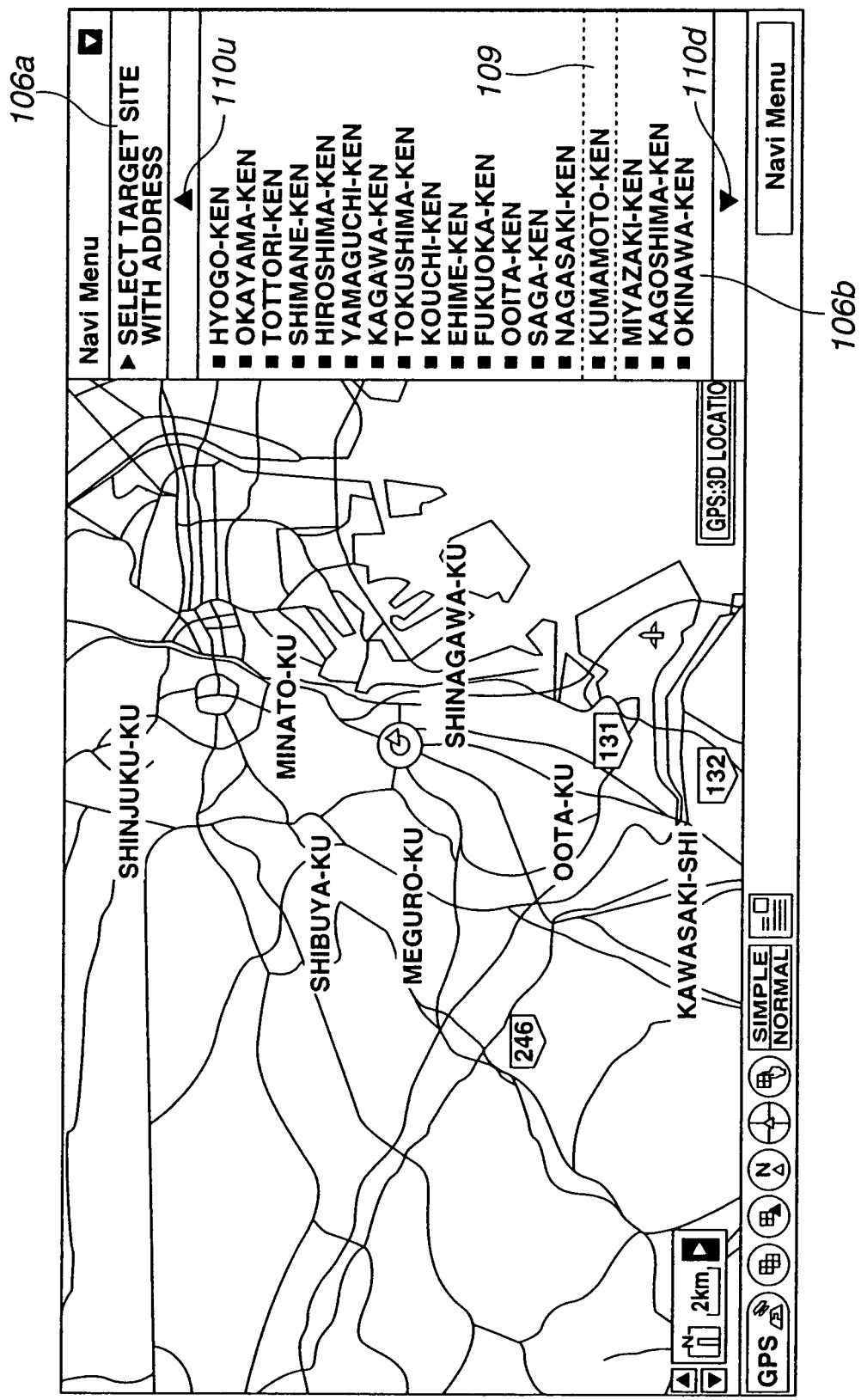
FIG. 38 shows a twenty-eighth exemplary display on an LCD in the notebook computer.
Figure 39:
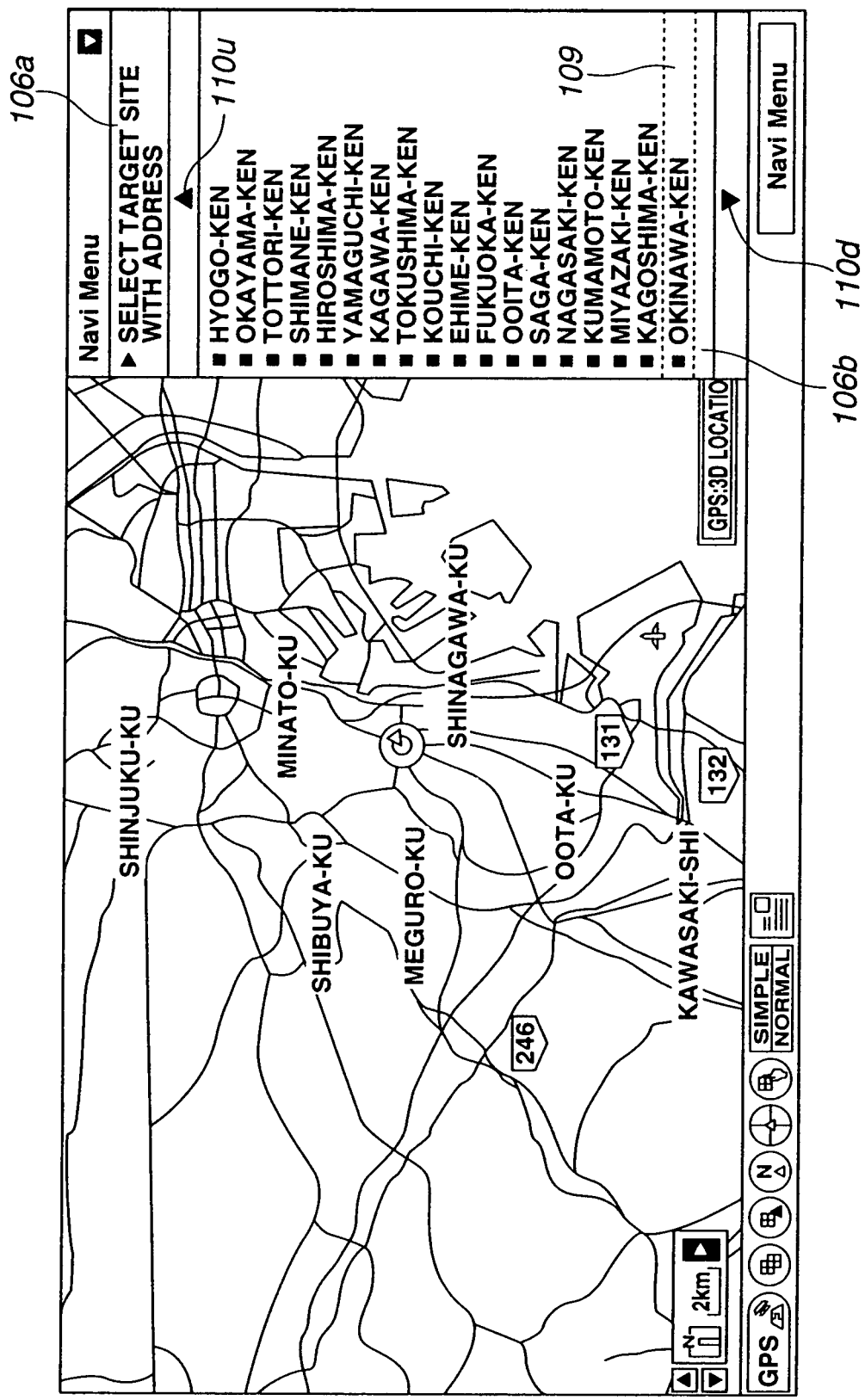
FIG. 39 shows a twenty-ninth exemplary display on an LCD in the notebook computer.
Figure 40:
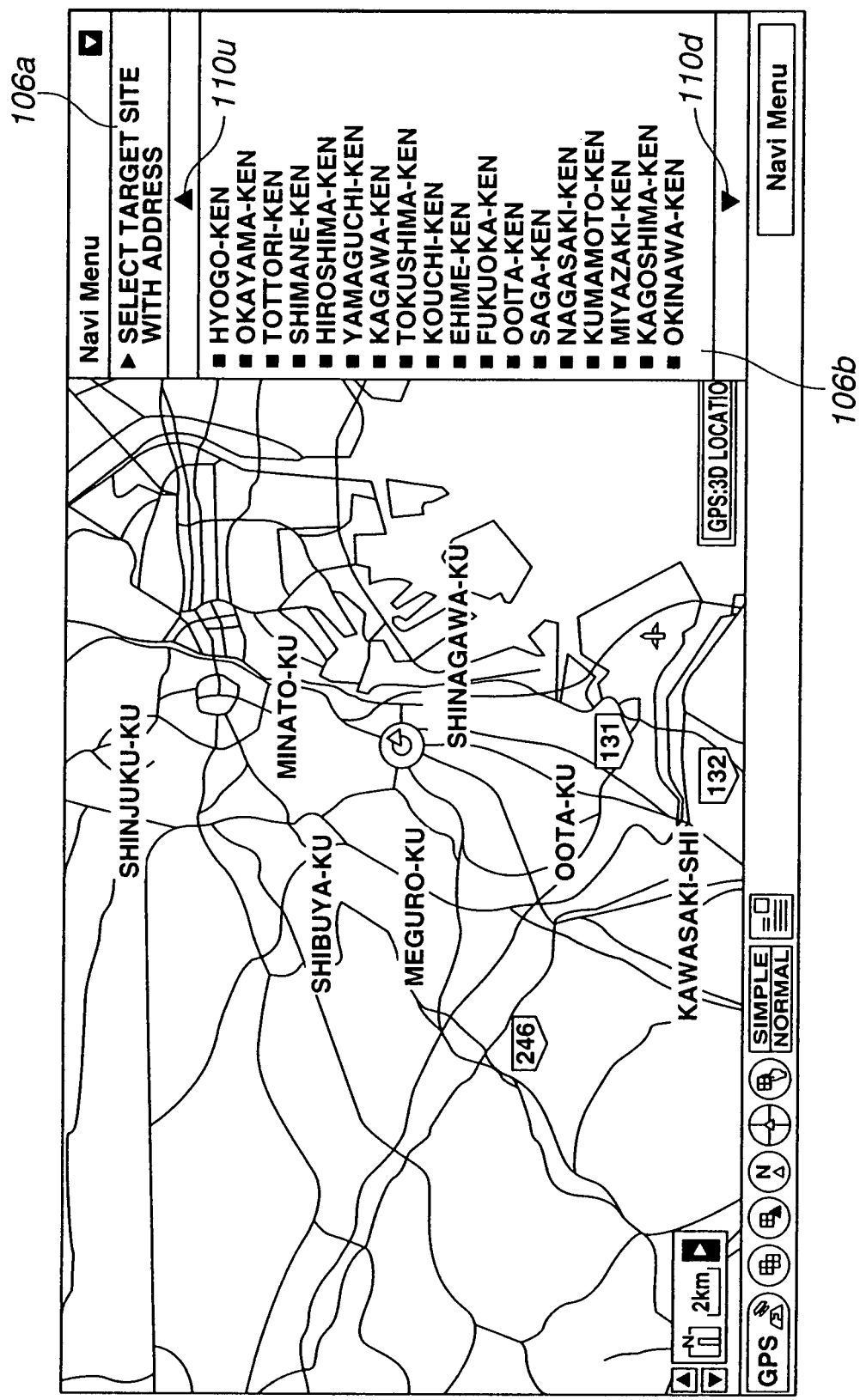
FIG. 40 shows a thirtieth exemplary display on an LCD in the notebook computer.

The scrolling processing by the navigation menu is hereinafter explained. In the following explanation, representation of the to-do-fu-ken names in the current menu area 106b, associated with the menu of [select destination based on address] as indicated in the hysteresis hierarchical menu area 106a of FIG. 32 is taken as an example. In the initial state, the cursor 109 is focused on the [Hokkaido]. As the jog dial 4 is rotated towards below, the cursor 109 is moved to [Iwate-ken] half-way, as shown in FIG. 33. As the jog dial 4 is further rotated towards below, the cursor 109 is moved to [Ibaraki-ken] at a mid portion of the current menu area 106b, as shown in FIG. 34. If the focus of the cursor 109 surpasses the mid portion of the current menu area 106b, the list of the to-do-fu-ken names scrolls, without the cursor-itself being moved, as shown in FIGS. 35 to 37. When the state of FIG. 37 is reached, that is when [Kochi-ken] is at a mid position as indicated by the cursor 109, all names of to-do-fu-ken are displayed in the current menu area 106b, with [Okinawa-ken] at the trailing end, between the list up button 110u and the list down button 110d, so that there is no hidden name of to-do-fu-ken. The scrolling of the list then ceases. If rotation of the jog dial 4 is continued further, the cursor 109 is moved from [Kumamoto-ken] to [Okinawa-ken], as shown in FIGS. 38 to 39, until finally the cursor disappears from the current menu area 106b to point to [navi menu "Navi-Menu"] 21 on the hysteresis hierarchical menu area 106a, as shown in FIG. 40.

The list up button 110u and the list down button 110d are displayed with emphasis in case of a command for vertical movement on the jog dial 4, by way of feedback to the user's actuation. This emphatic representation is particularly useful when the list itself performs scrolling, as explained previously.

Thus, in the notebook personal computer 1, shown in FIG. 9, the hierarchical menu representation, associated with rotation and pressing of the jog dial 4, can be applied to the map viewer software program, so that it is possible to represent the current hierarchical hysteresis layer in the menu pertinent to the map viewer software program. By representing the hierarchical hysteresis, it becomes possible with advantage to assist the user in comprehending the menu structure pertinent to the map viewer software program as well as to promote the ease in learning the operating procedure. It is moreover possible to furnish the function of direct reversion to the particular past hierarchical layer to realize more flexible user interface.

A third embodiment of the present invention is hereinafter explained. This third embodiment is directed to a portable telephone set 10 shown in FIG. 41. This portable telephone set 10 has a casing on the upper surface of which is provided an antenna for transmission 11 and on upper and lower portions of the front surface of which are provided a telephone receiver 12 and a telephone transmitter 13. Between the telephone receiver 12 and the telephone transmitter 13, there are provided a dial key 14 and a display 15 formed by a liquid crystal display device.

Figure 41:
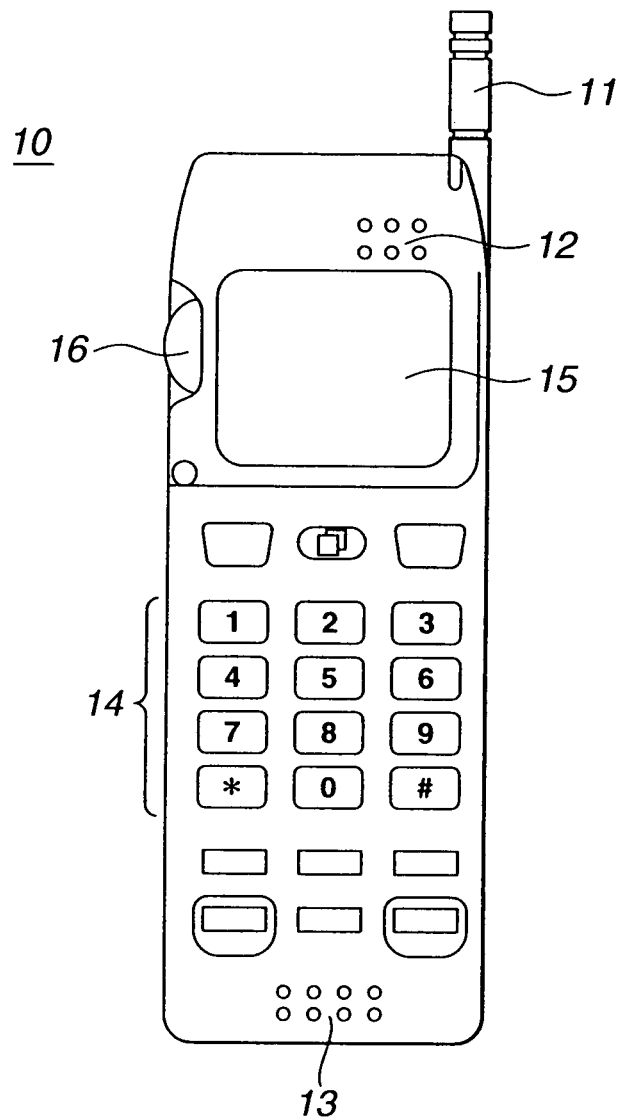
FIG. 41 is a perspective view showing a portable telephone set of a third embodiment of the present invention.

The portable telephone set 10, shown in FIG. 41, is provided with a jog dial 16 having a circular-shaped knob that is both rotatable and movable radially. This jog dial 16 may be rotated to cause cursor movement, while it may also be pushed in the radial direction to operate as a non-lock decision key. The jog dial 16 is used for performing variable functions customarily provided on a portable telephone set. For example, the jog dial 16 may be operated to switch to a display screen of registered telephone numbers or to select the number displayed. This is the so-called telephone directory function of sequentially displaying the registered telephone numbers on a display 15 to select and transmit desired telephone number.

Among the methods of displaying and selecting the telephone numbers, registered on operation of the jog dial 16, there are the following methods:

A first method is applied to a case in which telephone numbers are registered in terms of columns of the 50-syllabary table of the Japanese hiragana or katakana letters. As a first stage, respective columns of [a], [ka], [sa], [ta], [na], . . . are demonstrated on a display screen, with scrolling, and the desired column group is selected by pressing the jog dial. As a second stage, the registered telephone numbers, included in the so selected column group, are displayed with scrolling on the display screen by jog dial rotating operation to select the desired telephone number by the pressing operation on the jog dial.

A second method is applied to a case in which telephone numbers are registered in groups each made up by plural persons. As a first step, the respective groups are demonstrated with scrolling on a display screen by a jog dial rotating operation. As a second step, the registered telephone numbers in the sequence of the 50-syllabary table, included in the so selected group, are displayed with scrolling on the display screen by a jog dial rotating operation to select the desired telephone number by the pressing operation on the jog dial.

In both the first and second methods, the portable telephone set 10 shown in FIG. 41, may be operated using the jog dial 16 and the display 15. Moreover, with this portable telephone set 10, the menu display area for selection and display of the telephone numbers can be demonstrated on the display 15, without enlarging the area, even although the menu display area for telephone number selection and display is of the hierarchical display type. This operation will be explained in detail subsequently.

Figure 42:
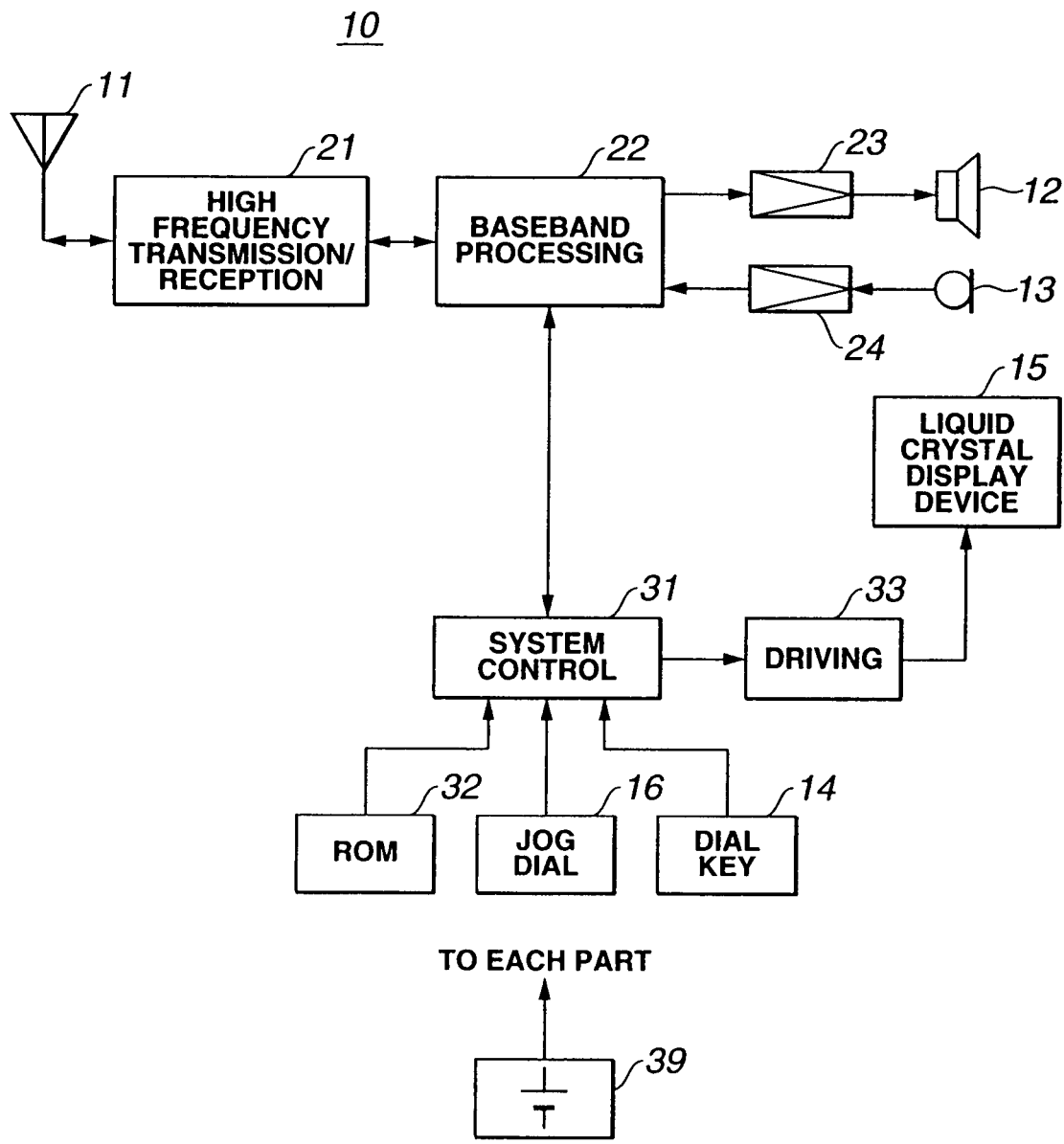
FIG. 42 shows an electrical structure of the portable telephone set.

FIG. 42 shows an electrical structure of the portable telephone set 10. In FIG. 42, the parts or components similar to those of FIG. 41 are denoted by the same reference numerals and the corresponding description is partially omitted for clarity.

In FIG. 42, the antenna 11 and a high frequency transmission/reception circuit 21 of the portable telephone set 10 are interconnected to send or receive the high frequency transmission signal or the high frequency reception signal. Moreover, the high frequency transmission/reception circuit 21 and a baseband processing circuit 22 are interconnected to send or receive transmission and reception signals.

The baseband processing circuit 22 is connected through speech amplification circuits 23, 24 to the telephone receiver 12 and to the telephone transmitter 13, respectively, to send or receive speech signals, while being connected to a system control circuit (CPU) 31 to send or receive control signals.

To the system control circuit 31 are connected an operating unit including a dial key 14 and a jog dial 16 and a ROM 32 having stored therein variegated programs including a text input routine. To the system control circuit 31 is also connected a liquid crystal display device (LCD) 15 over a driving circuit 33. The power necessary for operating various components is supplied from a battery 39.

In the ROM 32, there is stored a telephone directory program which depends on the method of displaying and selecting the telephone number registered by the operation of the jog dial 16. In particular and, this telephone directory program has a menu by a first method for displaying and selection of the telephone number according to the 50-syllabary table and a menu by a second method for displaying and selection of the telephone number according to the groups of individuals. It is noted that the menu display area for selection and display of the telephone number may be displayed in the display device 15, without enlarging the area, even although the menu display area for telephone number selection and display is of the hierarchical display type.

The above telephone directory program, stored in the ROM 32, is executed by the system controller 31. The operation when the system controller 31 of the portable telephone set 10 executes the telephone directory program and specified instances on the display 15 are hereinafter explained with reference to FIGS. 43 to 48.

If the execution of the telephone directory program is commanded by the dial key 14, another operating key or by a preset operating key of the jog dial 16, the system controller 31 executes the above program to display the entire menu display area 106, shown in FIG. 43A, on the display 15. The entire menu display area 106 is divided into the hysteresis hierarchical menu area 106a and the current menu area 106b, as mentioned above. The [telephone directory top menu] is displayed in the hysteresis hierarchical menu area 106a, whilst the [50-syllabary group] menu by the first method and the [individual group] by the second method are displayed with respective folder marks 108 in the current menu area 106b. In the initial state, the cursor 109 is focused on the [50-syllabary group] menu.

If, in the focused state of the cursor 109, shown in FIG. 43A, the jog dial 16 is pressed to decide on the selection, the hierarchical hysteresis information [50-syllabary group] is displayed below the [telephone directory top menu] in the hysteresis hierarchical menu area 106a, whilst [a], [ka], [sa], [ta], [na] and [ha] columns are displayed, along with folder marks 108, in the list up button 110u and the list down button 110d in the current menu area 106b, as shown in FIG. 43B. In the initial state, the cursor 109 is focused on the [a] column.

If the cursor 109 is moved to the [ka] column, with the operation of rotating the jog dial 16 in the downward direction, as shown in FIG. 43C, and the jog dial 16 is pressed to decide on the selection, the hierarchical hysteresis information [ka] is displayed below the [50-syllabary group] in the hysteresis hierarchical menu area 106a, such that respective registered appellations of the [ka] column and the telephone numbers are displayed between the list up button 110u and the list down button 110d of the current menu area 106b, as shown in FIG. 44A. In the initial state, the cursor 109 is focused on the uppermost name [Kato].

If the cursor 109 is moved to the name [Kimura] by rotational operation of the jog dial 16, and the jog dial 16 is pressed to decide on the selection, as shown in FIG. 44B, transmission to [Kimura] occurs automatically.

If the callee is to be changed, the cursor 109 is moved to and decided on the [−ka] displayed in the hysteresis hierarchical menu area 106a, as shown in FIG. 44C. Then, the [a], [ka], [sa], [ta], [na] and [ha] columns, thus including the [ka] column, are displayed, along with folder marks 108, between the list up button 110u and the list down button 110d, as shown in FIG. 45A. In the initial state, the cursor 109 is focused on the [a] column.

If the cursor 109 is moved to and decided on the column [sa] displayed in the current menu area 106b, as shown in FIG. 45B, the hierarchical hysteresis information indicating the selection of the [−sa] column is displayed below the [50-syllabary group] in the hysteresis hierarchical menu area 106a, as shown in FIG. 45C. In the current menu area 106b, the registered names and telephone numbers of the column [sa] are displayed. In the initial state, the cursor 109 is focused on the uppermost name [Sato].

If the cursor 109 is moved to the name [Sasaki] by rotational movement of the jog dial 16, and the selection is decided on by the thrusting operation of the jog dial 16, as shown in FIG. 46A, transmission to [Sasaki] occurs automatically.

A specified instance of changing the display and selection of the telephone number of the individual group, as from the state shown in FIG. 46A, in accordance with the above-mentioned second method, is now explained. If the cursor 109 is moved to and decided on the [−50-syllabary group] demonstrated in the hysteresis hierarchical menu area 106a, as shown in FIG. 46B, not only the [50-syllabary group] but also the [individual group] is demonstrated along with the folder marks 108, as shown in FIG. 46C. In the initial state, the cursor 109 is focused on the [50-syllabary group].

If the cursor 109 is moved to and decided on the [individual group] by the rotating and thrusting movement of the jog dial 16, as shown in FIG. 47A, the hierarchical hysteresis information indicating the selection of the [-individual group] is displayed below the [telephone directory top group] indicating the selection of the [-individual group], as shown in FIG. 47B. In the initial state, the cursor 109 is focused on the [friend] in the uppermost row in the current menu area 106b.

If the cursor 109 is moved to the [Company] responsive to the rotating actuation of the jog dial 16, and the selection is decided on responsive to the thrusting operation of the jog dial 16, the hierarchical hysteresis information indicating the selection of [..Company] is demonstrated below the [-individual group] in the hysteresis hierarchical menu area 106a, as shown in FIG. 48A. At this time, the names and telephone numbers of registered entities of the [Company] are displayed between the list up button 110u and the list down button 110d in the current display area 106b. In the initial state, the cursor 109 is focused on the name [Abe] at the upper end. If the selection is decided on in this state, by the pressing on the jog dial 16, transmission to [Abe] occurs automatically.

If the callee is to be changed, the cursor 109 is moved to and decided on the [..Company] displayed in the hysteresis hierarchical menu area 106a, as shown in FIG. 48B. Then, [friends], [companies] and [relatives] are indicated, along with the folder marks 108, in the current menu area 106b, as shown in FIG. 48C. In the initial state, the cursor 109 is focused on the [friends] of the uppermost row in the current menu area 106b.

Thus, in the portable telephone set 10, shown in FIG. 41, the hierarchical menu display which is responsive to the rotation and thrusting of the jog dial 16 may be applied to the telephone directory program, and hence it becomes possible to express the current hierarchical hysteresis layer in the menu pertinent to the telephone directory program. The display of the hierarchical hysteresis has a merit that it becomes possible with advantage to assist the user in comprehending the menu structure pertinent to the map viewer software program as well as to promote the ease in learning the operating procedure. It is moreover possible to furnish the function of direct reversion to the particular past hierarchical layer to implement more flexible user interface.

Although the user interface device in each of the above-described first to third embodiments is the uniaxially controlled jog dial, the present invention is not limited to use of the jog dial such that other suitable operating keys, such as cross-shaped keys, may also be used.

Although a map viewer program or a telephone directory program, for example, has been given as the applicable software program, these are merely illustrative such that any other suitable software programs may be used provided that the information is displayed and selected in a hierarchical menu representation. In particular, such a software program having certain limitations as to menu display and selection may suitably be used.

For example, the present invention may suitably be applied to an image shaping or image capturing program in which menu display and selection may be hierarchically performed within the menu display of a fixed size without affecting the image display area.

Industrial Applicability

According to the present invention, the current hierarchical hysteresis layer can be represented in an operating menu system having a hierarchical structure. On the other hand, reversion to a particular past hierarchical layer becomes possible by moving the focus to and deciding on the hierarchical hysteresis layer itself which becomes part of the menu. The transverse width of the menu itself can be suppressed by a focused menu letter string scrolling on the display section.

The invention claimed is:

1. A map display apparatus comprising:
a processor and a memory;
a map location name storage unit configured to store map location names in a hierarchical manner;
a display unit configured, in a single display window, (a) to display on a first display area, (1) a first map location name stored in the map location name storage unit and selected hysteresis information for each lower hierarchical layer selected for the first map location name and (2) a selected item of a navigation menu containing a menu of a plurality of selectable items for a user to select in order to search a map, the selectable items including at least address, pointing device, GPS guidance, near-by installation and pre-stored route, (b) to display; on a second display area the map of a first map location associated with the first map location name, and (c) to display on a third display area a list including second map location names residing in a hierarchical layer lower than the first map location name, wherein said first and third display areas are displayed only when a destination is set and said first and third display area obstruct display of part of a right side of the map from a top to a bottom of the second display area;
a cursor operation input unit configured to position a movable cursor on the list displayed on the third display area; and
a selection/operation input unit configured to select the second map location name from the list on which the cursor is positioned.

2. The map display apparatus according to claim 1, further comprising a controller configured to display on the second display area a map of a second map location associated with the second map location name selected by the selection/operation unit.

3. The map display apparatus according to claim 2, wherein the map of the second map location selected by the selection/operation unit is a map with a larger scale than the map of the first map location.

4. The map display apparatus according to claim 1, wherein the map display apparatus is connected to a server via a network and further comprises means for obtaining the map from the server.

5. A map display method for displaying a map on a map display apparatus including a map location name storage unit configured to store map location names in a hierarchical manner and a display unit, the method comprising the steps of:
displaying a single display window having (a) a first display area displaying (1) a first map location name stored in the map location name storage unit and selected hysteresis information for each lower hierarchical layer selected for the first map location name and (2) a selected item of a navigation menu containing a menu of a plurality of selectable items for a user to select in order to search a map, the selectable items including at least address, pointing device, GPS guidance, near-by installation and pre-stored route, (b) a second display area displaying the map of a first map location associated with the first map location name, and (c) a third display area displaying a list including second map location names residing in a hierarchical layer lower than the first map location name, wherein said first and third display areas are displayed only when a destination is set and said first and third display areas obstruct display of part of a right side of the map from a top to a bottom of the second display area;
positioning a movable cursor on the list displayed on the third display area; and
selecting the second map location name from the list on which the cursor is positioned.

6. The map display method according to claim 5, further comprising the step of displaying on the second display area a map of a second map location associated with the selected second map location name.

7. The map display method according to claim 6, wherein the map of the selected second map location is a map with a larger scale than the map of the first map location.

8. The map display method according to claim 5, wherein the nap is obtained from a server.

* * * * *